US009621956B2

(12) United States Patent
Gaydou, II et al.

(10) Patent No.: US 9,621,956 B2
(45) Date of Patent: *Apr. 11, 2017

(54) SYSTEMS AND METHODS FOR PROVIDING A TRANSPORT CONTROL INTERFACE

(71) Applicant: Rovi Guides, Inc., Santa Clara, CA (US)

(72) Inventors: Danny R. Gaydou, II, Exton, PA (US); M. Scott Reichardt, Tulsa, OK (US); Michael D. Ellis, Boulder, CO (US); Thomas Day, Superior, CO (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/725,875

(22) Filed: May 29, 2015

(65) Prior Publication Data
US 2015/0281792 A1  Oct. 1, 2015

Related U.S. Application Data

(63) Continuation of application No. 12/616,309, filed on Nov. 11, 2009, now Pat. No. 9,055,325, which is a continuation of application No. 10/804,486, filed on Mar. 18, 2004, now abandoned.

(60) Provisional application No. 60/456,080, filed on Mar. 18, 2003.

(51) Int. Cl.
H04N 5/445  (2011.01)
H04N 21/472  (2011.01)
(Continued)

(52) U.S. Cl.
CPC ..... *H04N 21/47214* (2013.01); *G11B 27/034* (2013.01); *G11B 27/105* (2013.01);
(Continued)

(58) Field of Classification Search
USPC .......................................................... 725/52
See application file for complete search history.

(56) References Cited

U.S. PATENT DOCUMENTS 5,621,456 A  4/1997 Florin et al.
6,323,911 B1  11/2001 Schein et al.
(Continued)

FOREIGN PATENT DOCUMENTS

EP  0447968 A2  9/1991
WO  WO-00/59214  10/2000

OTHER PUBLICATIONS

DirectTV Receiver with TiVO, Viewer's Guide (2000).

Primary Examiner — Michael Hong
(74) Attorney, Agent, or Firm — Ropes & Gray LLP

(57) ABSTRACT

A transport control interface may be provided by an interactive television program guide application to provide information, control or both for live and recorded video programming. The transport control interface may indicate to the user this time duration of a live or recorded program and any time segments of the program that have been recorded. The transport control interface may automatically adjust the start and end time shown to accommodate various factors such as continuous viewing on a particular channel, multiple recorded segments, buffer size, etc. Various information associated with the live or recorded video programming may be displayed in the transport control interface.

20 Claims, 40 Drawing Sheets

(51) Int. Cl.
*G11B 27/034* (2006.01)
*G11B 27/10* (2006.01)
*G11B 27/34* (2006.01)
*H04N 5/76* (2006.01)
*H04N 7/173* (2011.01)
*H04N 21/431* (2011.01)
*H04N 21/433* (2011.01)
*H04N 21/482* (2011.01)
*H04N 21/84* (2011.01)

(52) U.S. Cl.
CPC ......... *G11B 27/34* (2013.01); *H04N 5/44513* (2013.01); *H04N 5/44543* (2013.01); *H04N 5/76* (2013.01); *H04N 7/17318* (2013.01); *H04N 21/4312* (2013.01); *H04N 21/4314* (2013.01); *H04N 21/4333* (2013.01); *H04N 21/4334* (2013.01); *H04N 21/4821* (2013.01); *H04N 21/84* (2013.01); *G11B 2220/20* (2013.01)

(56) References Cited

U.S. PATENT DOCUMENTS

| | | | |
|---|---|---|---|
| 6,331,877 B1 | 12/2001 | Bennington et al. | |
| 6,388,714 B1 | 5/2002 | Schein et al. | |
| 6,744,967 B2 | 6/2004 | Kaminski et al. | |
| 6,847,778 B1 | 1/2005 | Vallone et al. | |
| 6,850,691 B1 | 2/2005 | Stam et al. | |
| 6,868,225 B1 | 3/2005 | Brown et al. | |
| 6,971,121 B2 | 11/2005 | West et al. | |
| 7,058,135 B2 | 6/2006 | Poslinski et al. | |
| 7,657,916 B2 | 2/2010 | Rodriguez et al. | |
| 7,783,497 B2 | 8/2010 | Dunnahoo et al. | |
| 8,572,649 B1 | 10/2013 | Gossweiler, III et al. | |
| 2001/0051037 A1 | 12/2001 | Safadi et al. | |
| 2002/0019981 A1* | 2/2002 | Schein | G06F 3/0481 725/41 |
| 2002/0040475 A1 | 4/2002 | Yap et al. | |
| 2002/0042920 A1 | 4/2002 | Thomas et al. | |
| 2002/0174430 A1 | 11/2002 | Ellis et al. | |
| 2003/0014752 A1 | 1/2003 | Zaslavsky et al. | |
| 2003/0046694 A1 | 3/2003 | Istvan et al. | |
| 2003/0046695 A1 | 3/2003 | Billmaier et al. | |
| 2003/0110514 A1 | 6/2003 | West et al. | |
| 2003/0121055 A1* | 6/2003 | Kaminski | H04N 5/76 725/115 |
| 2003/0122966 A1 | 7/2003 | Markman et al. | |
| 2005/0005308 A1 | 1/2005 | Logan et al. | |
| 2006/0020971 A1 | 1/2006 | Poslinski | |
| 2007/0277201 A1 | 11/2007 | Wong et al. | |
| 2012/0291071 A1 | 11/2012 | Seo et al. | |
| 2012/0311635 A1 | 12/2012 | Mushkatblat | |
| 2013/0254308 A1 | 9/2013 | Rose et al. | |
| 2013/0339998 A1 | 12/2013 | Arme et al. | |
| 2014/0006951 A1 | 1/2014 | Hunter | |

\* cited by examiner

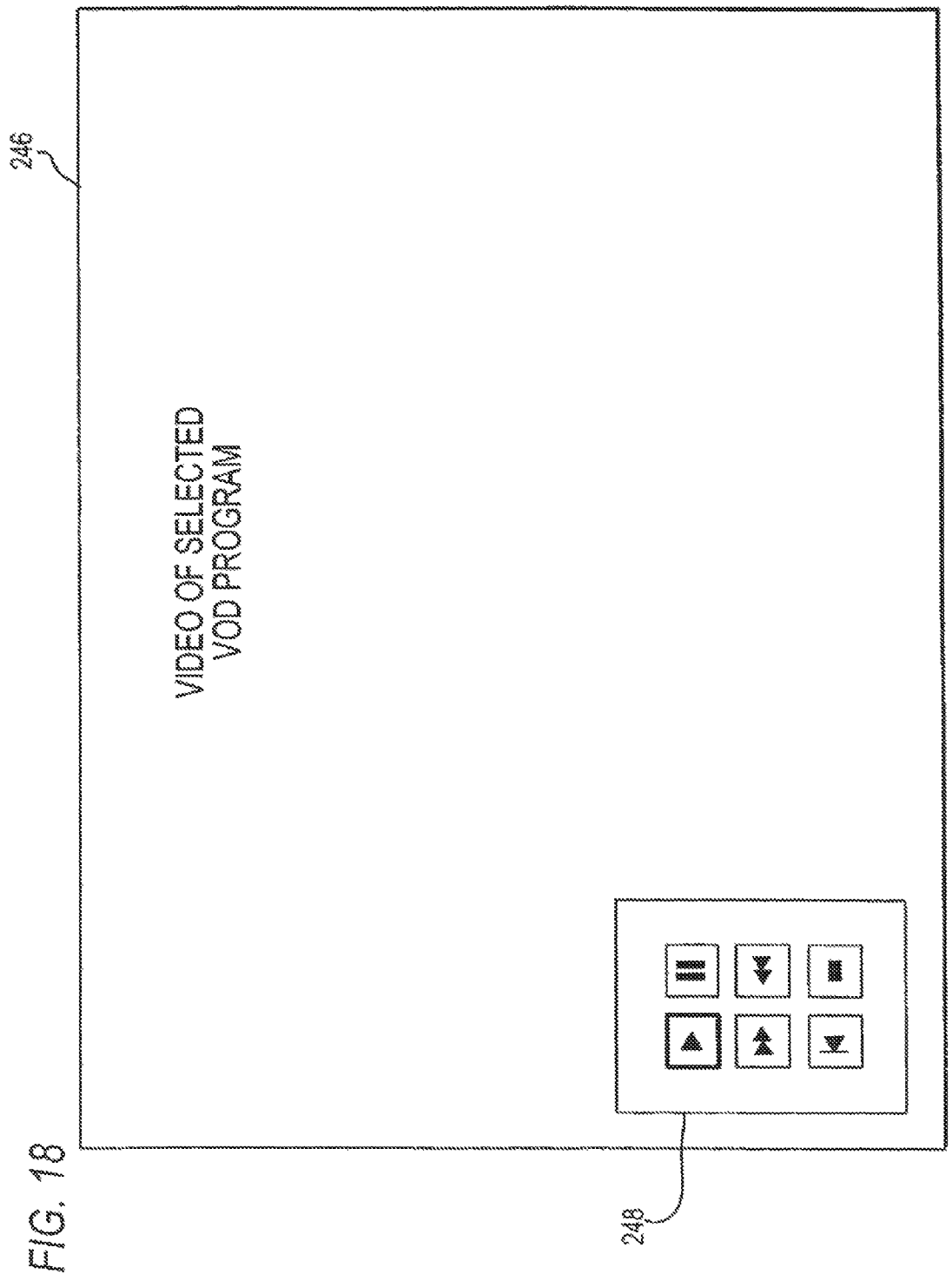

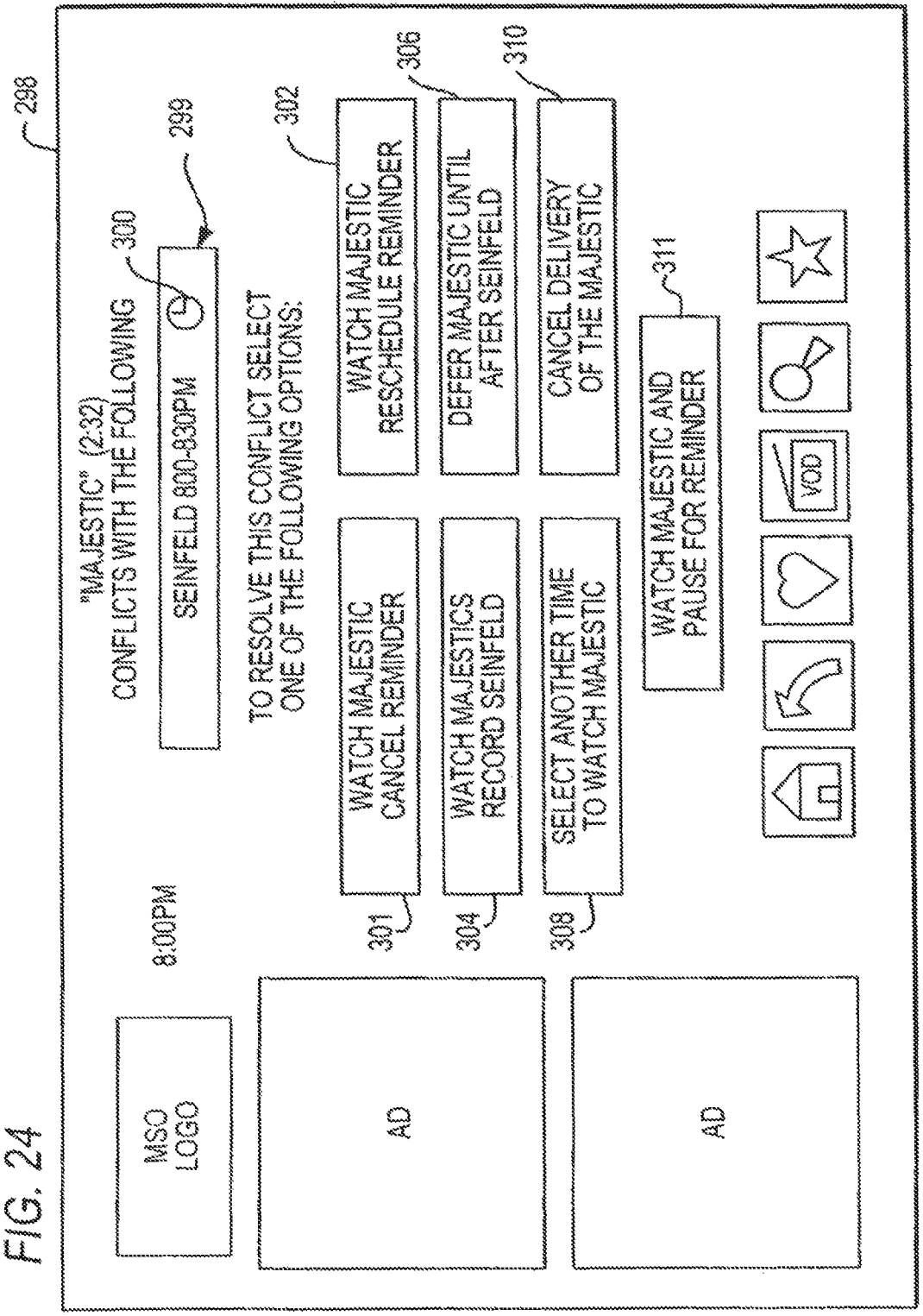

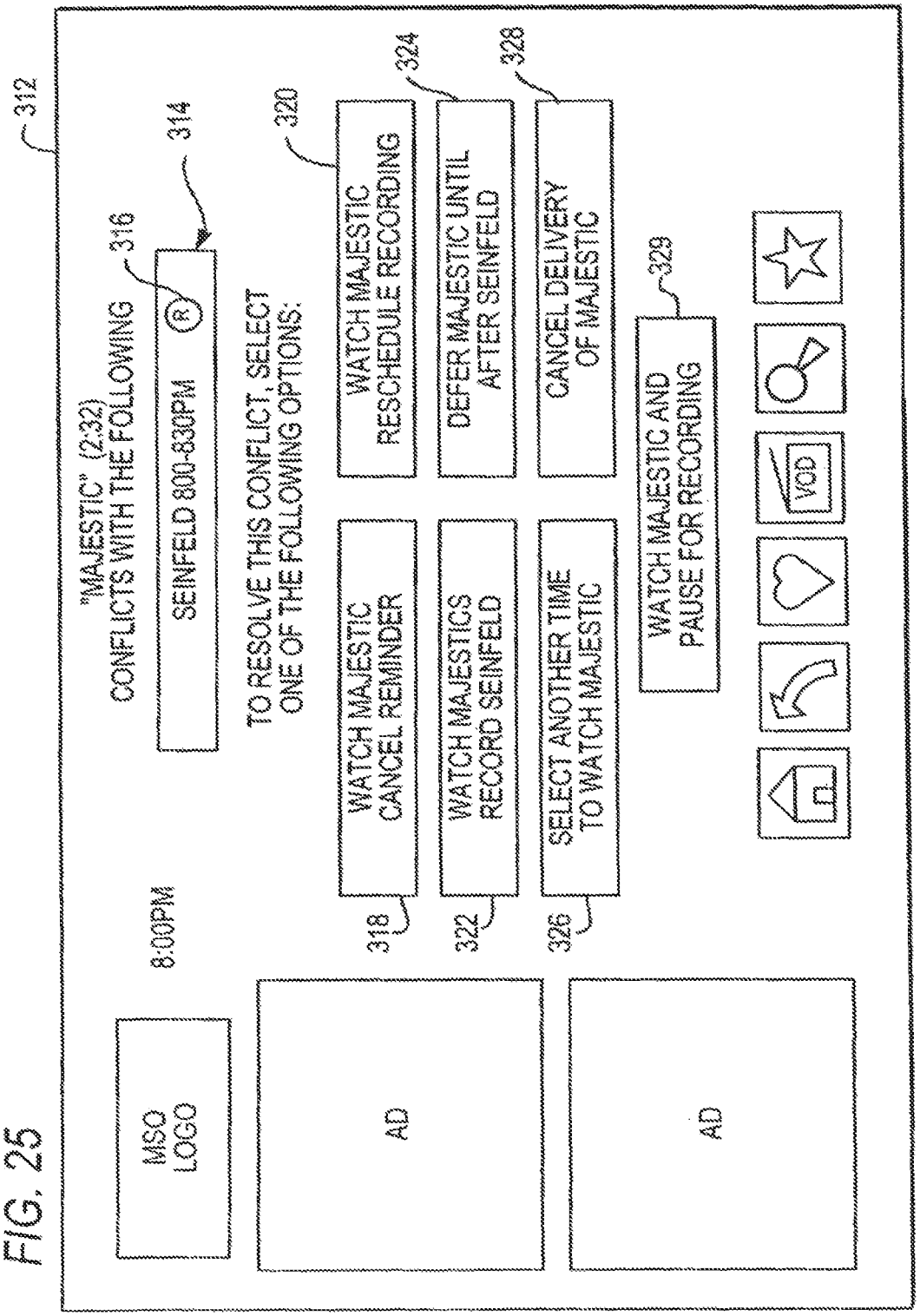

SYSTEMS AND METHODS FOR PROVIDING
A TRANSPORT CONTROL INTERFACE

This application is a continuation of U.S. application Ser. No. 12/616,309, filed Nov. 11, 2009 (currently allowed) which is a continuation of U.S. patent application Ser. No. 10/804,486, filed Mar. 18, 2004, (currently abandoned) which claims the benefit of U.S. provisional patent application No. 60/456,080, filed Mar. 18, 2003, all of which are hereby incorporated by reference herein in their entireties.

BACKGROUND OF THE INVENTION

The present invention relates to an interactive television application, and more particularly, the present invention relates to an interactive television application that provides a transport control interface when television content is being recorded or viewed.

Interactive television systems are well known. Such systems provide a multitude of services and features, including video-on-demand services, television program listings, web-browsing services, games, home shopping services, among others. Another service that has recently grown in popularity includes the use of a personal video recorder device, which allows users to digitally store television video content on a hard disk drive.

One of the most popular brands of personal video recorders is TiVo®. TiVo® typically comes preinstalled with firmware that provides an interactive user interface. The TiVo® interface allows users to view program listings, set up future recordings, and access recorded content.

The capabilities of present day personal video recorders are numerous and comprehensive. However, the interfaces that are provided to users of personal video recorders fall short of providing sufficient information about recorded content, content currently being recorded, and content to be recorded. Such information would be beneficial to the user, for example, to enable the user to schedule recording or viewing in a more informed and efficient manner.

It would therefore be desirable to provide an interface that allows for more informed and efficient viewing and recording of television content using a personal video recorder.

It will be understood that while this application is primarily described in connection with a personal video recorder, any other suitable playback or recording devices or systems may be used. As an example, it is equally desirable to provide an interface that allows control of viewing and recording in connection with a net-work video recorder or with video-on-demand.

SUMMARY OF THE INVENTION

It is therefore an object of the present invention to provide an interface that allows for more informed and efficient viewing and recording of television content provided in connection a personal video recorder, a network video recorder, video-on-demand, any other suitable playback or recording device, or any combination thereof.

In some embodiments of the present invention, the interactive television program guide application may provide a transport control interface (e.g., in the form of a transport control bar) that provides information, control or both for video programming. The video programming may include previously recorded video (e.g., video recorded by the user using a local or network digital video recorder, video-on-demand, etc.) and currently broadcasting programming. It will be understood that a currently broadcasting program in accordance with the present invention includes broadcast of the program that is shown at substantially the time that it is being broadcasted (i.e., not necessarily a broadcast of a live event) and delayed broadcast of the program. The delayed broadcast of the program may be shown, for example, from a memory buffer in response to the user parsing and then resuming play of the broadcasting program, in response to the user rewinding the broadcasting program, etc. The transport control interface of she present invention may be used in conjunction with any suitable recording device, such as a personal or digital video recorder.

The interactive television program guide application may use the transport control bar to indicate to the user the duration of a currently broadcasting program (includes broadcast of the program that is shown at substantially the time that it is being broadcasted and delayed broadcast of the program) or a previously recorded program. Any recorded portion of a program may be indicated to the user on the transport control bar. The transport control bar may also indicate a current action status with respect to previously recorded video (e.g., playing, rewinding, fast-forwarding, slow playing, slow reversing, pausing, etc.).

In some embodiments of the present invention, the interactive television program guide application may allow the user to record non-contiguous segments of a currently broadcasting program. This may be represented in the transport control bar as non-contiguous segments of different colors, patterns, or other visually distinguishable features.

In some embodiments of the present invention, start times and end times of a currently broadcasting program that is shown in a transport control interface may be adjusted based on changes in the running time of the currently broadcasting program.

In some embodiments of the present invention, the interactive television program guide application may provide different modes, such as various time modes, in connection with the presentation of the transport control bar. For example, the interactive television program guide application may automatically initiate a default short term mode when the user tunes to a currently broadcasting program that only displays times that are relevant to the currently broadcasting program (e.g., its time duration). In a long term mode, the interactive television program guide application may display a transport control bar covering a time period longer than a single program, for example, in response to the user viewing programming on a particular channel for a period longer than a single program.

The interactive television program guide application may display information such as program titles, program boundaries, and any other suitable information associated with the various programs that are covered by the time duration on the transport control bar.

In some embodiments of the present invention, the interactive television program guide, application may allow the user to pause live video of a currently broadcasting program. In such embodiments, the interactive television program guide application may pause the time shown within the transport control bar while continuing to record the live video in real time. The continued recording may be indicated, for example, by allowing the buffer region in the transport control bar to extend beyond the paused transport control block. The interactive television program guide application may later allow the user to resume viewing of the live video, for example, at any location within the buffered region.

In some embodiments of the present invention the visual appearance of a buffer region that designates automatically recorded content may be distinguishable from the visual appearance of a region of the transport control bar that designates content that is being recorded at the request of the user.

Further features of the invention, its nature and various advantages will be more apparent from the accompanying drawings and the following detailed description of the preferred embodiments.

BRIEF DESCRIPTION OF THE DRAWINGS

FIG. 18 is an illustrative display screen showing how video-on-demand playback controls may be displayed while video-on-demand content is being displayed for the user in accordance with the present invention.

FIGS. 24-27 are illustrative conflict resolution display screens chat may be displayed for the user when it is determined that a requested video delivery conflicts with a program reminder in accordance with the present invention.

DETAILED DESCRIPTION OF THE PREFERRED EMBODIMENTS

Figure 1:
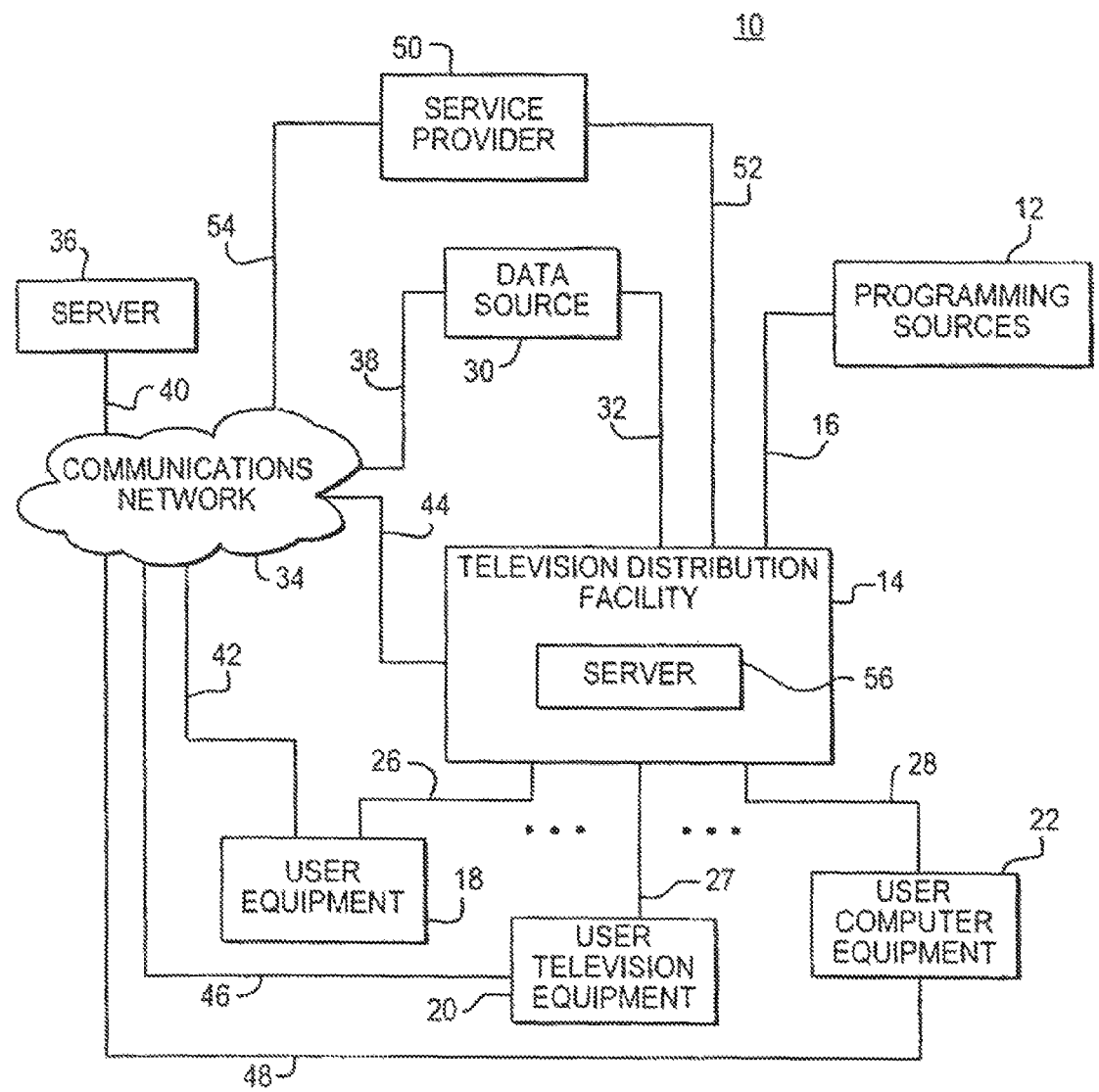
FIG. 1 is a diagram of an illustrative interactive television system in accordance with the present invention.

An illustrative interactive television system 10 in accordance with the present invention is shown in FIG. 1. Content such as television programming and digital music may be provided from programming sources 12 to television distribution facilities such as television distribution facility 14 using communications path 16. Programming sources 12 may be any suitable sources of television and music programming, such as television and music production studios, etc.

Television distribution facility 14 may be a cable system headend, a satellite television distribution facility, a television broadcast facility, or any other suitable facility for distributing television and music programming to users. There are typically numerous television distribution facilities 14 in system 10, but only one is shown in FIG. 1 to avoid overcomplicating the drawings.

Communications path 16 may be a satellite path, a fiber-optic path, a cable path, or any other suitable wired or wireless communications paths or a combination of such paths.

Television distribution facility 14 may be connected to various user equipment devices 18. Such user equipment 18 may, for example, be located in the homes of users. User equipment 18 may include user television equipment 20 or user computer equipment 22.

The user equipment may receive television and music programming and other information from television distribution facility 14 over communications paths such as communications paths 26, 27, and 28. The user equipment may also transmit signals to television distribution facility 14 over paths 26, 27, and 28. Paths 26, 27, and 28 may be cables or other wired connections, free-space connections (e.g., for broadcast or other wireless signals), satellite links, etc.

Data source 30 may include a program listings database that is used to provide the user with television program schedule information such as scheduled broadcast times, titles, channels, ratings information (e.g., parental ratings and critic's ratings), detailed title descriptions, genre or category information (e.g., sports, news, movies, etc.), information on actors and actresses, running times, etc. Data source 30 may also be used to provide advertisements (e.g., program guide advertisements and advertisements for other interactive television applications), real-time data such as sports scores, stock, quotes, news, weather, etc. Although data source 30 is drawn as an individual box in FIG. 1, data source 30 and the other system components of FIG. 1 may be provided using equipment at one or more locations. Systems components are drawn as single boxes in FIG. 1 to avoid over-complicating the drawings.

Data source 30 may provide program schedule information and other data to television distribution facility 14 over communications path 32 for distribution to the associated user equipment over paths 26, 27, and 28. Communications path 32 may be any suitable communications path such as a satellite communications path or other wireless path, a fiber-optic or other wired communications path, a path that supports Internet communications, a combination of such paths, etc. Data source 30 may provide program schedule information and other data to the user at user equipment 18 over path 38, communications network 34, and path 42. Path 42 may be a wired path such as a telephone line, a cable path, a fiber-optic path, a satellite path, a wireless path, a combination of such paths, or any other suitable path.

User equipment devices such as user television equipment and personal computers may use the program schedule information to display program listings and information on digital music for the user. An interactive television program guide application or other suitable application may be used to display such information on the user's display.

An on-line program guide and other interactive television services sway be provided using a server connected to communications network 34 such as server 36. Server 36 may receive program schedule information and other data from data source 30 via communications path 38, communications network 34, and communications path 40. Paths 38 and 40 may be satellite paths, fiber-optic paths, wired paths, etc. Communications network 34 may be any suitable communications network, such as the Internet, the public switched telephone network, a packet-based network, etc.

User equipment 18 may access on-line program guide information and other information from server 36 via communications path 42. User equipment 18 may also access the on-line program guide and other services on server 36 via communications path 26, television distribution facility 14, and communications path 44. For example, a cable modem or other suitable equipment may be used by user equipment 18 to communicate with television distribution facility 14. Television distribution facility 14 may communicate with communications network 34 over any suitable path 44, such as a wired path, a cable path, fiber-optic path, satellite path, a combination of such paths, etc.

User equipment such as user television equipment 20 and user computer equipment 22 may access the on-line program guide and server 36 using similar arrangements. User television equipment 20 may access the on-line program guide and server 36 using communications path 46 or using path 27, television distribution facility 14, and path 44. User computer equipment 22 may access the on-line program guide and server 36 using communications path 48 or using path 28, television distribution facility 14, and path 44. Paths 46 and 48 may be any suitable paths, such as wired paths, cable paths, fiber-optic paths, wireless paths, satellite paths, a combination of such paths, etc.

Program guide application functions and the functions of other interactive television applications may be supported using server 36 end other servers connected to communications network 34 such as server 56. Interactive television applications may also be supported by servers or other suitable equipment at one or more service providers such as service provider 50. For example, a home shopping service may be supported by a service provider such as service provider 50 that has sales representatives, order fulfillment facilities, account maintenance facilities, and other equipment for supporting interactive home shopping features. A home shopping application that is implemented using the user equipment may be used to access the service provider to provide these features to the user. The user equipment may access service provider 50 via television distribution facility 14 and communications path 52 or via communications network 34 and communications path 54. Communications paths such as paths 52 and 54 may be any suitable paths, such as wired paths, cable paths, fiber-optic paths, satellite paths, a combination of such paths, etc.

Another example of an interactive television application is a home banking application. A home banking service may be supported using personnel at facilities such as service provider 50. An interactive home banking application that is implemented using the user equipment may access the home banking service via television distribution facility 14 and communications path 52 or via communications network 34 and communications path 54.

If desired, an interactive television application such as a network-based video recorder or a video-on-demand application may be supported using server 56, server 36, or equipment at service provider 50. Video-on-demand content and video recorded using a network-based video recorder arrangement may be stored on server 56 or server 36 or at service provider 50 and may be provided to the user equipment when requested by users. An interactive television application may be used to support the functions of a personal video recorder (sometimes called a digital video recorder) that is implemented using user equipment 18. Illustrative equipment that may be used to support personal video recorder functions include specialized personal, video recorder devices, integrated receiver decoders (IRDs), set-top boxes with integrated or external, hard drives, or personal computers with video recording capabilities.

If desired, applications such as the interactive television program guide application, a home shopping application, a home banking application, a video-on-demand application, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping, network-based video, recorder functions, personal video recorder functions, navigational functions, program guide functions, communications functions, and other suitable functions may be provided using one application or any other suitable number of applications.

Moreover, the interactive television program guide application, the home banking application, the home shopping application, the network-based video recorder and personal video recorder applications, the video-on-demand application, the gaming applications, communications applications, and navigational applications, are only a few illustrative examples of the types of interactive television applications that may be supported by system 10. Other suitable applications that may be supported include, news services, web browsing and other Internet services, and interactive wagering services (e.g., for wagering on horse races and the like).

The interactive television application or applications that are used in Interactive television system 10 may be implemented locally on the user equipment. The applications may also be implemented In a distributed fashion (e.g., using a client-server architecture in which the user equipment serves at least partly and for at least some of the time, as the client and a server such as server 56 at television distribution facility 14, server 36, or other suitable equipment acts as the server. Other distributed architectures may also be used if desired. Moreover, some or all of the interactive television system features of system 10 may be provided using operating system software or middleware software. Such operating system software and middleware may be used instead of or in combination with application-level software. Regardless of the particular arrangement used to implement interactive television features related to program guides, home shopping, home banking, video-on-demand, Internet, communications, etc., the software that supports these features may be referred to as an application or applications.

Figure 2:
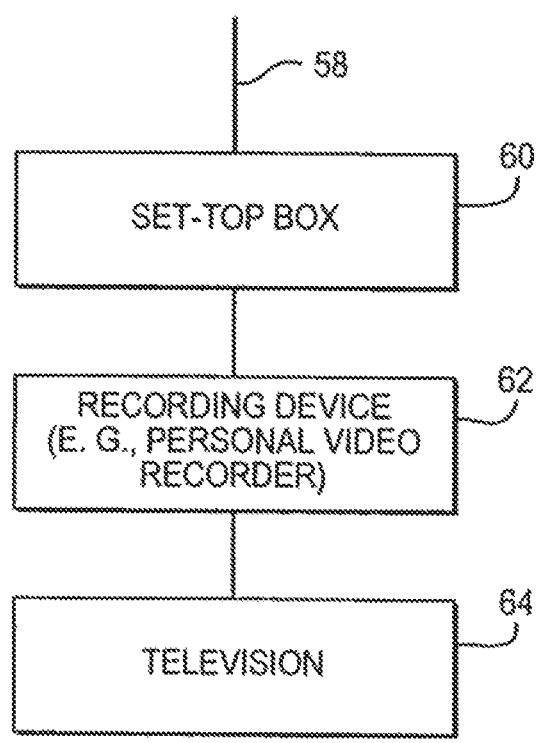
FIG. 2 is a diagram of illustrative user television equipment in accordance with the present invention.

Illustrative user television equipment 20 that is based on a set-top box arrangement is shown in FIG. 2. Input/output 58 may be connected to communications paths such as paths 27 and 46. Input/output functions may be provided by one or more wires or communications paths, but are shown as a single path in FIG. 2 to avoid overcomplicating the drawing. Television programming and other information may be received using input/output 58. Commands and requests and other information from the user may also be transmitted over input/output 58.

Set-top box 60 may be any suitable analog or digital set-top box (e.g., a cable set-top box). Set-top box 60 may contain an analog tuner for tuning to a desired analog television channel. Set-top box 60 may also contain digital decoding circuitry for receiving digital television and music channels. Both analog and digital channels may be handled together if desired. Multiple tuners may be provided (e.g., to handle simultaneous watch and record functions). Box 60 may be an integrated receiver decoder (IRD) that handles satellite television. If desired, box 60 may have circuitry for handling cable, over-the-air broadcast, and satellite content. Box 60 may include a storage device (e.g., a digital storage device such as a hard disk drive) for providing recording capabilities. Box 60 may also be connected to a recording device 62 such as a video cassette recorder, personal video recorder, or other device or devices with storage capabilities.

Set-top box 60 contains a processor (e.g., a microcontroller or microprocessor or the like) that is used to execute software applications. Set-top box 60 may contain memory such as random-access memory for use when executing applications. Nonvolatile memory may also be used (e.g., to launch a boot-up routine and other instructions). Hard disk storage in box 60 or in recording device 62 may be used to back up data and to otherwise support larger databases and storage requirements than may be supported using random-access memory approaches.

Set-top box 60 may have infrared (IR) or other communications circuitry for communicating with a remote control or wireless keyboard. Set-top box 60 may also have dedicated buttons and a front-panel display. The front-panel display may, for example, be used to display the current channel to which the set-top box is tuned.

Set-top box 60 may also have communications circuitry such as a cable modem, an integrated services digital network (ISDN) modem, a digital subscriber line (DSL) modem, a telephone modem, wireless modem, etc. for communications with other equipment. Such communications may involve the Internet or any other suitable communications networks or paths. If desired, the components of set-top box 60 may be integrated into other user equipment (e.g., a television or videocassette recorder).

Recording device 62 may be used to record videos provided by set-top box 60. For example, if set-top box 60 is tuned to a given television channel, the video signal for that television channel may be passed to recording device 62 for recording on a videocassette, compact disc, digital video disk, or internal hard drive or other storage device. Recording device 62 may have communications circuitry such as a cable modem, an ISDN modem, a DSL modem, a telephone modem, etc. for communications with other equipment. Such communications may involve the Internet or any other suitable communications networks or paths. The components of recording device 62 may be integrated into other user equipment (e.g., a television, stereo equipment, etc.).

Recording device 62 may be controlled using a remote control or other suitable user interface. If desired, video recorder functions such as start, stop, record, etc. and other functions for device 62 may be controlled by set-top box 60. For example, set-top box 60 may control recording device 62 using infrared commands directed toward the remote control inputs of recording device 62 or set-top box 60 may control recording device 62 using other wired or wireless communications paths between box 60 and device 62.

The output of recording device 62 may be provided to television 64 for display to the user. If desired, multiple recording devices 62 or no recording device 62 may be used. If recording device 62 is not present or is not being actively used, the video signals from set-top box SO may be provided directly to television 64. Any suitable television or monitor may be used to display the video. In the equipment of FIG. 2 and the other equipment of system 10, the audio associated with various video items is typically distributed with those video items and is generally played back to the user as the videos are played.

Figure 3:
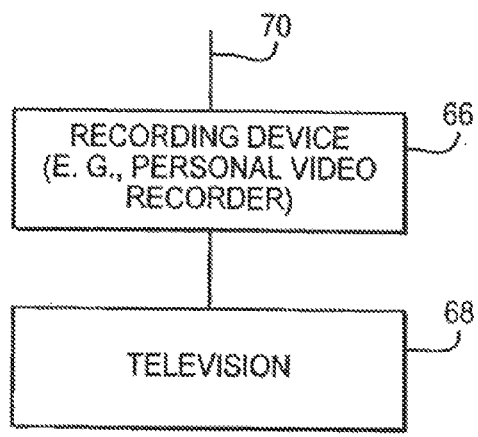
FIG. 3 is a diagram of additional illustrative user television equipment in accordance with the present invention.

Another illustrative arrangement for user television equipment 20 is shown in FIG. 3. In the example of FIG. 3, user television equipment 20 includes a recording device 66 such as a digital video recorder (e.g., a personal video recorder (PVR)) that uses a hard disk or other storage for recording video or may be a digital video disc recorder, compact disc recorder, videocassette recorder, or other suitable recording device. Equipment 20 of FIG. 3 may also include a television 68. Input/output 70 may be connected to communications paths such as paths 27 and 46. Television programming and other information may be received using input/output 70. Commands and requests and other information from the user may be transmitted over input/output 70.

Recording device 66 may contain at least one analog tuner for tuning to a desired analog television channel (e.g., multiple tuners may be provided). Recording device 66 may also contain digital decoding circuitry for receiving digital television and music channels. If desired, recording device 66 may contain circuitry for handling both analog and digital channels. Recording device 66 also contains a processor (e.g., a microcontroller or microprocessor or the like) that is used to execute software applications. Recording device 66 may contain memory such as random-access memory for use when executing applications. Nonvolatile memory may also be used to store a boot-up routine or other instructions. The hard disk and other storage in recording device 66 may be used to support databases (e.g., program guide databases or interactive television application databases). The hard disk or other storage in recording device 66 may also be used to record video such as television programs or video-on-demand content or other content provided to recording device 66 over input/output 70.

Recording device 66 may have IR communications circuitry or other suitable communications circuitry for communicating with a remote control. Recording device 66 may also have dedicated buttons and a front-panel display. The front-panel display may, for example, be used to display the current channel to which the recording device is tuned.

Recording device 66 may also have communications circuitry such as a cable modem, an ISDN modem, a DSL modem, a telephone modem, a wireless modem, etc. for communications with other equipment. Such communications may involve the Internet or other suitable communications networks or paths.

If desired, recording device 66 may include a satellite receiver or other equipment that has wireless communications circuitry for receiving satellite signals.

Recording device 66 of FIG. 3 or recording device 62 of FIG. 2 may record new video while previously recorded video is being played back on television 68 or 64. This allows users to press a pause button during normal television viewing. When the pause button is pressed, the current television program is stored on the hard disk of digital video recorder 66. When the user presses play, the recorded video may be played back. This arrangement allows the user to seamlessly pause and resume television viewing. Recording device 66 and 62 may also be used to allow a user to watch a previously-recorded program while simultaneously recording a new program.

Figure 4:
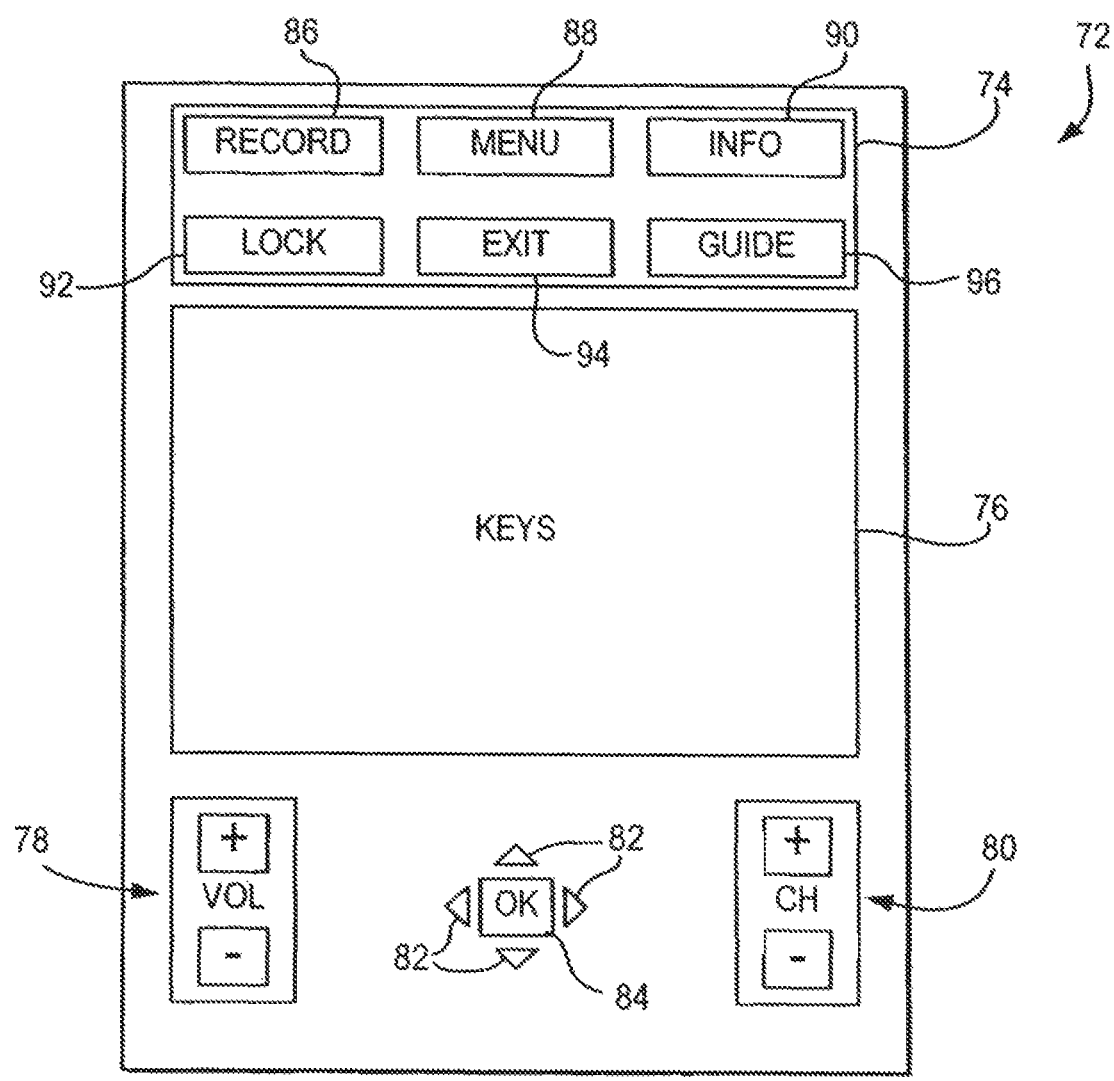
FIG. 4 is a diagram of an illustrative remote control in accordance with the present invention.

The set-top box arrangement of FIG. 2 and the digital video recorder set-top box arrangement of FIG. 3 are merely illustrative. Other arrangements may be used if desired. For example, user television equipment may be based on a WebTV box, a personal computer television (PC/TV), or any other suitable television equipment arrangement. If desired, the functions of components such as set-top box 60, digital video recorder 66, a WebTV box, or PC/TV or the like may be integrated into a television or personal computer or other suitable device. An illustrative remote control 72 for operating user television equipment 20 (or suitable user computer equipment 22) is shown in FIG. 4. Remote control 72 may have function keys 74 and other keys 76 such as keypad keys, power on/off keys, pause, stop, fast-forward and reverse keys, etc. Volume up and down keys 78 may be used for adjusting the volume of the audio portion of a video. Channel up and down keys 80 may be used to change television channels and to access content on virtual channels. Cursor keys 82 may be used to navigate on-screen menus. For example, cursor keys 82 may be used to position an on-screen cursor, indicator, or highlight (sometimes all generically referred to herein as a highlight or highlight region) to indicate interest in a particular option or other item on a screen displayed by the interactive television application.

An OK key 84 (sometimes called a select or enter key) may be used to select on-screen options that the user has highlighted.

Keys 74 may include a record key 86 for initiating recordings. Menu button 88 may be used to direct the interactive television application to display a menu on the user's display screen (e.g., on television 64 or 68 or on a suitable monitor or computer display). Info button 90 may be used to direct the interactive television application to display an information display screen. If the user has highlighted a particular program listing, for example, pressing the info button 90 may direct the interactive television application to provide additional program schedule information related to that program listing (e.g., a program summary, actor information, etc.).

Lock button 92 may be used to modify access privileges. For example, a parent may use lock button 92 or on-screen options to establish parental control settings for the interactive television application. The parental control settings may be time-based, settings (e.g., to prevent a child from watching television during a particular time block such as from 3:00 PM to 5:00 PM). The parental control settings may also be used to block programming based on rating, channel, program title, etc. A locked or blocked program is typically not viewable until the interactive television application is provided with a suitable personal identification number (PIN). Once this PIN has been entered, the interactive television program will unlock the user's equipment and allow the locked content to be accessed.

Exit button 94 may be used to exit the interactive television application or to exit a portion of the interactive television application. Guide button 96 may be used to invoke the interactive television program guide application.

The keys shown in FIG. 4 are merely illustrative. Other keys or buttons may be provided if desired. For example, a music button may be used to access music with the interactive television application. An edit button may be used to edit stored content (e.g., to remove commercials, remove portions of a video, etc.). Alphanumeric buttons may be used to enter alphanumeric characters. A last or back button may be used to browse backward in the interactive television application (e.g., to return to a previous channel or display screen). Video recorder function buttons such as a play button, pause button, stop button, rewind button, fast-forward button, and record button, may be used to control video recorder functions (local or network-based) in system 10. A help key may be used to invoke help functions such as context-sensitive on-screen help, etc.

Figure 5:
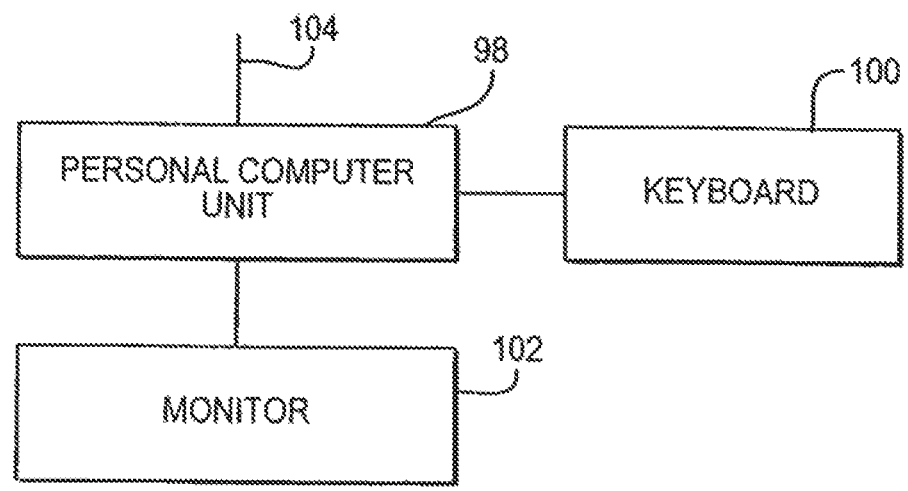
FIG. 5 is a diagram of illustrative user computer equipment in accordance with the present invention.

Illustrative user computer equipment 22 is shown in FIG. 5. In the arrangement of FIG. 5, personal computer 98 may be controlled by the user using keyboard 100 or other suitable user input device, such as a trackball, mouse, touch pad, touch screen, voice recognition system, a remote control such as remote control 72 of FIG. 4, etc. Video content such as television programming and interactive television application display screens may be displayed on monitor 102. Television programming, video-on-demand content, video recordings played back from a network-based video recorder, and other information may be received from paths 28 and 48 (FIG. 1) using input/output 104. The user may also send commands and other information used during interactions with the interactive television application and system 10 over input/output line 104.

Personal computer unit 98 may contain a television or video card such as television tuner card for decoding analog and digital television channels and for handling streaming video content. Multiple video cards (e.g., tuner cards) may be provided if desired. An illustrative television tuner card that may be used may contain an analog television tuner for tuning to a given analog channel and digital decoding circuitry for filtering out a desired digital television or music channel from a packetized digital data scream. Any suitable card or components in computer unit 98 may be used to handle video and other content delivered via input/output line 104 if desired.

Personal computer unit 98 may contain one or more processors (e.g., microprocessors) that are used to run the interactive television application or a portion of the interactive television application.

Storage in personal computer unit 98 such as a hard drive, DVD drive, CD drive, or other suitable storage device or devices may be used to store video and other content. For example, the interactive television application and personal computer unit 98 may use this storage to provide the functions of a personal video recorder.

User equipment 18 such as user television equipment 20 and user computer equipment 22 may be used with network equipment such as server 56, server 36, and equipment at service providers such as service provider 50 of FIG. 1 to provide network-based video recording functions. Video recording functions may be provided by storing copies of television programs and other video content on a remote server (e.g., server 56 or server 36 of FIG. 1) or other network-based equipment such as equipment at a service provider such as service provider 50.

Video recordings may be made in response to user commands that are entered at user equipment 18. In a personal video recorder arrangement, the interactive television application may be used to record video locally on the user equipment in response to the user commands. In a network-based video recorder arrangement, the interactive television application may be used to record video or to make virtual recordings on network equipment such as server 36, 56, or equipment at service provider 50 in response to the user commands. The user commands may be provided to the network equipment over the communications paths shown in FIG. 1. The personal video recorder arrangement and the network-based video recorder arrangement can support functions such an fast-forward, rewind, pause, play, and record.

To avoid unnecessary duplication in a network-based video recorder environment, the system 10 may provide network based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area.

The user television equipment and user computer equipment arrangements described above are merely illustrative. A more generalized embodiment of illustrative user equipment is shown in FIG. 6.

Figure 6:
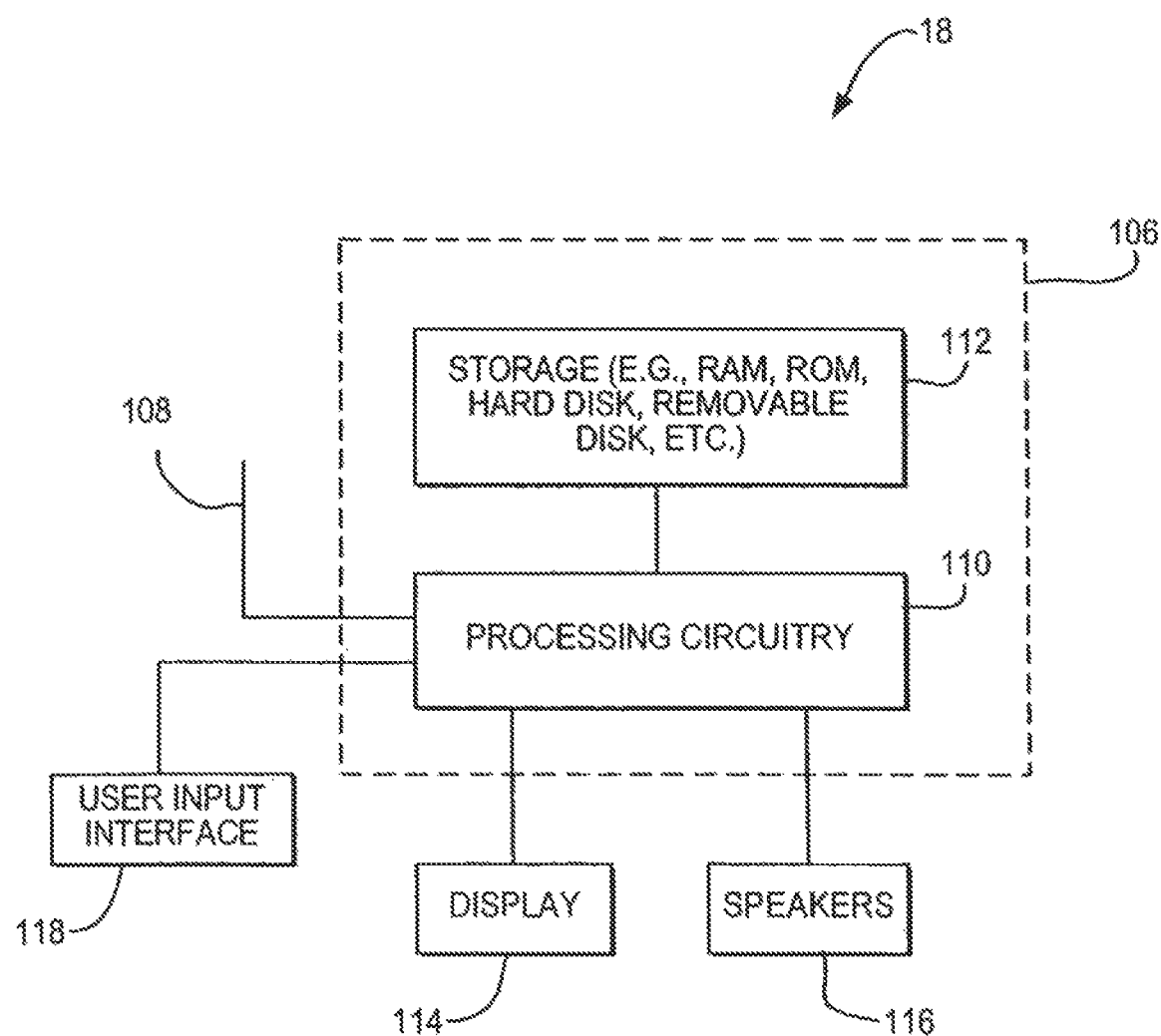
FIG. 6 is a generalised diagram of illustrative user equipment in accordance with the present invention.

As shown in FIG. 6, control circuitry 106 is connected to input/output 108. Input/output 108 may be connected to one or more communications paths such as paths 26, 27, 28, 42, 46, end 48 of FIG. 1. Television and music programming may be received via input/output 108 (e.g., from programming sources 12, servers or other equipment such as server 36, service providers such as service provider 50, and television distribution facility 14). Program schedule information for an interactive television program guide application may be received from data source 30 via input/output 108. Input/output 108 may also be used to receive information from data source 30 for other interactive television applications. The user may use control circuitry 106 to send commands, requests, and other suitable information using input/output 108.

Control circuitry 106 may be based on any suitable processing circuitry 110 such as processing circuitry based on one or more microprocessors, microcontrollers, digital signal processors, programmable logic devices, etc. Memory (e.g., random-access memory and read-only memory), hard drives, DVD drives, CD drives, or any other suitable memory or storage devices may be provided as storage 112 that is part of control circuitry 106. Tuning circuitry such as one or more analog tuners, one or more MPEG-2 decoders or other digital video circuitry, or any other suitable tuning or video circuits or combinations of such circuits may also be included as part of circuitry 106. Encoding circuitry (e.g., for converting over-the-air or cable analog signals to MPEG signals for storage) may also toe provided. The tuning and encoding circuitry may be used by the user equipment to receive and display or play or record a particular television or music channel or other desired audio and video content (e.g., video-on-demand content or requested network-based or local video recorder playback). Television programming and other video and on-screen options and information may be displayed on display 114. Display 114 may be a monitor, a television, or any other suitable equipment for displaying visual images. Speakers 116 may be provided as part of a television or may be stand-alone units. Digital music and the audio component of videos displayed on display 114 may be played through speakers 116.

A user may control the control circuitry 106 using user input interface 118. The user input interface 118 may be any suitable user interface, such as a mouse, trackball, keypad, keyboard, touch screen, touch pad, voice recognition interlace, remote control, etc.

Figure 7:
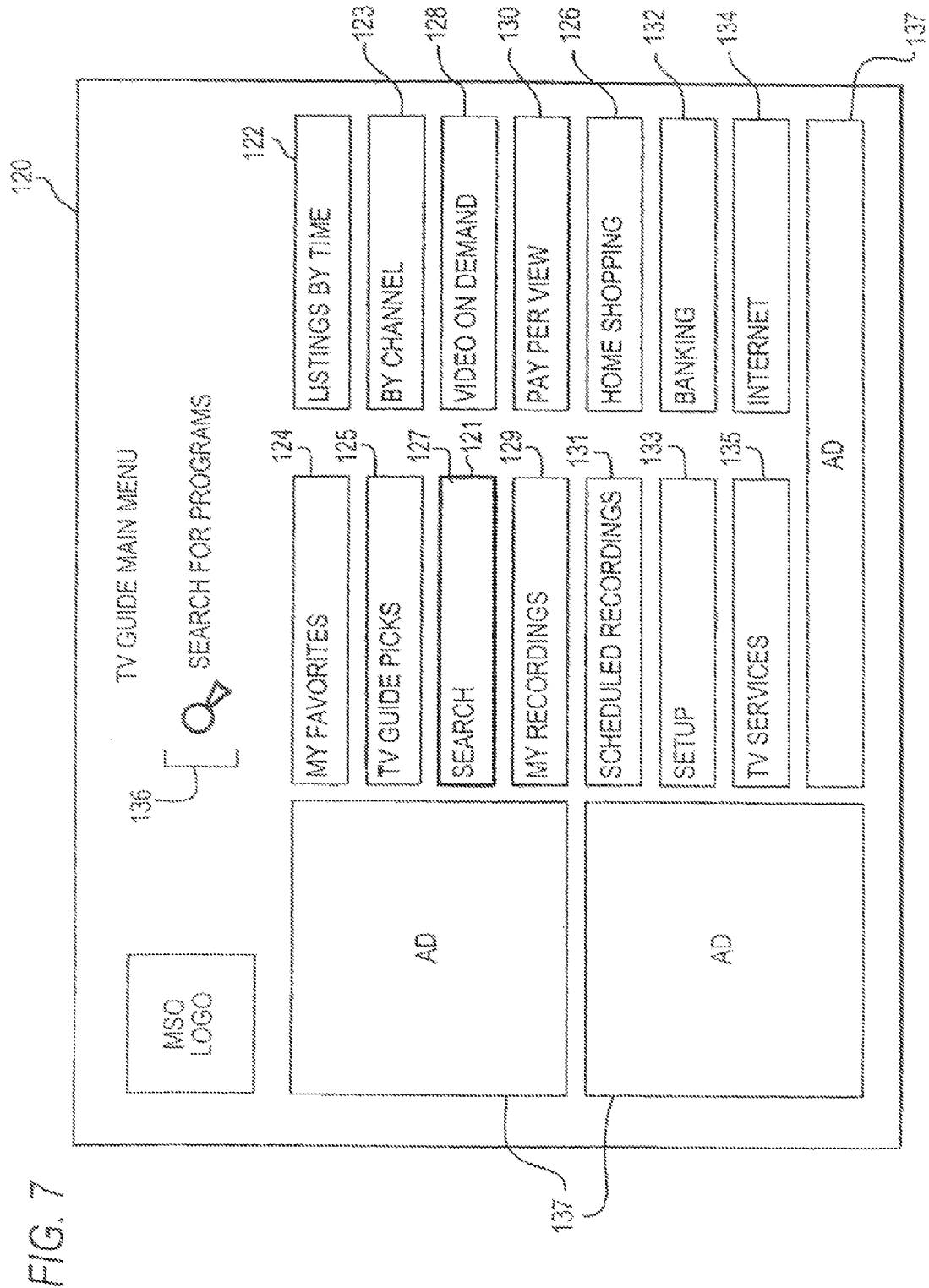
FIG. 7 is an illustrative menu screen in accordance with the present invention.

An illustrative menu 120 that may be displayed on the user's display screen is shown in FIG. 7. As shown in FIG. 7, menu 120 may provide the user with an number of selectable options. The options shown in FIG. 7 are merely illustrative. Any suitable options may be provided if desired.

A user of user equipment 18 (e.g., a user of user television equipment 20 or a user of user computer equipment 22, or a user of any other suitable user equipment device) may invoke an interactive television menu such as menu screen 120 by pressing menu button 88 (FIG. 4). Remote control 72 (FIG. 4) or other user interface 118 (FIG. 6) may be used to position highlight region 121 on top of selectable options such as options 122-135. If the user selects option 122 or 123, a screen of program listings may be displayed. Option 124 may be used to display program listings for channels designated by the user as "favorites." Option 125 may be used to provide program listings selected for promotion by a service provider (e.g., a program guide service provider, a cable operator, etc.). Option 126 may be used to invoke a home shopping service. Options 127 may be used to search program listings by title, time, category, or any other criteria. Option 128 may be selected to display options related to video-on-demand services. Option 129 may be selected to display an interactive list of previously recorded recordings and option 131 may be selected to display an interactive list of programs scheduled for recording. Option 130 may be selected to display pay-per-view program listings and pay-per-view services options. If the user selects option 132, the user may be presented with an opportunity to access home banking functions. Option 133 may be selected to change system setup options and option 134 may be selected to launch a web browser or other application for accessing the Internet. Option 135 may be selected to access other interactive television services. When the user selects an option with highlight region 121 from menu screen 120, the user's selection may be described in information display region 136.

If desired, program guide screens such as menu screen 120 and other interactive television application screens may include selectable advertisements 137. Any suitable advertisements may be provided, including panel advertisements, banner advertisements, advertisements provided between program listings, advertisements provided on certain program listings or other portions of the screen, or any other suitable advertisements. A user may use cursor keys 82 of remote control 72 (FIG. 4) to position a highlight region on an advertisement of interest and may select the highlighted advertisement using OK key 84. Users of other user interfaces may make appropriate selections using the buttons or controls available through those interfaces (e.g., using voice commands if the user interface involves a voice recognition arrangement, etc.).

Figure 8:
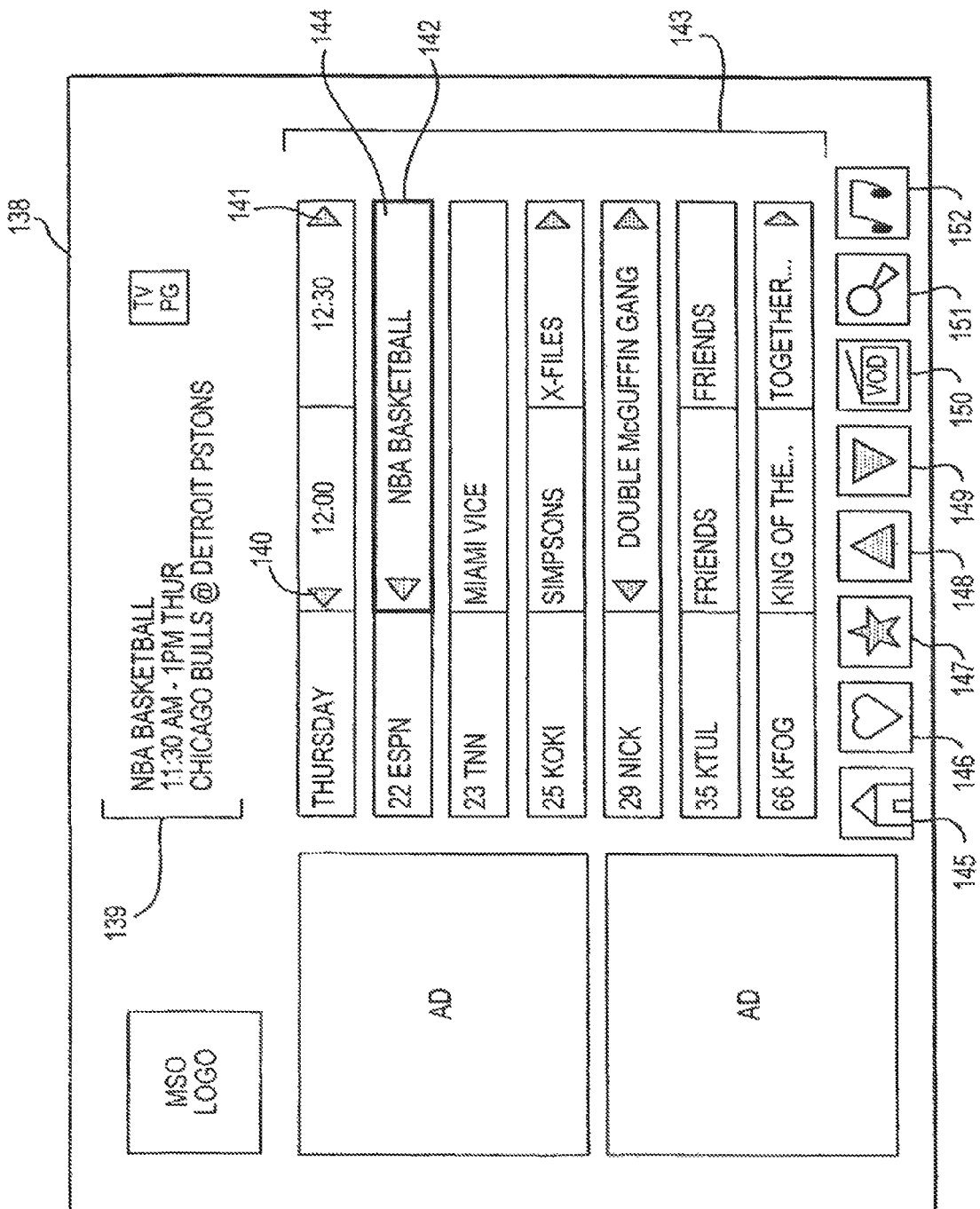
FIG. 8 is an illustrative program guide screen in accordance with the present invention.

An illustrative program guide screen 138 that may be displayed for the user is shown in FIG. 8. Program guide screen 138 may be displayed, for example, when the user selects program listings option 122 of FIG. 7, when the user selects a suitable option from within an interactive television program guide application or other interactive television application, or when the user presses an appropriate remote control button such as guide button 95 or otherwise uses user input interface 118 to indicate a desire to view program listings.

Program guide screen 138 may contain a grid or list of program listings 143. Program listings 143 may include program titles, channels, scheduled broadcast times, and any other suitable program schedule information. Highlight region 142 may be used to select a desired program listing 144. Program Information for selected programs may appear elsewhere on program guide screen 138 (e.g., in program information display region 139). If the user presses OK key 84 when a program listing for a current program is highlighted, the interactive television application may tune to the channel for that program. If the user presses OK key 84 when a program listing for a future program is highlighted, the interactive television application may provide the user with an opportunity to set a reminder for that program or to record that program.

Other functions that the interactive television application may provide include the ability to set favorites or establish preferences or other settings. For example, the user may select a particular channel for the program guide to automatically tune to when the user equipment is turned on. The user may also select favorite programs, favorite channels, etc. The program guide or other interactive television application may provide the user with the ability to establish parental control settings, the ability to search for programming of interest, and the ability to view program descriptions, advertisements, text, graphics, and video, etc. These are merely illustrative examples of interactive television functions that may be provided by interactive television system 10. Other suitable interactive television functions may be provided if desired.

A user may access program listings (e.g., program listings of the type shown in FIG. 8) by using the interactive television application to select an on-screen option such as option 122 and 123 of FIG. 7, by pressing a dedicated guide button such as guide button 96 on remote control 72, by selecting any other suitable button or on-screen option, etc. In the example of FIG. 8, program listings are currently being displayed for television programs that air between 12:00 noon and 1:00 PM. As shown by arrows 140 and 141, the user may use right or left cursor keys to navigate to other times (e.g., to direct the interactive television application to display appropriate screens of program listings 143 for different time periods). If desired, the user may select options or press keys (or use user input interface 118 to otherwise enter suitable commands) that direct the interactive television application to display program listings organized by channel, by genre, by service type (e.g., pay-per-view or regular broadcast television), etc.

Selectable options, such as options 145, 146, 147, 148, 149, 150, 151, and 152, may be provided as part of program guide screen 138 or any other program guide screen for providing access to various interactive television application features. For example, option 14S may be used to display a home screen or main menu, such as menu screen 120 of FIG. 7. Option 146 may be selected to display program listings for channels designated by the user as "favorites." Option 147 may be selected to display listings of recommended programs using highlight region 142. Scroll indicators 148 and 149 may be used to navigate down and up through program listings. Option 150 may be selected to display information related to video-on-demand services. Option 151 may be selected to search television program listings by title, time, category, or any other suitable criteria. Option 152 may be selected to display information related to digital music services.

Figure 9:
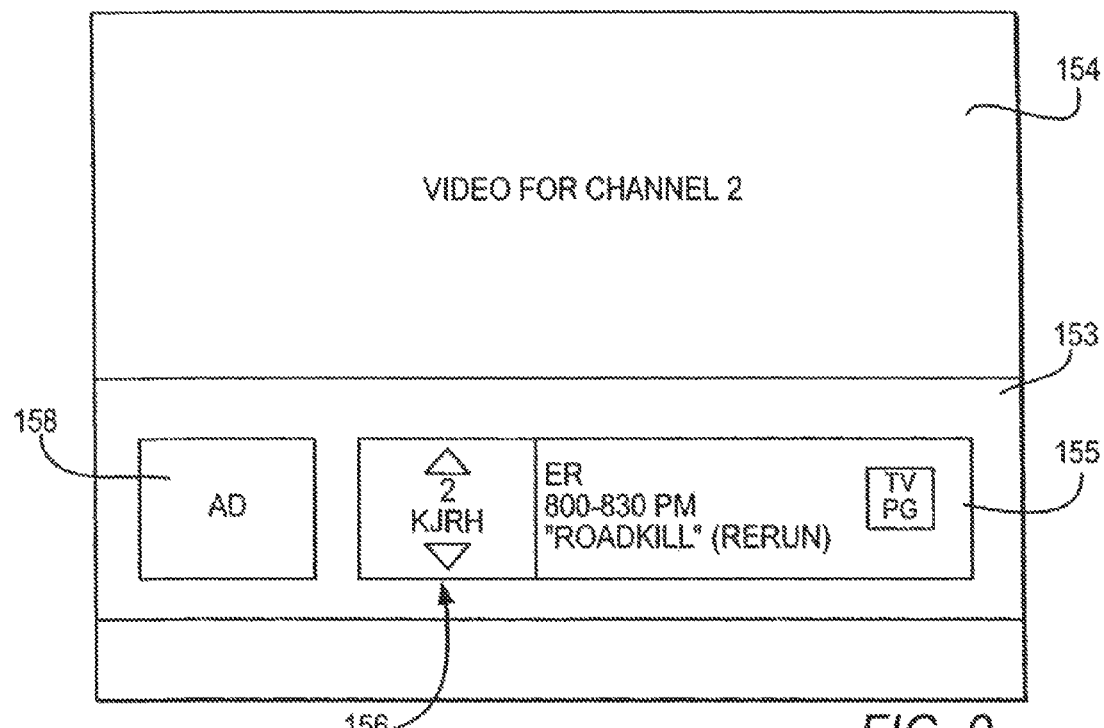
FIG. 9 is an illustrative display screen showing how a flip banner that contains program listings information for the current channel may be displayed as an overlay over video of the current channel in accordance with the present invention.

The interactive television application may provide a "flip" tuning feature. As shown in FIG. 9, when the user invokes the flip mode, flip display 153 may be provided over a portion of a channel (i.e., channel 2) that the user is currently tuned to and is watching on display screen 154. Flip display 153 contains information (in region 150) on the program 155 appearing on the current channel (channel 2) to which the set-top box 60 or other user equipment is tuned. The user may change the channel using channel up and down keys on the remote control or using user interface 118 to issue other suitable channel change commands. This simultaneously changes the channel to which the set-top box 60 or other user equipment is tuned and the channel information displayed in region 156 (and the associated program information 155).

The flip display 153 may be removed manually or automatically (e.g., after a few seconds or other suitable time period of user inactivity). When the user starts changing channels again, the flip display 153 may be displayed again.

The flip feature of the interactive television application therefore allows the user to view program information for the channel that the user is currently viewing as the user changes channels. In the example of FIG. 9, the flip display 153 is displayed in the form of an overlay on top of the current channel. If desired, the video for the current channel may be reduced in size and the flip information (e.g., the program title and channel information for the current program) may be displayed at a location on the periphery of the reduced-size video (e.g., at the bottom, side, or top of the reduced-size video).

An advertisement 158 or other content may be provided in the flip display region if desired. Other optional information that may be displayed in flip display 153 includes information on the scheduled broadcast times for the program 155, ratings information, program descriptions, and other program-related information.

Figure 10:
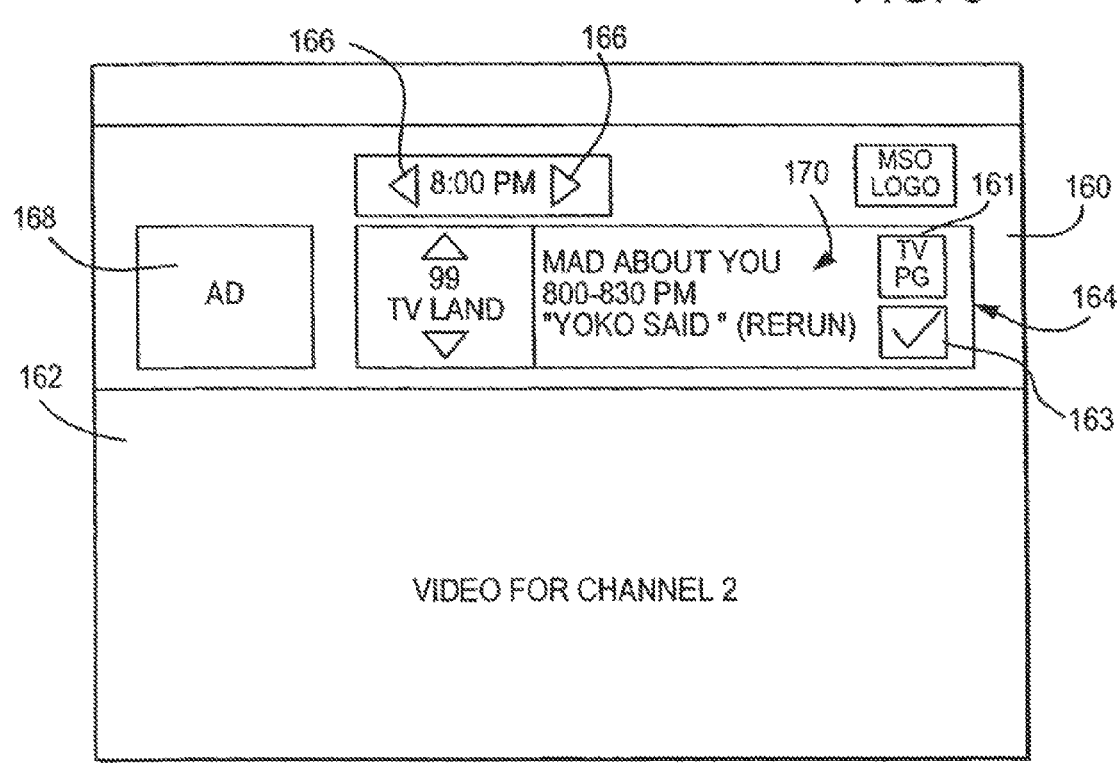
FIG. 10 is an illustrative display screen showing how a browse banner chat contains program listings information for a channel that may differ from the current channel may be displayed as an overlay over video of the current channel in accordance with the present invention.

The interactive television application may also be used to provide a browse feature. As shown in FIG. 10, when the user invokes the browse feature (e.g., by pressing an up or down cursor key), browse display 160 may be displayed as an overlay over a portion of the channel (i.e., channel 2) that is being displayed on the user's display screen 162 and to which the user is currently tuned. Browse display 160 may initially contain information on the current channel. For example, browse display 160 may, when initially invoked by the user, contain the title of the current program and information on the current channel such as the current channel number, call letters, and network logo.

When the user presses the up or down cursor key (or enters other suitable commands using user interface 118), the browse display may be changed to display information on the programming available on other channels. In the example of FIG. 10, the user has pressed the cursor keys repeatedly, until the user has browsed to channel 99. The video that is being displayed on display screen 162 has not changed in this example (channel 2 is still being displayed).

As indicated by arrows 166, the user may use right and left cursor keys 82 (or other suitable controls) to browse to other time slots (e.g., to view information related to programming that is scheduled for broadcast at a later time). Browse display 160 may contain an advertisement 168, information 170 on scheduled program times, program descriptions and other program-related information and icons such as cheek icon 163 (to indicate that a reminder has been set for a given program) and ratings icon 161.

If the user locates a currently available program of interest on another channel, the user may press the OK key 84 to direct the interactive television application to tune the user equipment to that channel.

The browse display 160 may be removed manually or may be removed automatically from display screen 162 after a suitable period of user inactivity (e.g., after a few seconds or a minute or two).

If desired, the browse display can be displayed on the periphery of the video for the current program rather than as an overlay. The video for the current channel may be reduced in size accordingly.

Figure 11:
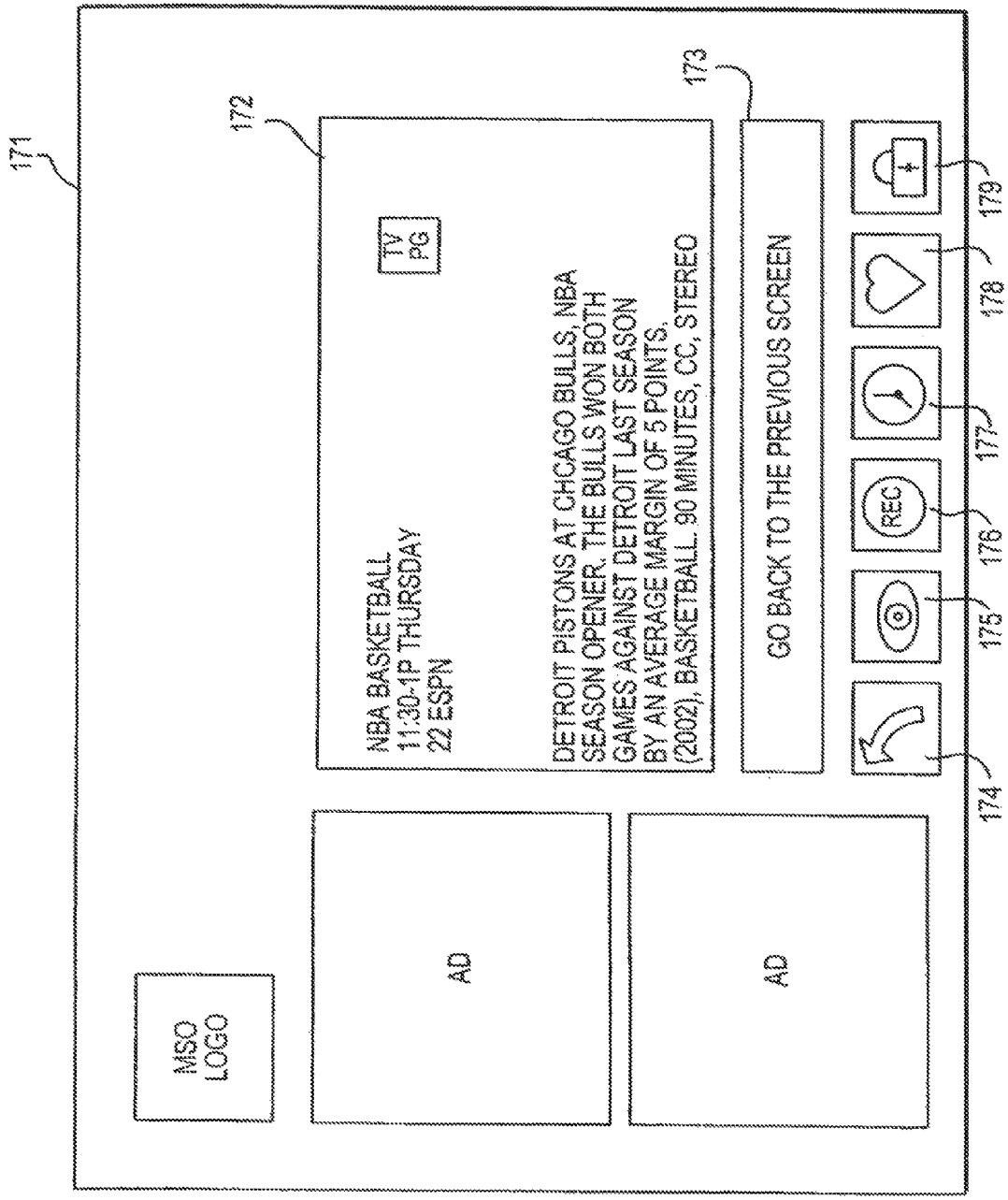
FIG. 11 is an illustrative program guide screen in accordance with the present invention.
Figure 12:
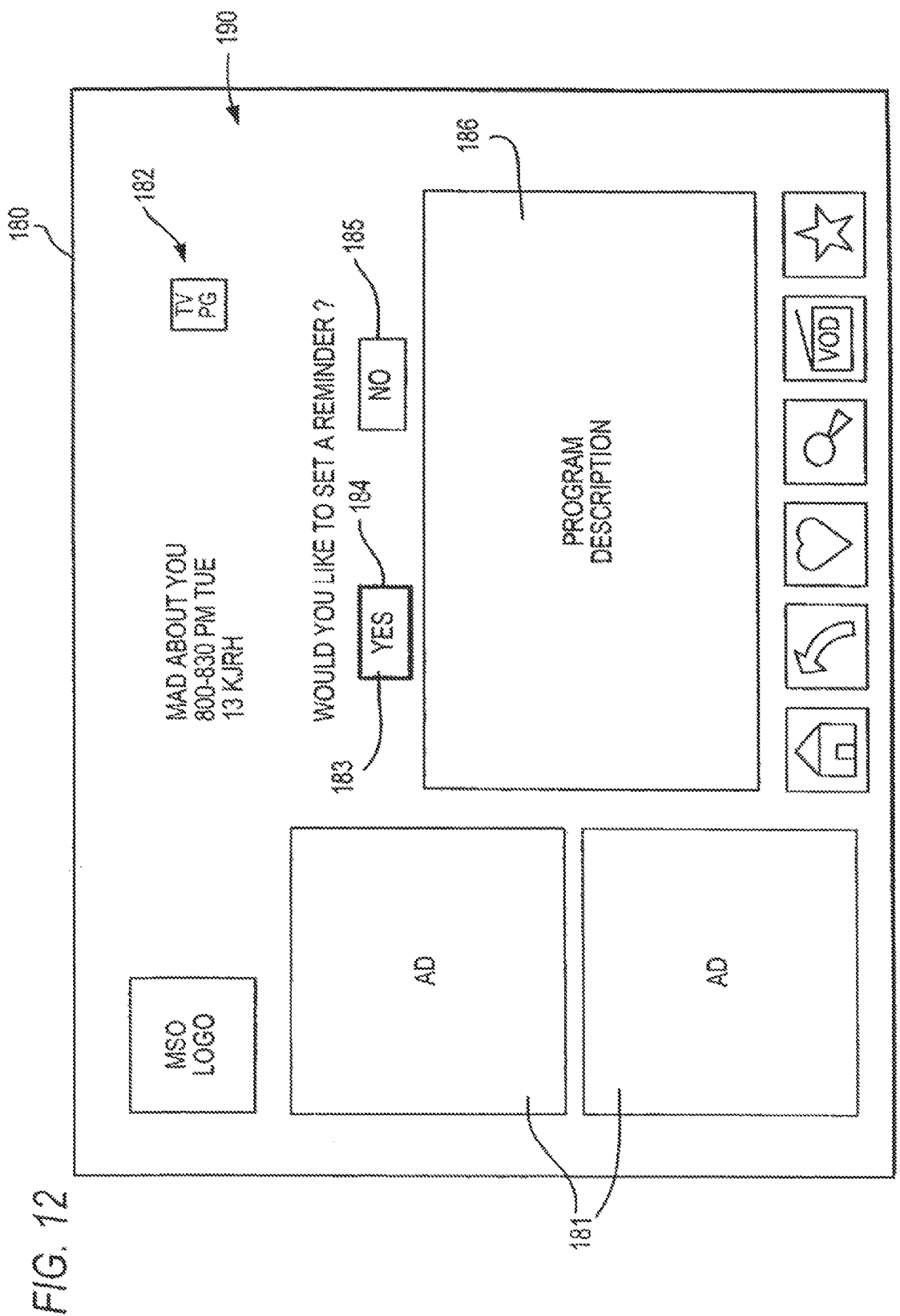
FIG. 12 is an illustrative display screen showing how an interactive television application may provide a user with an opportunity to set a program reminder in accordance with the present invention.

When the user has indicated interest in a program (e.g., by positioning highlight region 142 of FIG. 8 on top of a given program listing, by tuning to a program, by viewing a program listing on the flip banner of FIG. 9 or the browse banner of FIG. 10, etc.), the user may press info key 90 (FIG. 4) to obtain more information for that program. Illustrative info screens 171 and 180 that may be displayed when a user presses info button 90 are shown in FIGS. 11 and 12, respectively. Screens such as screens 171 and 180 may be provided when a user selects a program listing from a interactive television application screen (e.g., program guide screen 138 of FIG. 8). Info screen 171 of FIG. 11 may include a detailed description 172 of a program selected by the user. Description 172 may include, for example, the title, time, channel, and rating of the program, or any other suitable information. As in FIG. 8, selectable options may be provided as part of info screen 171 to provide access to various interactive television application features. For example, option 174 may be used to return to the previous program guide screen. Option 175 may be used to tune to the selected program or set a reminder for the selected program (e.g., the program for which information is displaying in description 172). Option 176 may be selected to display recording options and services for the selected program. Option 177 may be selected to display options for adding a reminder for the selected program. Option 178 may be used to display options for adding the selected program or channel to a user's favorites, and option 179 may be used to display options for providing a parental lock on the selected program. Selectable options for other interactive television application features may also be provided. A highlight region may be used to select any of the selectable options provided by a program guide screen. Information describing a highlighted option may be provided, for example, in information display region 173.

Information screens may include advertisements. For example, info screen 180 of FIG. 12 may include selectable advertisements 181. Information regions on screen 180 such as title region 182 and program description region 186 may be used to display information on the selected program such as title information, ratings information, plot summary information, information about actors, genre, critics ratings, etc.

Region 190 may be used to inform the user of the possibility of setting a reminder for the selected program, of tuning to the channel showing the selected program, of recording the selected program, of purchasing the selected program if it is a pay-per-view program, of parentally controlling the selected program, of configuring a related profile or preference settings, or performing any other suitable action related to the selected program. Region 190 may also be used to provide additional information related to the selected program. The user may position highlight region 184 on top of either yes option 183 or no option 185 or any ocher suitable options (e.g., options to tune to the channel, to record the program, to purchase the program, to parentally control the program, to configure the preference settings, etc.). When the user presses the OK key 84, the interactive television application may then take appropriate actions. If the user opts to set a reminder for the program listed in the info screen 180, the interactive television application may display a pop-up reminder overlay on top of the video for the channel that the user is currently watching just before the program associated with the reminder is scheduled to begin, or any suitable display screen that is active at the time that the reminder pops up (e.g., a program listings screen).

Figure 13:
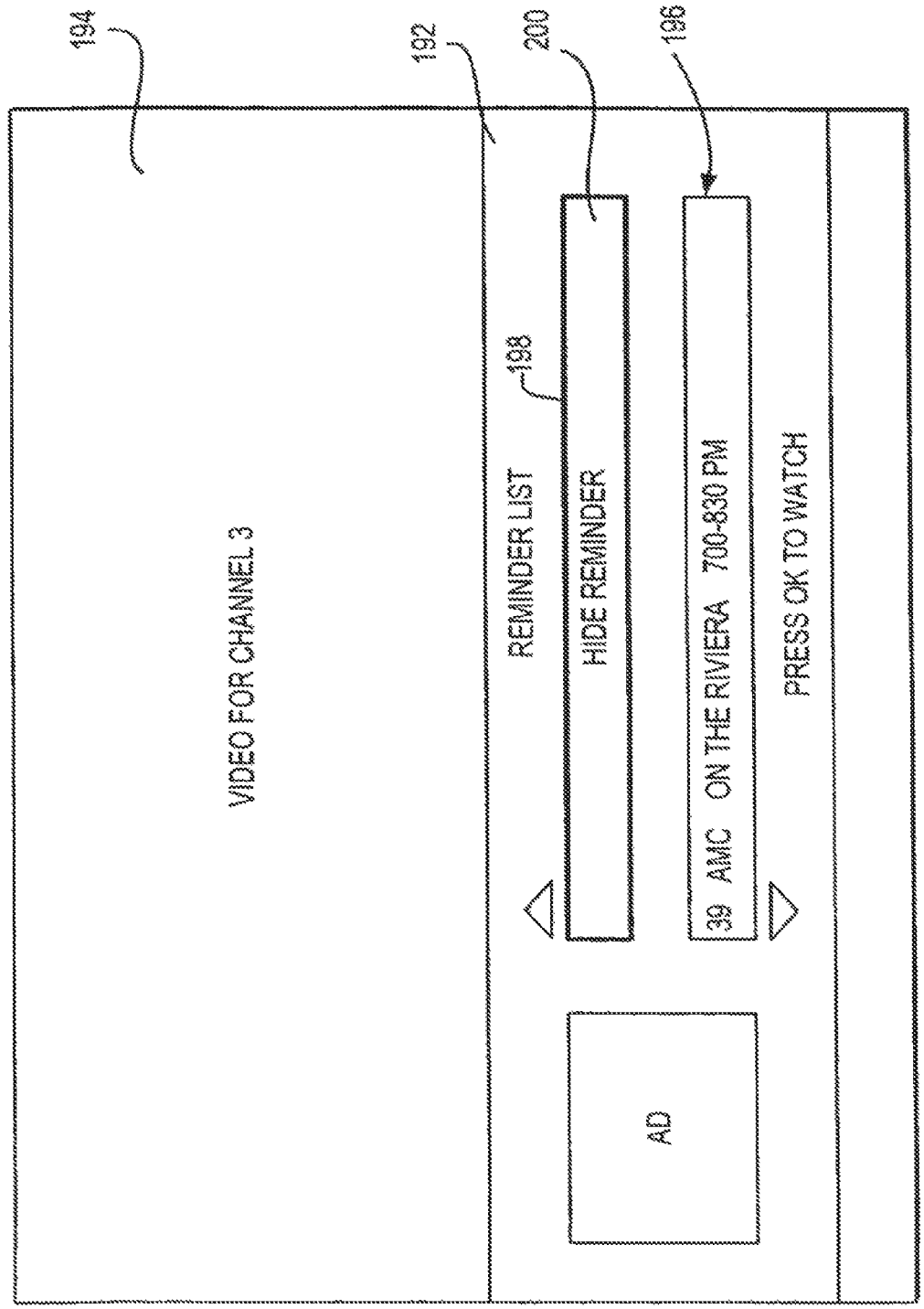
FIG. 13 is an illustrative display screen showing how a reminder may be provided to a user in accordance with the present invention.

An illustrative reminder is shown in FIG. 13. In the example of FIG. 13, the user is watching channel 3. The current time is 6:58 PM. Previously, the user set a reminder for the program "On The Riviera," which is scheduled to be shown on channel 39 at 7:00 PM. Because the program for which the user set the reminder is just about to begin, the interactive television application displays reminder list 192 as an overlay on top of the video for channel 3 that is being presented on display screen 194. The reminder list may contain a list of one or more programs for which the user has set reminders. In the example of FIG. 13, one program listing 196 ("On The Riviera") is displayed.

The user can tune to a program by selecting that program from the reminder list 192. For example, the user may position highlight region 198 on listing 196 and may select that listing by pressing the OK key 84. The interactive television application may then tune the user to the channel for the desired program (i.e., channel 39 in this example).

The user can close the reminder list by pressing the OK key 84 while hide reminder option 200 is highlighted.

The reminder list may be displayed at any suitable time (e.g., at 0-15 minutes before the program of interest is to begin, at a user-selected time before that program, etc.). Moreover, the reminder list may be displayed around the periphery of the video for the current channel and the video for the current channel may be displayed in a reduced-size window. These are merely illustrative examples. Any suitable arrangement may be used to notify the user of upcoming programs or in-progress programs for which the user has set reminders and other programs of interest.

Figure 14:
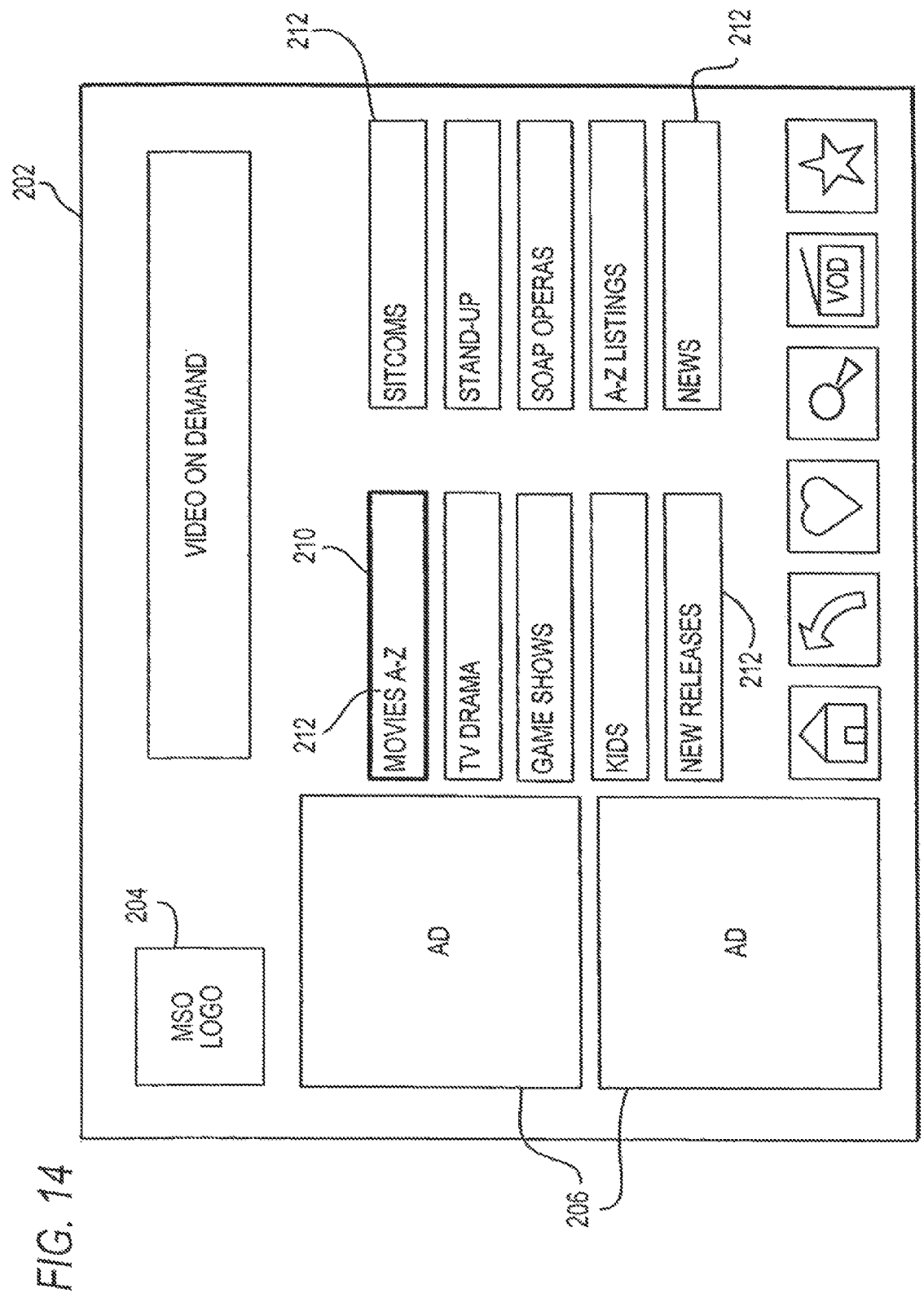
FIG. 14 is a display screen showing an illustrative video-on-demand menu that may be used to select a category of video-on-demand content in accordance with the present invention.

The interactive television application may be used to provide the user with access to video-on-demand content. The user may, for example, be provided with an option such as video-on-demand option 128 on menu screen 120 of FIG. 7. When the user selects option 128, the interactive television application may display a screen such as video-on-demand categories screen 202 of FIG. 14. Screen 202 may include logos such as logo 204, selectable (or non-selectable) advertisements such as advertisements 206, and a screen title 208. The user may position highlight region 210 on an option 212 corresponding to a video-on-demand category of interest.

Figure 15:
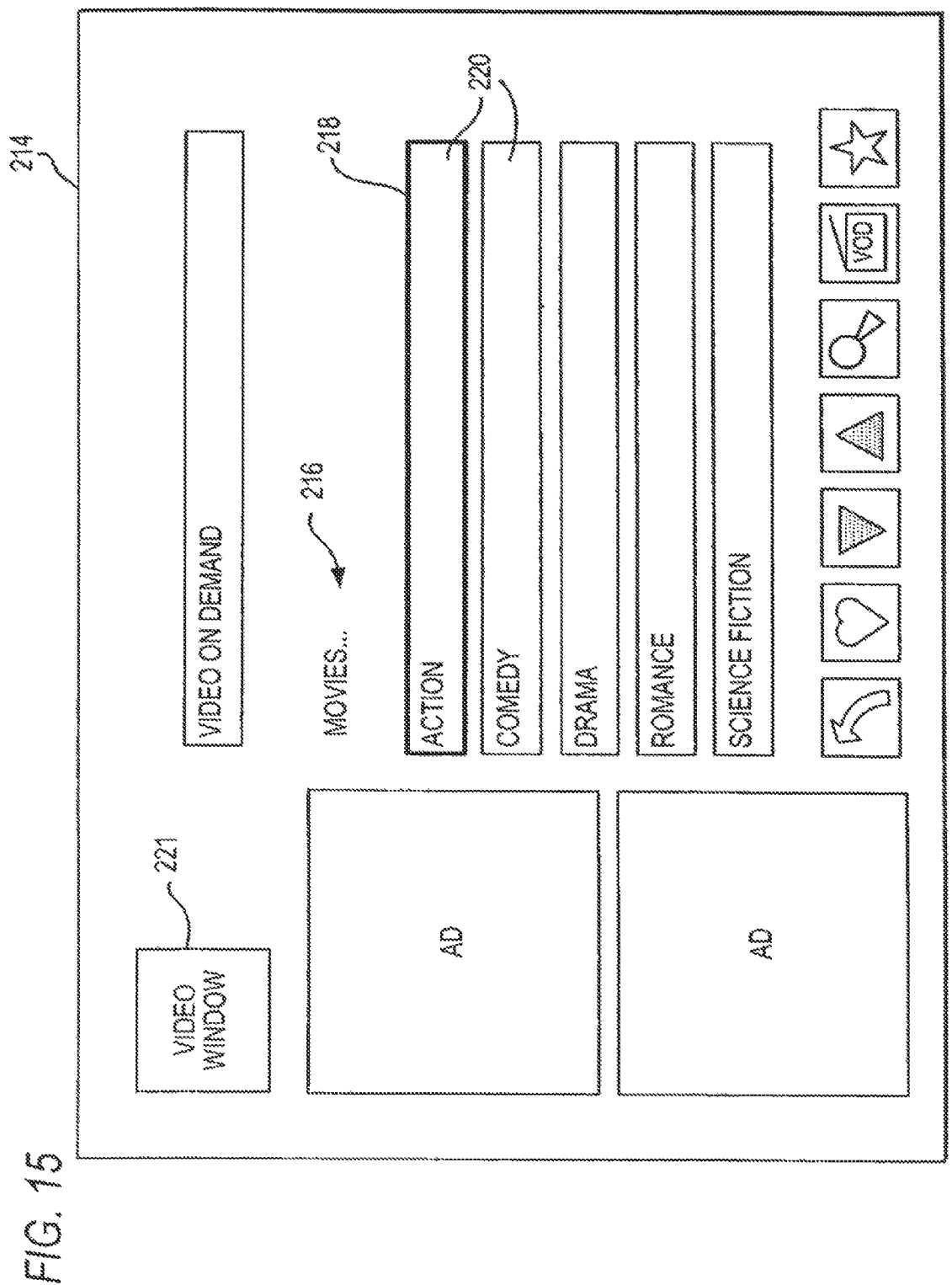
FIG. 15 is a display screen showing an illustrative video-on-demand menu screen that may be used to locate a desired type of movie in accordance with the present invention.

When the user selects the video-on-demand category of interest from screen 202, the interactive television application may display a display screen such as subcategory selection screen 214 of FIG. 15. In the example of FIG. 15, the subcategories screen 214 contains subcategory options 220 corresponding to movies, because (in this example) the user selected movies A-Z option 212 from screen 202 in FIG. 14. Video window 221 may be provided in any video-on-demand information screen and may provide information relating to a video-on-demand program selected by the user or any other suitable video information.

Figure 16:
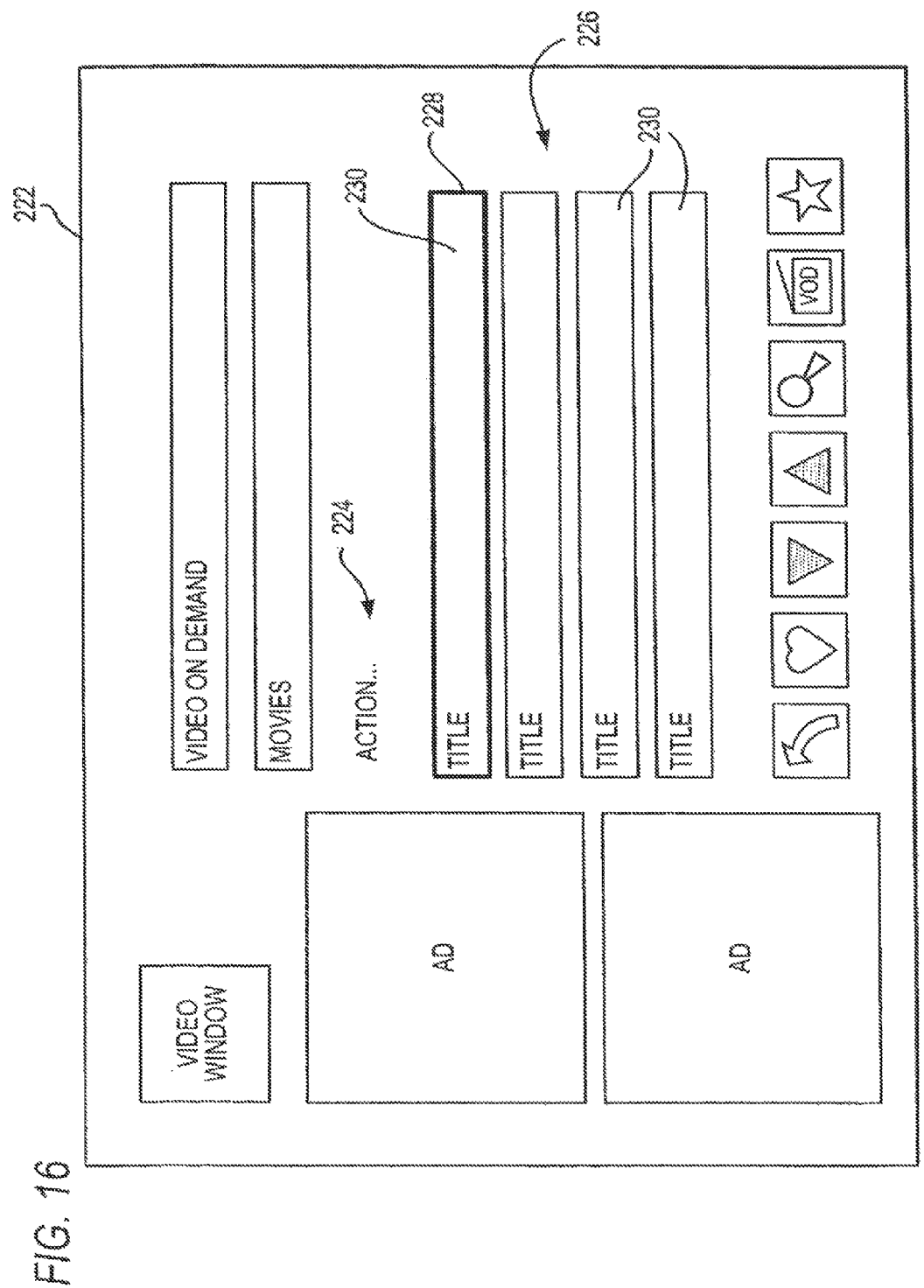
FIG. 16 shows an illustrative title menu that may be used to select a video-on-demand title of interest in accordance with the present invention.

The user may position highlight region 218 onto a desired subcategory 220 and may press OK key 84 to view a list of available video-on-demand content associated with that subcategory. An illustrative display screen 222 that the interactive television application may display for the user when the action subcategory option 220 (FIG. 15) is selected is shown in FIG. 16. As shown in FIG. 16, display screen 222 may include information identifying the selected Subcategory 224. Screen 222 may also include a list 226 of titles 230 (or other content indicators). The user may position highlight region 228 on a desired video-on-demand title 230 and may press the OK key to proceed with the selection of that title.

Figure 17A:
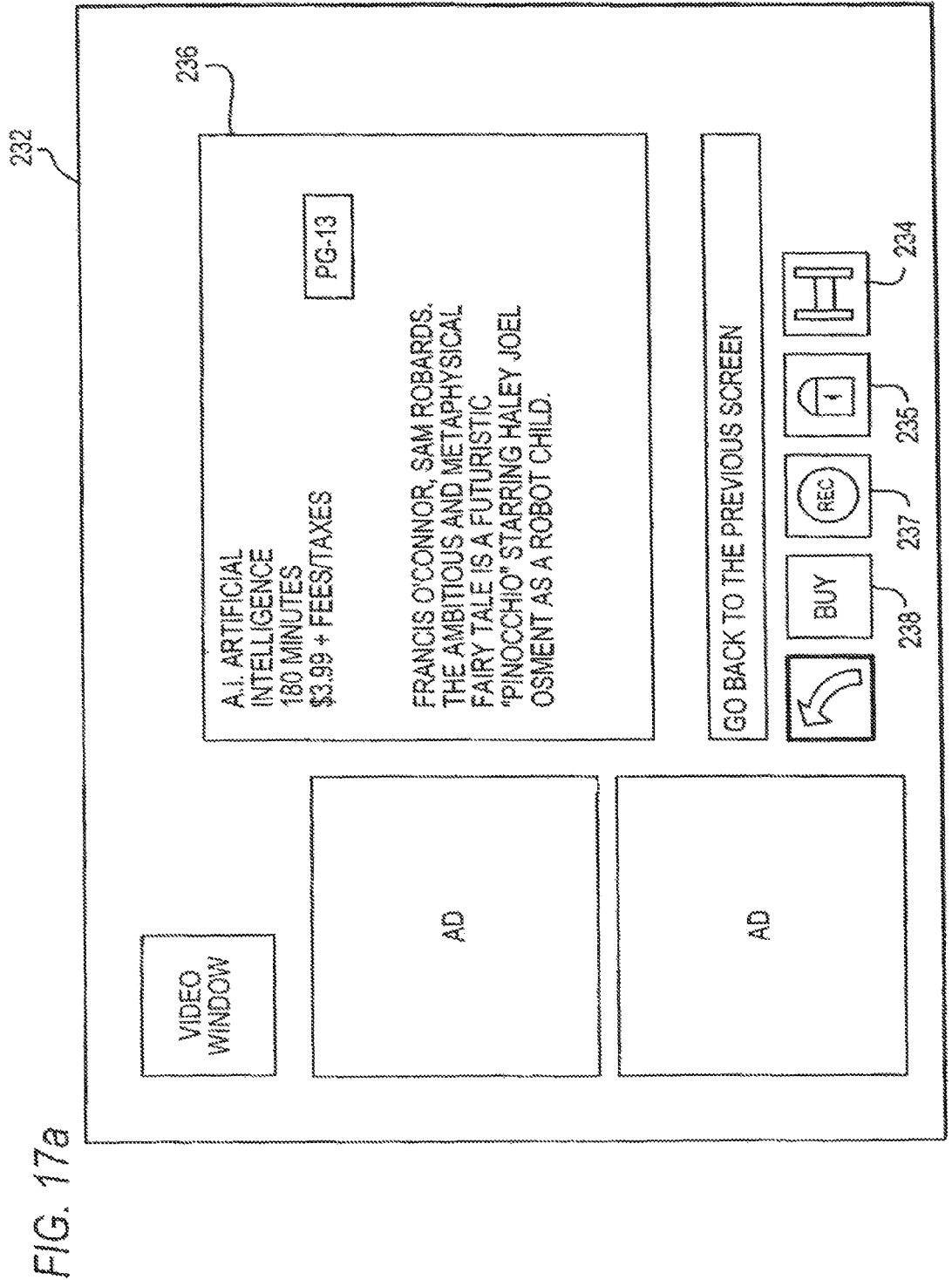
FIGS. 17a and 17b are illustrative video-on-demand information screens that may be used to access video-on-demand content in accordance with the present invention.

Selecting a desired video-on-demand title 230 from title selection screen 222 may direct the interactive television application to display a video-on-demand information screen such as information screen 232 of FIG. 17*a*. Screen 232 may include information 236 on the selected video-on-demand content, such as title, run time, price, rating, and a description of the selected video-on-demand content.

Selectable options, such as options 234, 235, 237, and 238 may be provided as part of screen 232 to provide access to various interactive television application features. For example, option 238 may be selected to access options for ordering the selected video-on-demand content. Option 237 may be used to access options for recording the selected content, and option 235 may be used to access options for setting parental control locks for the selected content. If the user selects option 334, the interactive television application may display a video clip containing information on the video-on-demand content of interest (e.g., a promotional video such as a preview, a trailer, a review, etc.). The video clip may be delivered to the user equipment 18 from a server such as server 36 or server 56 of FIG. 1 or from equipment at a service provider such a service provider 50. The interactive television application may also provide the user with additional information on the video-on-demand content in response to the user selecting option 234. Other suitable selectable options may also be provided on screen 232 (e.g., a program package Information and purchase option, options for searching program listings for related content, etc.).

Figure 17B:
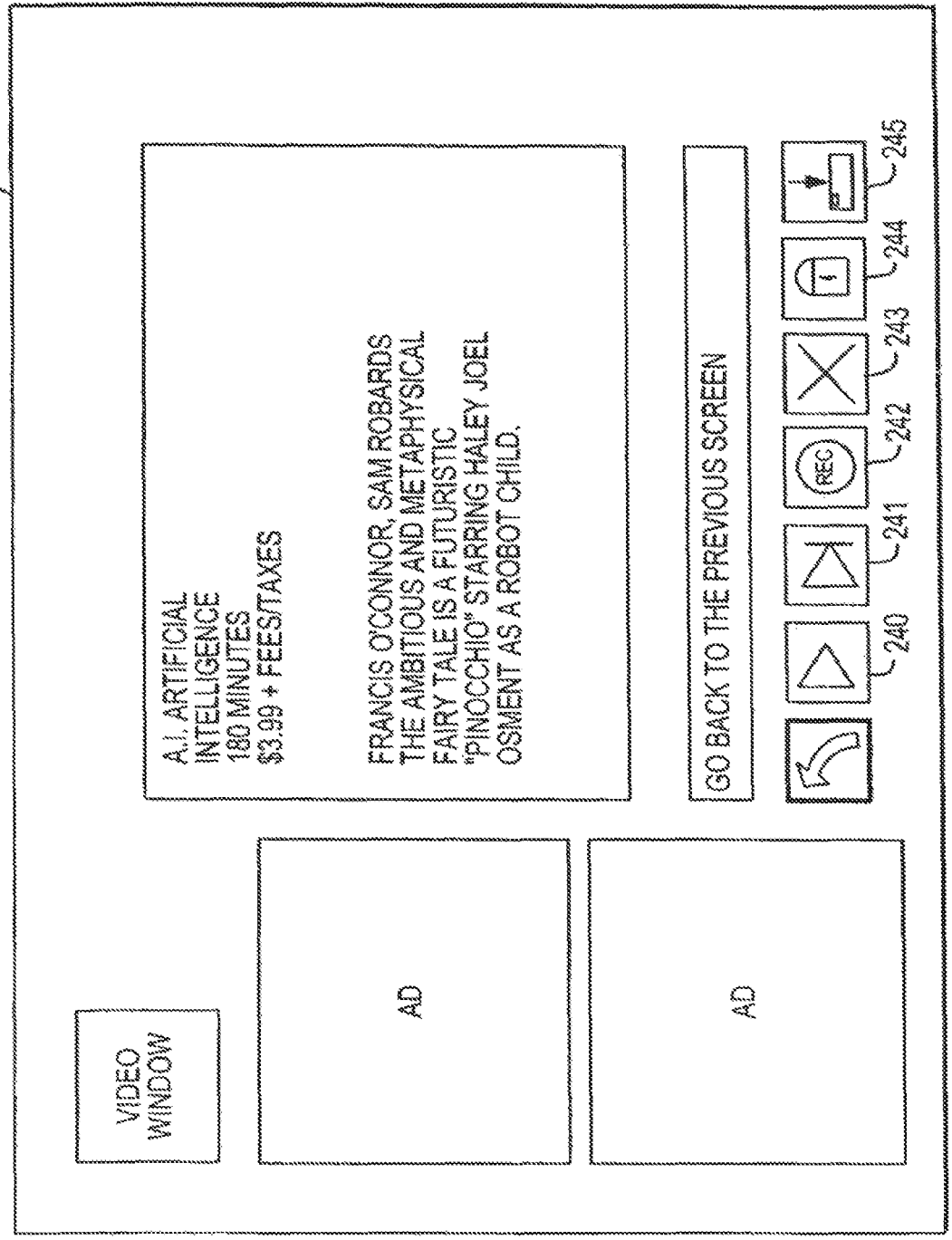

If a user requests information for video-on-demand content that has already been ordered, the interactive television application may provide video-on-demand information screen such as screen 239 of FIG. 17*b*, which may include selectable options different than those provided for screen 232 of FIG. 17*a*. For example, option 240 may be used to start playing selected video-on-demand content from the program position most recently viewed. Option 241 may be used to present the selected content from the beginning, and option 242 may be used to access options for recording the content. Option 243 may be used to remove the selected content from a listing of the ordered and available content. Option 244 may be used to access options for setting parental control locks for the selectee content. If the selected content is being accessed over a network or being provided by a network storage device, option 245 may be used to store the content on a local storage device.

In response to a user ordering selected content (e.g., by selecting an on-screen order option such as option 238 of FIG. 17*a*, or by using remote control 72 or any other suitable input device 118 to order content, etc.), the interactive television application may deliver the ordered video-on-demand content to the user equipment from a server such as server 36 or server 56 or from a service provider such as service provider 50. The communications paths and communications network 34 of FIG. 1 may be used in delivering the requested content.

The ordered video-on-demand content may be displayed for the user on a display screen such as video-on-demand playback screen 246 of FIG. 18. As shown in the lower portion of screen 246, interactive options may be displayed in a toolbar 248 or other suitable format. The interactive options 248 (or similar remote control buttons) may allow the user to rewind the video-on-demand content to the beginning, rewind, play, fast-forward, pause, stop delivery of the video-on-demand content, or perform other video playback options. The arrangement of FIG. 18 is merely illustrative. For example, the video-on-demand content may be played back in a reduced size window (of fixed or user-selectable size).

The interactive television system 10 may be used to support, video recorder functions. The video recorder functions may be supported using local arrangements (e.g., arrangements in which a personal video recorder or other suitable equipment in the user's home is used to record videos on a local hard drive or other storage device) and network-based arrangements (e.g., arrangements in which network equipment such as servers 36 and 56 or equipment at a service provider such as service provider 50 is used to store video and data for the user). Combinations of these arrangements may also be supported using system 10.

In a local video recorder arrangement (sometimes called a personal video recorder arrangement or local digital, video recorder arrangement), video recordings are scored locally on the user equipment. Information on which videos have been recorded may also be maintained locally. Program guide information (e.g., titles, rates, descriptions, categories, etc.) may also be maintained for the recorded videos. When a user desires to view s list of the recordings that the user has stored on the user equipment, the interactive television application may retrieve this information from local storage and may display this information to the user locally on user equipment 18. The user may then select a desired recording to play back.

In a network-based video recorder arrangement (sometimes called a client-server video recorder arrangement), videos may be stored on the network (e.g., at servers such as servers 36 and 56 or at a service provider such as service provider 50). Information on which programs have been recorded for the user may be stored locally and on the network (e.g., at servers such as servers 36 and 56 or at a service provider such as service provider 50).

Network-based recordings may be made in a number of ways. For example, some or all of the regularly-broadcast television programming provided by programming sources 12 may be automatically recorded or copies of this programming otherwise maintained on a suitable network storage device such as server 36, server 56, or equipment at a service provider such as service provider 50. If the user chooses to "record" a program, no actual recording need be made, because a copy of the desired program already exists on the system. With this type of arrangement, virtual recordings take the place of real, recordings.

The user may be given a "personal area" on the network. The personal area may be accessed when the user enters an appropriate personal identification number or by virtue of the user's connection to the network through a known or trusted communications path (e.g., when the user is connected through a dedicated cable path to a server at a cable system headend such as a server 56 at television distribution facility 14 of FIG. 1).

The personal area may be used to maintain a list of the video content that the user has recorded. Whenever the user directs the network-based video recorder portion of the interactive television system to make a recording, the system updates the user's personal area to make it appear as though an additional "real" copy of the requested recording has been made. The network-based video recorder implemented with this approach therefore conserves storage space, while providing users with the illusion of access to a network-based video recorder dedicated to their personal use.

Alternatively, there may be no personal area and each user may have access to ail previously recorded content to which they had rights when originally broadcast.

As another example, some or all of the content for which a user requests that a recording be made may be recorded by creating actual copies (e.g., digital recordings) of the requested content. These actual copies may be stored on network equipment (e.g., servers such as servers 36 and 56 or equipment at a service provider such as service provider 50).

Programs recorded onto a network server may be copied to a user's local storage.

A combination of these approaches may be used if desired. For example, some content may be automatically retained by the system (e.g., copies of popular programming). The user may make virtual recordings of this material. The presence of the virtual recordings may be reflected in the user's personal area. Other content may be stored in the form of actual recordings at the direction of the user (e.g., less popular content). The presence of these recordings may also be reflected in the user's personal area.

Regardless of the way in which network-based recordings (virtual or real) and local recordings are made, the interactive television application may be used to provide the user with interactive display screens that assist the user in making recordings, managing recordings (e.g., editing recordings, deleting recordings, renaming recordings, sending recordings to other users over the communications paths of FIG. 1, etc.), playing back recordings, viewing information about recorded programs, etc.

Figure 19A:
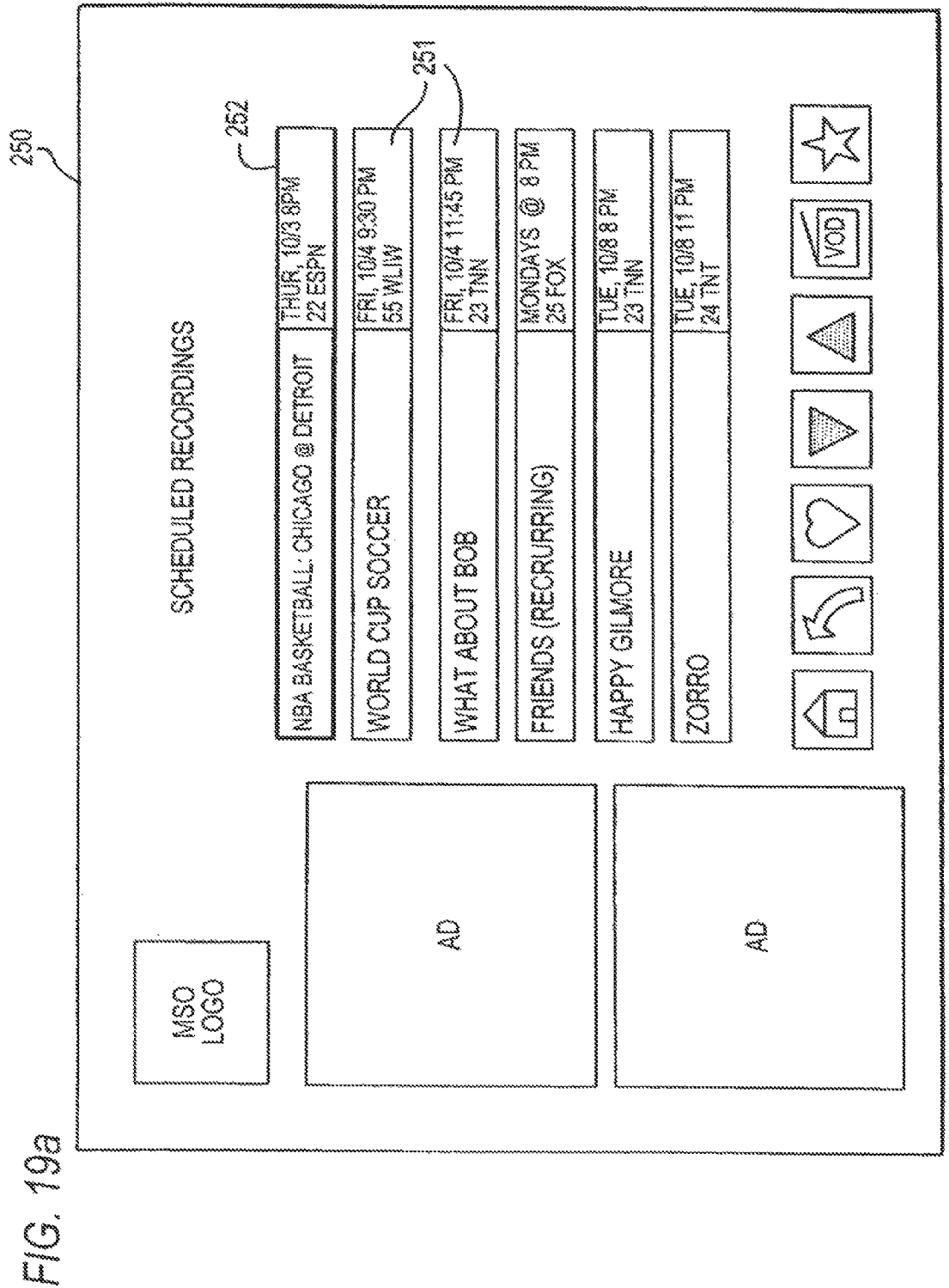
FIGS. 19a and 19b are illustrative display screens showing how a user's scheduled recordings may be presented and selected in an interactive list in accordance with the present invention.

Once a program has been selected by a user for recording, the selected program may be presented in an interactive list of programs scheduled to be recorded. An illustrative scheduled recordings screen 250 that may be displayed for the user on user equipment 18 is shown in FIG. 19*a*. Screen 250 may be displayed by the interactive television application when the user selects an option provided by another program guide screen, such as program guide screen 120 of FIG. 7 or any either suitable option. Screen 250 may include, for example, a list of programs scheduled to be recorded 251. A highlight region 252 may be used to select a scheduled recording from the list. The user may position highlight region 252 on a desired scheduled recording and select the scheduled recording using an appropriate key of remote control 72.

Figure 19B:
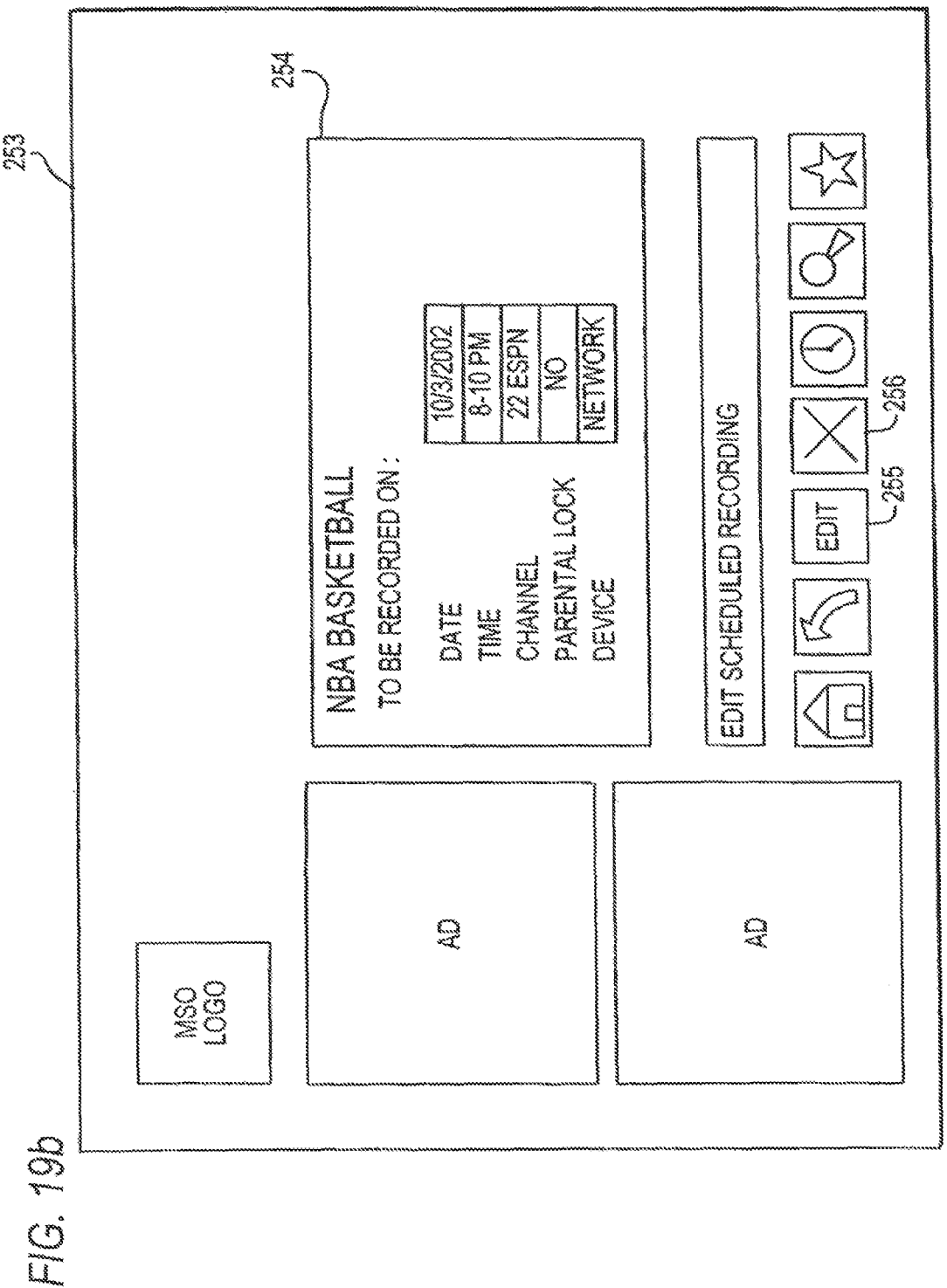

Information about a scheduled recording selected by the user may be presented in a screen such as screen 253 of FIG. 19b. Screen 253 may include scheduled recording information 254, which may show the date, time, and channel for which a program is to be recorded. Information 254 may also indicate which device has been designated to record the program and whether a parental lock is set for the program scheduled to be recorded. The user may edit information 254 by selecting edit option 255 using a highlight region. Other selectable options may be provided in screen 253, for example cancel option 256 which the user may select to cancel the scheduled recording.

Figure 20A:
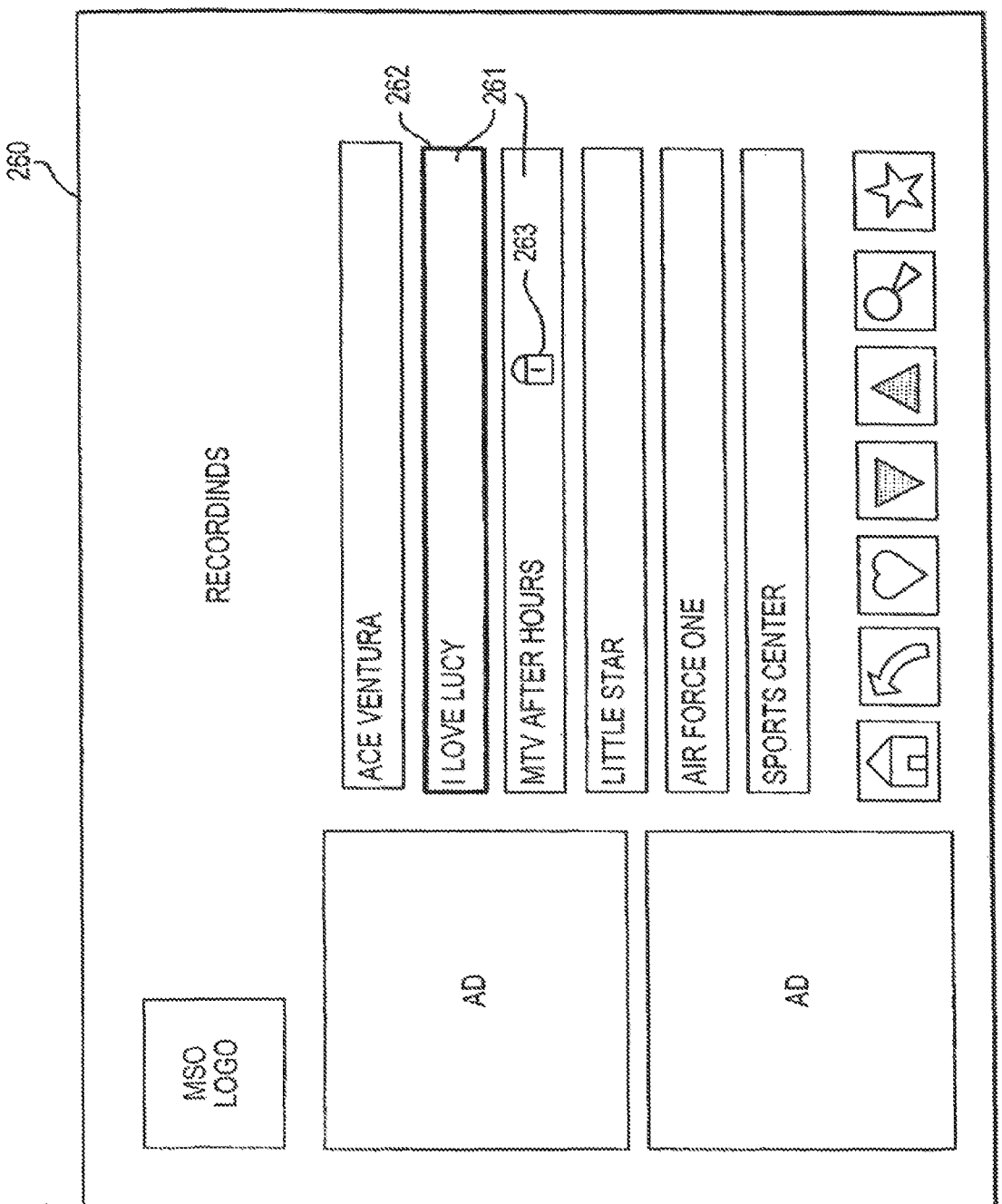
FIGS. 20a and 20b are illustrative display screens showing how a user's recordings may be presented and selected from an interactive list in accordance with the present invention.

Once a program has been recorded, a program guide screen may be presented to display recorded programs. An illustrative video recordings screen 260 that may be displayed for the user on user equipment 18 is shown in FIG. 20a. Screen 260 may be displayed by the interactive television application when the user selects an option provided by another program guide screen, such as program guide screen 120 of FIG. 7 or any other suitable option. The recordings 261 may be local recordings that are stored on the user's equipment 18 or may be real or virtual network-based recordings (e.g., network-based content stored on equipment such as server 36 or server 56 or at service provider 50). In a network-based video recorder environment with a personal area, screens such as screen 260 provide access to all or part of the user's personal area. The user may navigate through the personal area using remote control 72 or other suitable user interface 18.

Screen 260 may include a list of the user's recordings 261. Recording listings may include the time and channel the program was recorded or any other suitable information. The user may position highlight region 262 to select a recording of interest (e.g., to view that recording, to view information about that program, to delete the program, etc.). The user may position highlight region 262 on a desired recording and select the recording using an appropriate key of remote control 72.

Figure 20B:
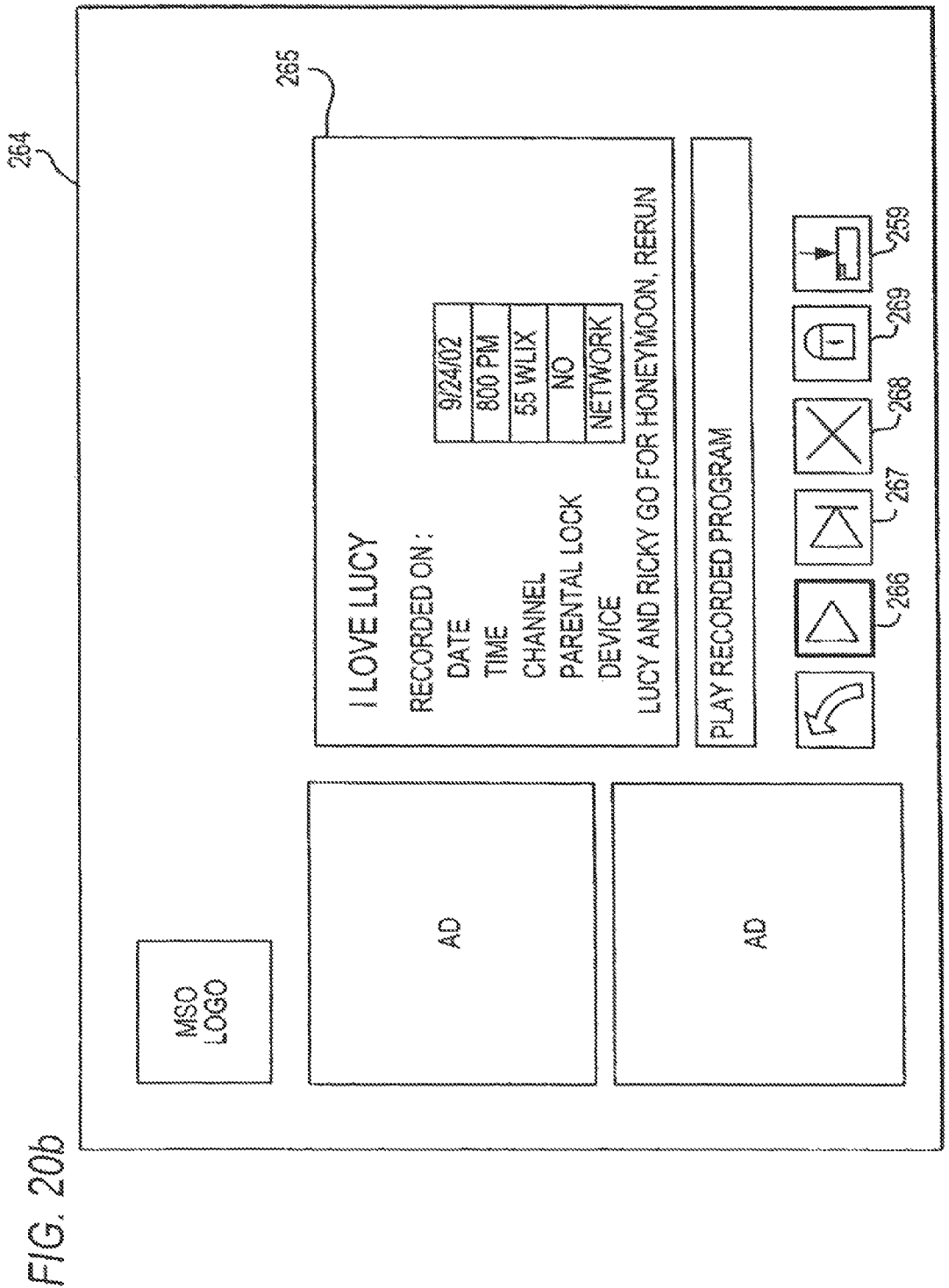

Information about a recording selected by the user may be presented in a screen such as screen 264 as illustrated in FIG. 20b. Screen 264 may include recording information 265, which may show the date, time, and channel the program was recorded. Information 265 may also show whether a parental lock is set for the recording and what device has been designated to score the recording. The user may play the recording by selecting option 266. The user may play the selected recording from the beginning by selecting option 267. Option 268 may be selected to delete the recording from the list of recordings. Option 269 may be used to set a parental lock for the selected recording. If the selected recording is being stored on a network video storage device, the user may select option 259 to transfer the recording to a local storage device. On-screen options may be selected using a highlight region and a remote control, or by any other suitable method.

Figure 21:
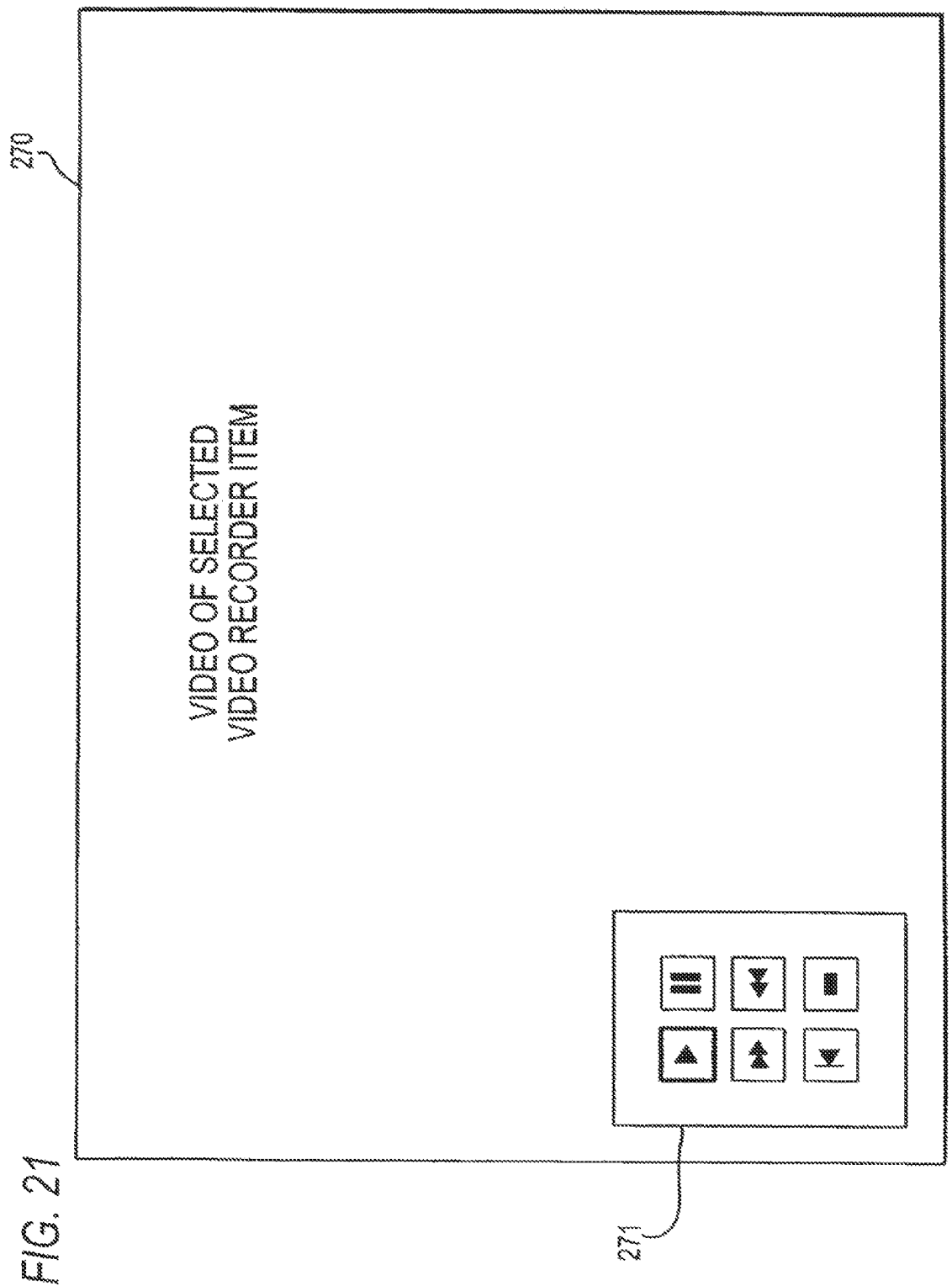
FIG. 21 is an illustrative display screen showing how video for a recording selected from the list of FIG. 18 may be displayed for the user in accordance with the present invention.

When a given recording is selected for play back, for example by selecting play option 266, a display screen such as display screen 269 of FIG. 21 may be presented. Display screen 269 may include the video 270 of the selected program that is being played back to the user and options 271 for controlling the video. Options 271 may, for example, include options that allow the user to rewind the video to the beginning, to rewind or reverse the video, to play the video, to fast-forward the video, to pause the video, or to stop the video. Control of these functions and other interactive television application functions may be supported using on-screen options, dedicated or multi-purpose keys on remote control 72 or other user devices, or other suitable arrangements involving user interface 118. When on-screen options are used, the options may be displayed in the form of one or more overlays on top of video 270 or video 270 may be provided in a reduced-size window and the options displayed outside of this window.

With the arrangement of FIGS. 20 and 21, the user can browse the user's recordings and can play back (and control the playback) of these recordings. Recordings that are stored locally on user equipment 18 may be played back by retrieving these recordings from the local hard drive or other storage on which the recordings are maintained. Recordings that are stored on the network may be played back from the network equipment on which the recording content is stored. User equipment 18 may receive such content in the form of a real-time video stream or a file download and the interactive television application may play back the received content using a display screen arrangement of the type shown in FIG. 21.

The user may record programming by indicating interest in a programs for recording by highlighting a program of interest on a suitable display screen provided by the interactive television application and pressing a record key, by selecting a program for recording from a flip or browse display, by tuning to a desired program and selecting art appropriate record button, by selecting a record option from an information screen, etc. For example, the user may highlight a program In a program listings screen such as screen 138 of FIG. 8, or may display a program listing of interest on a flip display such as flip display 153 of FIG. 9 or on a browse display such as browse display 160 of FIG. 10. When the user presses a suitable remote control key such as record key 86 of FIG. 4, the interactive television application may record the desired program.

Figure 22:
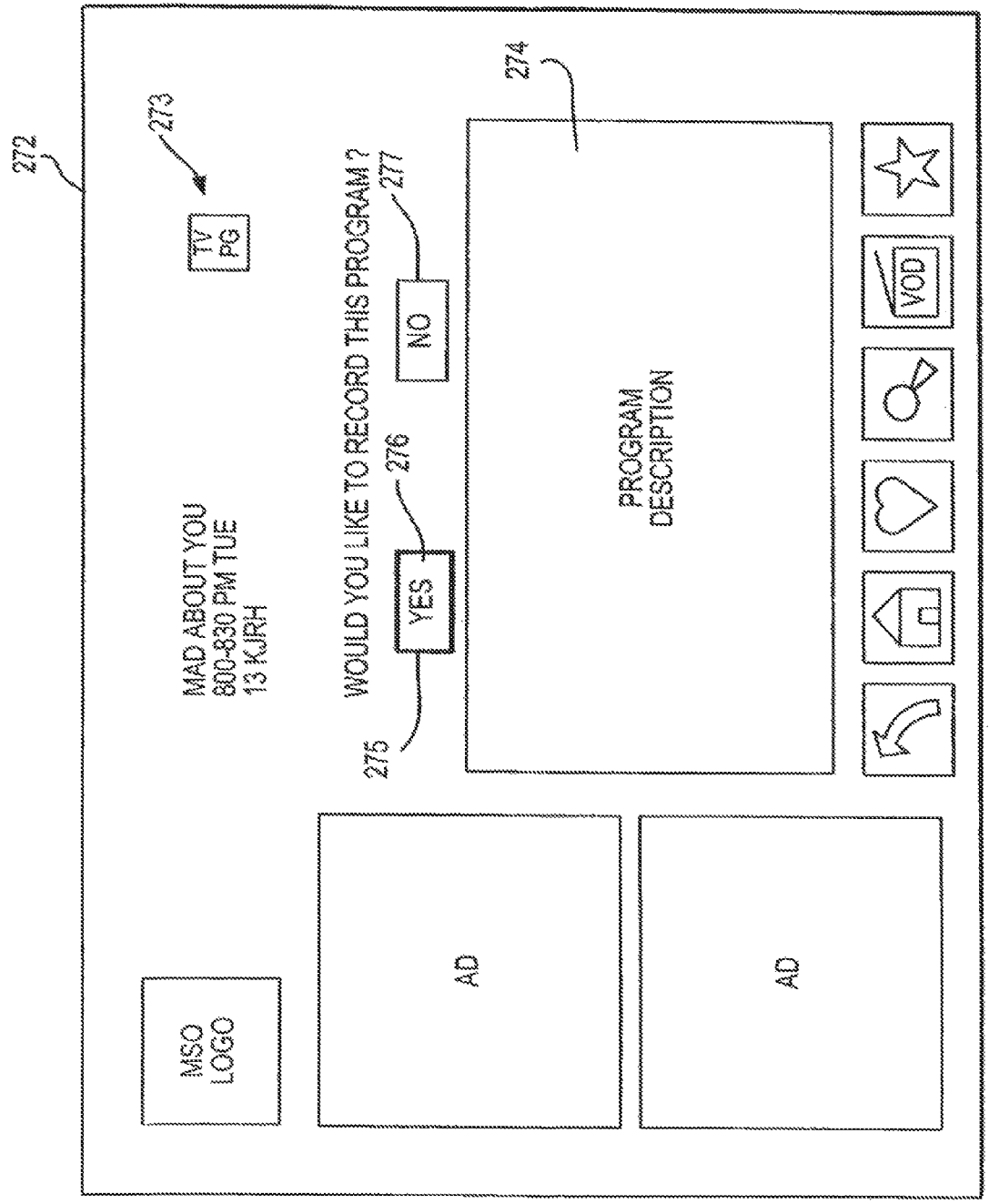
FIG. 22 is an illustrative display screen showing how the user may be provided with options that allow the user to schedule a recording of a desired program in accordance with the present invention.

The interactive television application may automatically record the program that the user selected or may provide one or more additional confirmation and information screens after the user presses the record key 86. As an example, the interactive television, application may display a screen such as record set-up screen 272 of FIG. 22. As shown in FIG. 22, screen 272 may include title and ratings information in region 273 and a program description 274. The user may be provided with information on the scheduled broadcast time for the selected program. If the user desires to record the program, the user may position highlight region 275 on top of YES option 276 and may press OK key 84. If the user does not wish to record the program, the user may position highlight 275 on top of NO option 277 and may press the OK key 84. If desired, other options such as series recording options, recording quality options, and buffer time options may be provided.

When the user directs the interactive television application to record a given program, the interactive television application will record the program using the local capabilities of user equipment 18 or using the network-based video recorder capabilities of the system 10, depending on the equipment of the user, the capabilities of system 10, and system and user settings.

After the program has been recorded, the user may use the interactive television application to view information on the user's recordings (e.g., using a display screen arrangement of the type shown in FIG. 20). These techniques for supporting recording functional icy in the interactive television application are merely illustrative. Any suitable arrangement for recording (as real recordings or as virtual recordings and locally or on network equipment) may be used if desired.

The interactive television application may allow the user to establish parental control settings. For example, the user may lock a particular program, a program rating, a channel, a type of content (e.g., violent or sexual content), or may establish a parental control setting that blocks all television viewing during a particular period of time. A user may be required to enter a personal identification number (PIN) to unlock blocked content.

With one illustrative arrangement, a parent (or other suitable user) may select a program to block by highlighting the program listing for that program in a suitable program listings screen (e.g., a screen such as screen 138 of FIG. 8). After highlighting the program to be blocked, the parent may press lock key 92 on remote control 72 (FIG. 4). The parent may also access options for setting parental locks by selecting an on-screen parental control lock option provided by the interactive television application (e.g., option 234 of FIG. 17a, option 244 of FIG. 17b, etc.).

Figure 23A:
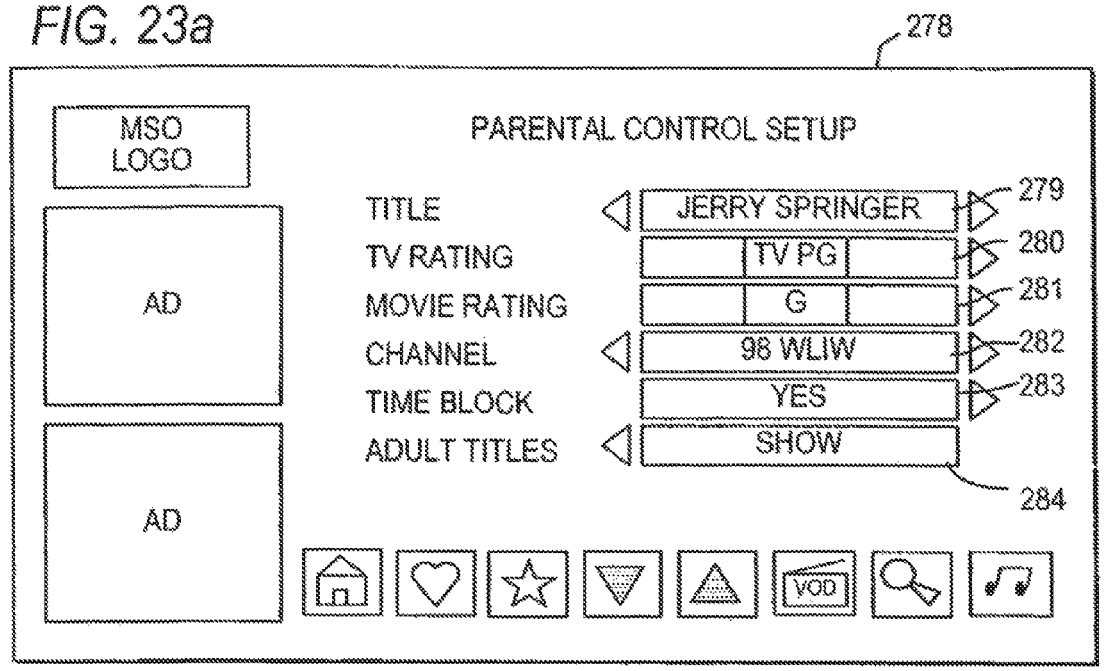
FIG. 23a is an illustrative display screen showing how a user may set parental controls for a given program in accordance with the present invention.

In response to a user selecting an on-screen option or remote control key to access parental control lock options, the interactive television application may display a display screen such as parental controls display screen 278 of FIG. 23a. Parental controls options may be accessed from a main menu, a selected program, or any other suitable program guide screen. Users may set parental, locks for a selected program or a range of programming by selecting from various criteria. For example, users may select to block programs according to title 279, TV rating 280, movie rating 281, channel 282, or any other suitable criteria. Block ratings options 280 and 281 may allow users to block all programming with a given rating (e.g., the same rating as the selected program or a user-input rating or range of ratings). The user may be provided with other options for applying parental lock settings by selecting, for example, (YES/NO) time block option 283. A user may also select to hide or show adult titles by selecting option 284. Other selectable options may also be provided in screen 278.

Figure 23B:
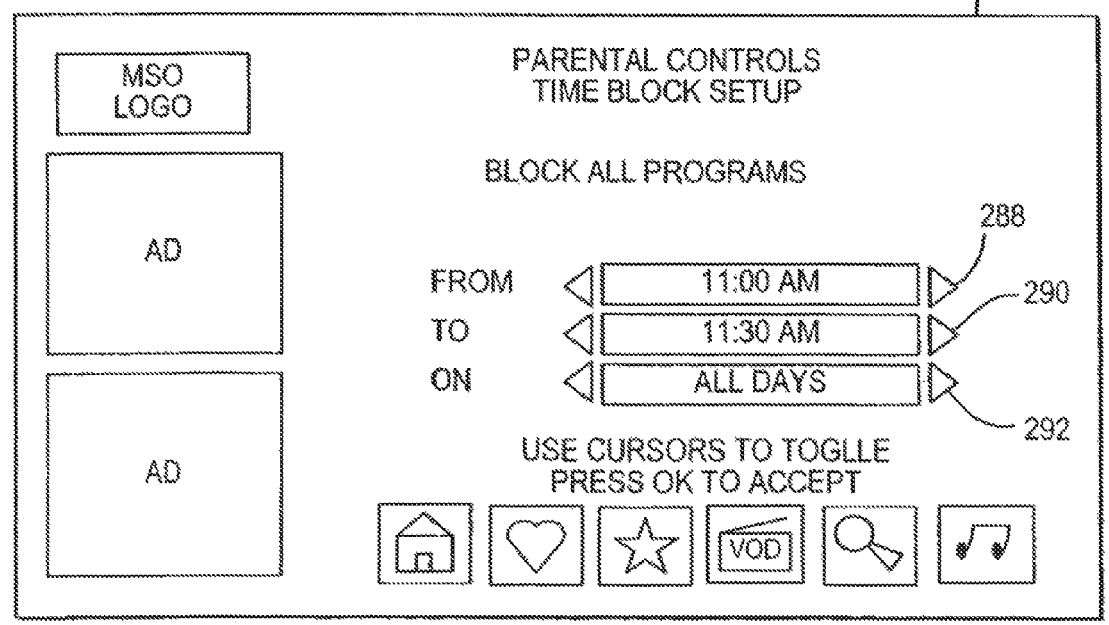
FIG. 23b is an illustrative display screen showing how a user may block content by creating a time-based parental control setting in accordance with the present invention.

It the user has selected "YES" for time block option 283, a time block sub-menu may be provided, for example, screen 286 of FIG. 23b. The user may use the on-screen options of screen 286 to set a beginning time (option 288) and ending time (option 290) for the parental control time period. The user may use option 292 to make the parental control setting effective for all days of the week, certain groups of days (e.g., week days or weekend days), or a particular day or days. The user may press OK key 84 when finished. Other selectable options may also be provided as part of screen 286.

The parental control screens 278 and 286 of FIGS. 23a and 23b are merely illustrative. Any suitable on-screen options or other user interface arrangement may be used to allow a parent (or other user) to block (parentally-control) programming airing during a particular period of time, programming on a particular channel or channels, programming with a certain rating, individual instances of certain programs, etc.

Interactive television application settings such as reminder settings, pay-per-view purchases, recording settings, and some parental control settings may be referred to as "time-based" settings, because these settings involve the element at time. In the reminder setting context, for example, reminders are made for programs that are to be aired at a specific time in the future. Recordings are also often scheduled for future broadcasts. Parental controls settings that block the viewing of a program that is aired at a specific time or that block all or some television viewing during a particular timer window are also time-based settings.

These time-based settings may give rise to conflicts during the operation of the interactive television application. For example, a user may attempt to order a video-on-demand movie or may attempt to play back recorded video recorder content. If the duration of the requested video content will cause the delivery of that content to overlap with a reminder, a purchased pay-per-view program, a recording, or a period during which programming is blocked by parental control settings, a conflict will arise. In situations such as these, the interactive television application may be vised to help resolve the conflict.

The interactive television application may be used to resolve such conflicts by presenting the user with display screens that inform the user of on-screen conflict-resolution options. The user may use these options in deciding how to best resolve a conflict.

A conflict may arise when the user requests delivery of video-on-demand content or video-recorder content (e.g., a video-on-demand movie or a movie stored in the user's personal video recorder or in the user's personal area on a network-based video recorder). The conflict may occur when the requested content has a running time that will cause that content, to overlap with a reminder that the user has set. When the interactive television application detects this type of conflict, the application may display a conflict notification and resolution screen such as conflict notification and resolution screen 298 of FIG. 24. Screen 298 may include information that informs the user of the conflict. Screen 298 may include the title and running time of the video-on-demand program. Information on the title and scheduled broadcast time of the program 299 for which the reminder was set may be included. Screen 298 may also include an indicator such as check-mark indicator 300, which indicates that a reminder for the program 299 has been set.

In the example of FIG. 24, the user sets a reminder for a scheduled airing of the television program Seinfeld at 8:00 (e.g., using a screen such as screen 180 of FIG. 12). The user then attempted to order the playback of the movie "The Majestic" (which may be either video-on-demand or video-recorder content). When requesting the video, the user may have used a video-on-demand order process such as the video-on-demand order process described in connection with FIGS. 7 and 14-17 or a video-recorder playback request process such as the video-recorder playback request process described in connection with FIGS. 7, 20, and 21. These are merely illustrative arrangements for requesting that the interactive television application present video content on the user's equipment 18. Any suitable arrangement may be used if desired.

When the user submits a request to system 10 asking that The Majestic be delivered to the user's equipment (or presented on the user's equipment), the interactive television application uses known information on the running time of the requested video (supplied, for example, by a suitable network-based or local database associated with the network-based or local content storage equipment used to store the video) and uses known information on the time for the reminder (e.g., from a program guide database created using program schedule information from data source 30) to determine whether these two events will overlap. If the events will overlap, the interactive television application may display screen 298.

Screen 298 may include a number of on-screen options from which the user may select to resolve the conflict. The user may, for example, select option 301 if the user desires to continue with the delivery of the requested video content to the exclusion of the reminder. If option 301 is selected, the system 10 will proceed to deliver the video for Majestic to the user. The reminder for Seinfeld will be cancelled.

Option 302 provides with user with an opportunity to continue with the delivery of the requested video and also allows the user to reschedule the reminder for Seinfeld. If the user selects option 302, the interactive television application may provide the user with a display screen that allows the user to reschedule the reminder for Seinfeld to another scheduled airing of the same program (e.g., at the scheduled broadcast time for a repeat showing of the program or at the scheduled broadcast time for another episode of Seinfeld, etc.).

The user may use option 304 to direct the user's local or network-based video recorder to make a recording of Seinfeld (e.g., on user equipment 18 or on network-based equipment in the form of a virtual or real recording). If the user selects option 304, the requested video content is delivered to the user and the interactive television application records Seinfeld at its scheduled broadcast time or otherwise obtains a copy of Seinfeld for the user.

Option 306 may be selected if the user desires to watch the requested video content after Seinfeld is over. The user may select option 306 to defer the video content delivery (or presentation) until Seinfeld has aired, at which time the system 10 may automatically deliver (present) The Majestic to the user.

Option 308 may be selected if the user desires to select another time at which to watch the Majestic. The interactive television program guide application may, for example, allow the user to select another day and time at which to watch the requested video. When that new day and time arrives, the interactive television application may automatically (e.g., after a confirmatory prompt) deliver the requested content to the user.

The interactive television application may provide the user with an option such as option 310 that allows the user to cancel the delivery of the Majestic. This allows the user to watch Seinfeld.

Option 311 may be selected if the user would like to begin watching the Majestic, pause for Seinfeld at its scheduled air time, and then resume playback of the Majestic after Seinfeld is over.

It will be understood that the options presented in conflict notification and resolution screen 298, or any other conflict notification and resolution screen discussed here in are illustrative and that some options may be omitted and others added if desired.

A conflict may arise when the requested video (e.g., "The Majestic") overlaps with a recording that the user has scheduled with the interactive television application (e.g., a recording of the program Seinfeld) when the system does not support simultaneous viewing of on-demand content (e.g., video-on-demand movies, pay-per-view-movies, playback of recorded programs, etc.) and recording of broadcast content. The interactive television application may use information on the running time of the requested video and information on the scheduled time of the recording to determine whether there is an overlap between these two events. When a conflict is detected, the interactive television application may present a screen for the user such as display screen 312 of FIG. 25.

As shown in FIG. 25, screen 312 may include information such as the title and duration of the requested video content and the title and time 314 of the scheduled recording. Program listings information for the program for which the recording is scheduled may be annotated with an icon such as recording icon 316 that indicates that the displayed program title is one for which a recording has been set.

Display 312 may include a number of on-screen options. The user may select an appropriate option to instruct the interactive television application on how to resolve the conflict between the requested video and the recording that the user has set.

If the user selects option 318, the interactive television application will proceed to provide the requested video (e.g., the Majestic) to the user and will cancel the recording (e.g., the recording for Seinfeld will be cancelled).

If the user selects option 320, the interactive television application will deliver The Majestic and will provide the user with on-screen options or other suitable opportunities to reschedule the recording of Seinfeld. For example., the interactive television application may provide the user with an opportunity to schedule the recording of Seinfeld for when Seinfeld is being shown as a repeat.

If the user selects option 322, the interactive television application will present The Majestic to the user and will record Seinfeld using the network-based or local video recorder functions of system 10.

The user may select option 324 to defer the delivery of The Majestic until after Seinfeld has been recorded.

When the user selects option 326, the interactive television application may provide the user with one or more screens of options that allow the user to select another time for viewing the Majestic.

Selecting option 328 directs the interactive television application to cancel deli-very of The Majestic. The recording of Seinfeld will therefore, no longer give rise to a conflict and can proceed as scheduled.

If desired, option 329 by may be selected to direct the system to deliver the Majestic to the user until the beginning of the recording of Seinfeld, pause the Majestic for the duration of the recording, and then resume the delivery of the Majestic when recording is complete.

Conflicts can arise when a requested video will overlap with a time-based parental control setting. For example, the user may have blocked the viewing of all programming between 3:00 and 5:00. If the user requests delivery of video content that will overlap with this time period, the interactive television application may display a screen such as conflicts notification and resolution screen 330 of FIG. 26.

Screen 330 may include the title of the video-on-demand program and its duration and information 332 on the particular parental control setting that has given rise to the conflict. Screen 330 may also contain options that allow the user to instruct the interactive television application on how to address the conflict. The user may select option 334 if the user desires to watch the requested video and override the existing parental control settings. With this approach, the user may be required to supply the interactive television application with a valid personal identification number (e.g., the parent's to unlock the blocked time period.

Figure 26:
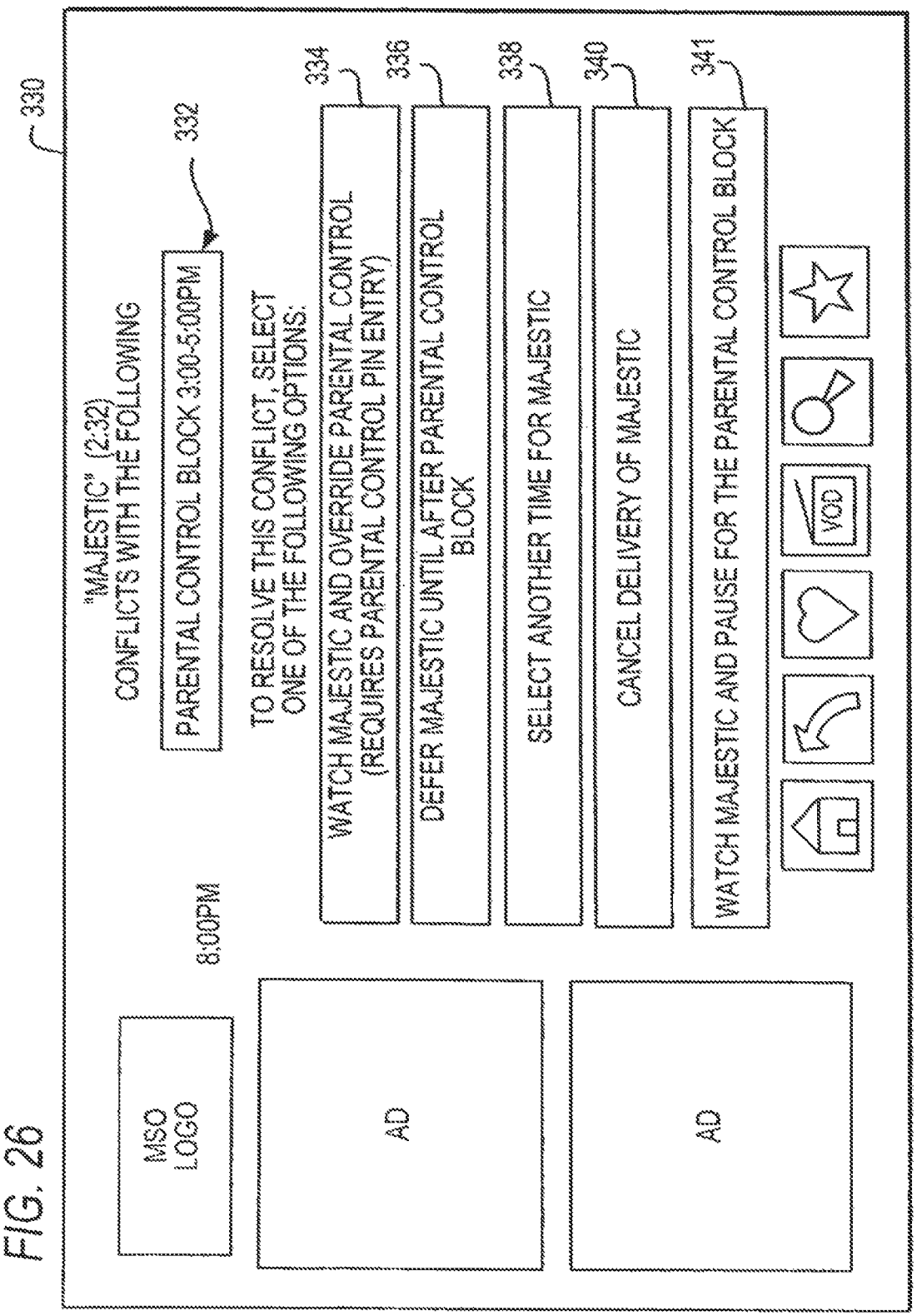

The user may select option 336 if the user desires to defer delivery of The Majestic until after the period of time covered by the conflicting parental control setting has passed. In the example of FIG. 26, a parental control setting that blocks all programming from being viewed between 3:00 and 5:00 has been established. If the user selects option 336, the interactive television application may defer presentation of The Majestic until 5:00 PM, which is the time at which the parental control expires.

Option 338 may be used to select another time for delivery of the Majestic. The user may select option 340 to cancel delivery of the requested video. The user may select option 341 to begin the Majestic, to pause for the duration of the parental control block, and to resume delivery of the Majestic after the parental control block.

Figure 27:
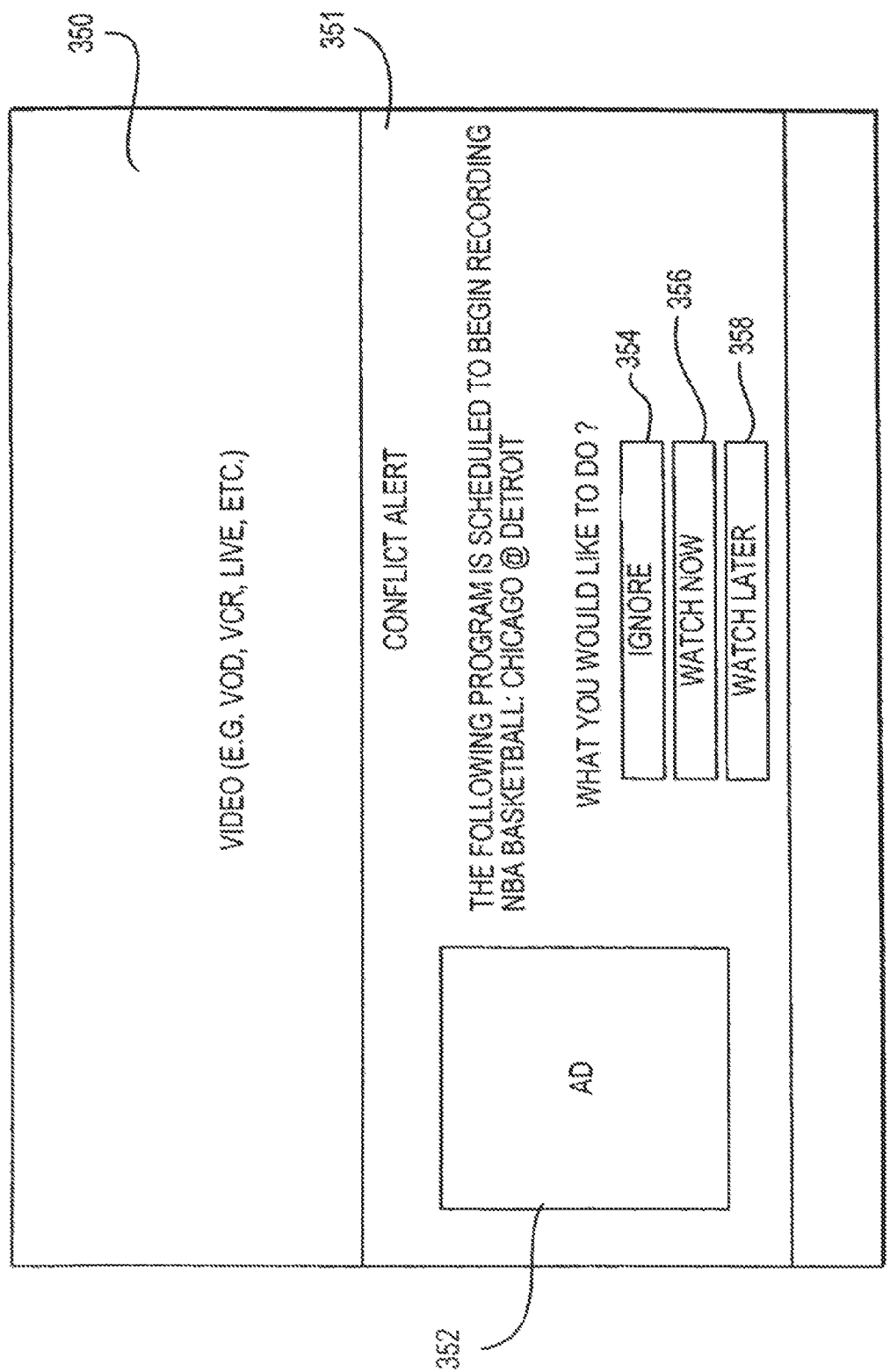

Conflict notification and resolution screens may also be provided as video overlays, alerts, or reminders. These types of notification may be particularly useful in resolving conflicts as they occur rather than in advance of the conflict. For example, as shown in FIG. 27, a screen 350 may be provided that includes a video for on-demand content (e.g., a video-on demand-movie, a recorded movie, a pay-per-view movie, a broadcast program that has been paused or rewound so that it is no longer being viewed in real-time, etc.). A user may have requested the on-demand video content and subsequently paused or rewound the video, prolonging the time it will take the video to complete. Although a conflict may not have been apparent at the time the video was requested, because the video's time has prolonged due to pausing, rewinding, etc., there may now exist a potential conflict with the requested video and a program previously scheduled to be recorded, a reminder, an ordered pay-per-view, or a parental control.

In response to such a conflict, the recording application may automatically begin buffering the program scheduled for recording, reminder, or purchase, and when the requested video is complete, the user may be notified of the presence of the buffered recording. Alternatively, as the start time for the conflicting scheduled program approaches, the interactive television application may provide the user with a conflict alert video overlay, such as conflict alert video overlay 351 of FIG. 27. Conflict alert video overlay 351 may include one or more selectable advertisements 352 as well as a number of on-screen options for resolving the conflict. The user may select an appropriate option to instruct the interactive television application on how to resolve the conflict between the video being displayed and the recording or other time-based setting that the user has set.

If the user selects option 354, the interactive television application may ignore the conflict and continue to provide the selected video being displayed to the user and may cancel the recording, reminder, or purchase (e.g., the recording for NBA Basketball will be cancelled). If the time based setting is a parental control time block, the user may be requested to enter a pin to continue watching.

If the user selects option 356, the interactive television application will stop providing the requested video being displayed and tune to the scheduled broadcast of NBA basketball. If the user selects option 358, the interactive television application may start to buffer the scheduled program while the requested video finishes. Once the requested video is complete, the use may be provided with an opportunity to view the program being recorded in its entirety.

Figure 28:
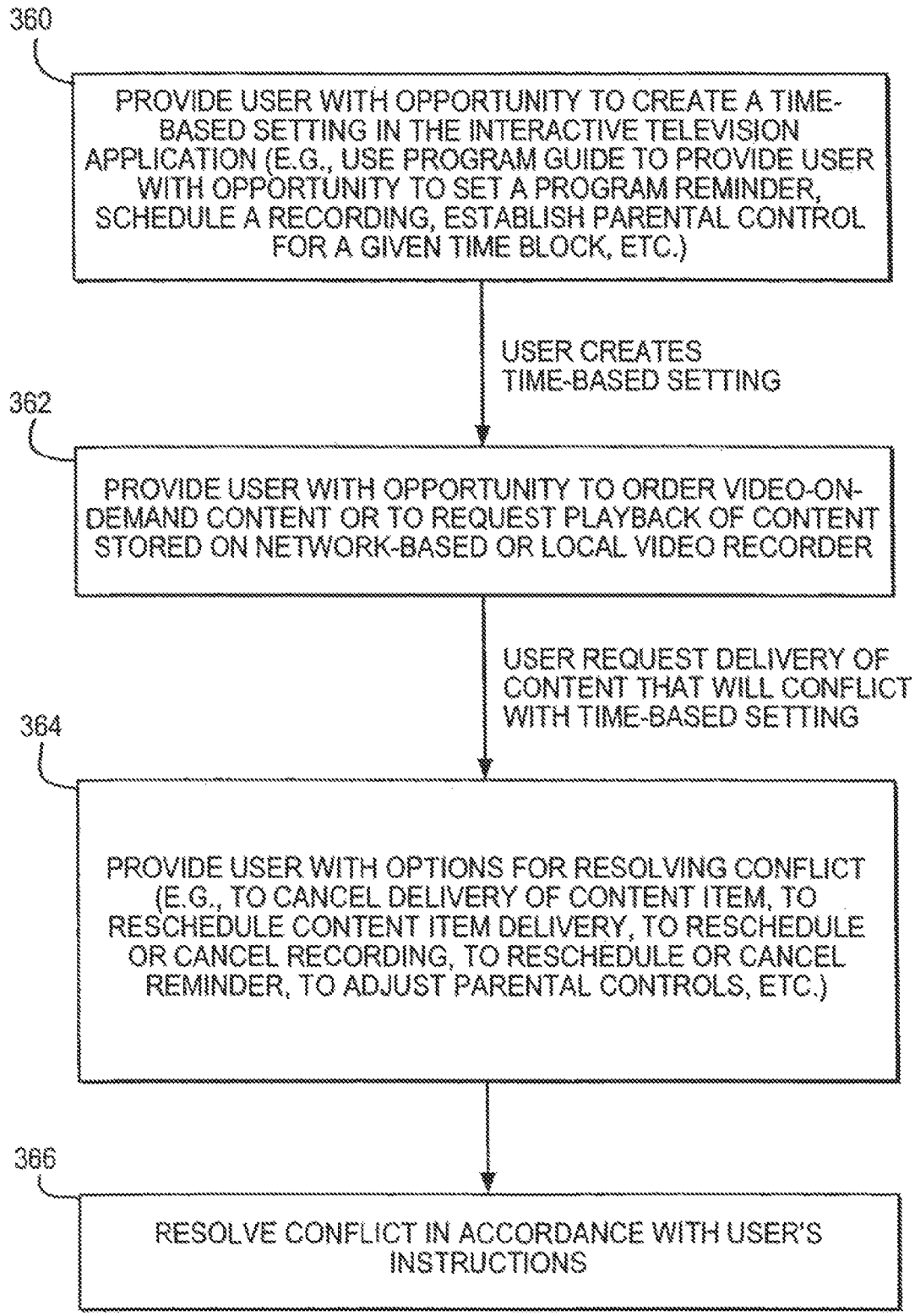
FIG. 28 is a flowchart of illustrative steps involved in using an interactive television system to allow a user to create time-based settings and request video content delivery and to resolve conflicts between the settings and content delivery requests in accordance with the present invention.

A flow chart of illustrative steps involved in resolving conflicts that arise when a user requests delivery of video that conflicts with time-based settings such as reminders, recordings, pay-per-view purchases, and parental controls is shown in FIG. 28. At step 360, the interactive television application may provide the user with on-screen options and other suitable opportunities to create a time-based setting. For example, an interactive television program guide application may be used to provide the user with an opportunity to establish a reminder for a program, to purchase a pay-per-view program, to set a recording of a program, or to establish parental controls that lock all channels or certain channels at particular times (e.g., during a given period of time or for the duration of a program, etc.).

After the user has used the interactive television application to create one or more of these settings, the user may be provided with an opportunity to request video content at step 362. For example, the interactive television application may provide the user with an opportunity to request that video-on-demand content be delivered from the network. The user may also be provided with an opportunity to request that local or network-based video recorder content be played back for the user.

When the user requests that video content be presented to the user on the user equipment 18, the interactive television application may, at step 364, provide the user with opportunities to resolve conflicts that arise. For example, the interactive television application can use information on the expected running time of the video-on-demand or video recorder content and can use this information to determine whether the requested video will overlap with a scheduled program reminder, a scheduled and pre-ordered pay-per-view program, a scheduled program recording, or the time period during which a parental control setting is in effect. The interactive television application may display conflict notification and resolution screens on the user's equipment.

The conflict notification and resolution screens that are displayed for the user may include conflict resolution options that the user may select. The user may, for example, cancel a reminder, ordered pay-per-view program, or scheduled recording, or may override an existing parental control setting by providing an appropriate parental control PIN. The user may opt to defer or reschedule delivery of the requested video to avoid the conflict, or the user may cancel video delivery. The interactive television application may resolve the conflict in accordance with the user's instructions at step 366.

In some embodiments of the present invention, the interactive television program guide application may provide a transport control interface (e.g., in the form of a transport control bar), which provides information, control or both for video programming. The video programming may include previously recorded video and currently broadcasting programming. Previously recorded video may be, for example, video recorded by the user (e.g., using a local or network digital video recorder), video-on-demand, or any other suitable form of recorded video. Currently broadcasting programming may include, for example, broadcast of the program that is shown at substantially the time that it is being broadcasted (i.e., not necessarily a broadcast of a live event) and delayed broadcast of the program. The delayed broadcast of the program may be shown, for example, from a memory buffer in response to the user pausing and then resuming play of the broadcasting program, in response to the laser rewinding the broadcasting program, etc., or any other suitable form of broadcast programming. The transport control interface of the present invention may be used in conjunction with any suitable recording device, such as a personal or digital video recorder.

Figure 29:
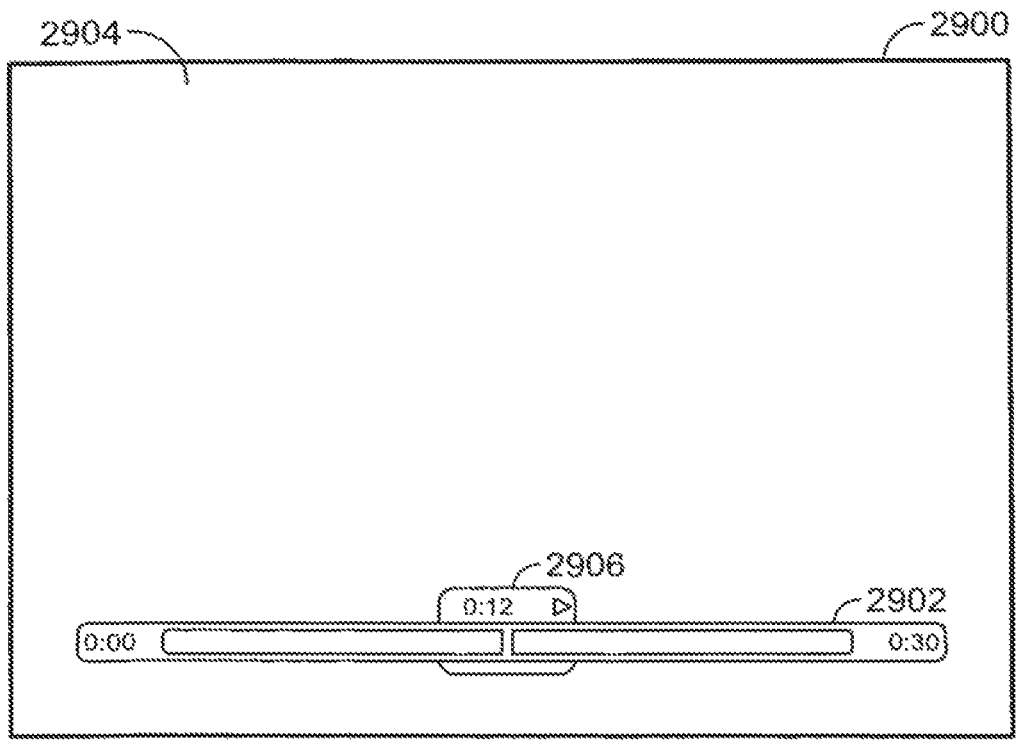
FIG. 29 is an illustrative display screen that includes a transport control bar provided in connection with the playing of a previously recorded video in accordance with the present invention.

FIG. 29 shows one example of such a transport control bar 2902 provided in connection with a previously recorded video that is being shown in display screen 2900. Transport control bar 2902 may graphically represent the entire length, for example, thirty minutes, of the previously recorded video 2904. The beginning of the previously recorded video 2904 may be indicated by a start time of 0:00, for example, on the left hand side of transport control bar 2902. The end time of the previously recorded video 2904 may be indicated to the user, for example, on the right hand side of transport control bar 2902 (e.g., 0:30).

The interactive television program guide application may provide on the transport control bar 2902 a transport control block 2906. The transport control block 2906 may indicate to the user the relative location of the current video frame in the previously recorded video segment. In the illustrated example of FIG. 29, the user is viewing a video frame that corresponds to the 12th minute of the previously recorded video 2904. The current transport action (e.g., playing of the recorded video) is indicated to the user by a forward play arrow on transport control block 2906. Transport control block 2906 may move along transport control bar 2902 in accordance with the time position of the programming being viewed. For example, in the beginning of the programming, transport control block 2906 may be positioned at the far left of transport control bar 2902 corresponding to the 0:00 time position.

FIG. 29 is merely illustrative of such a display screen. Any other suitable arrangements may be used.

Figure 30:
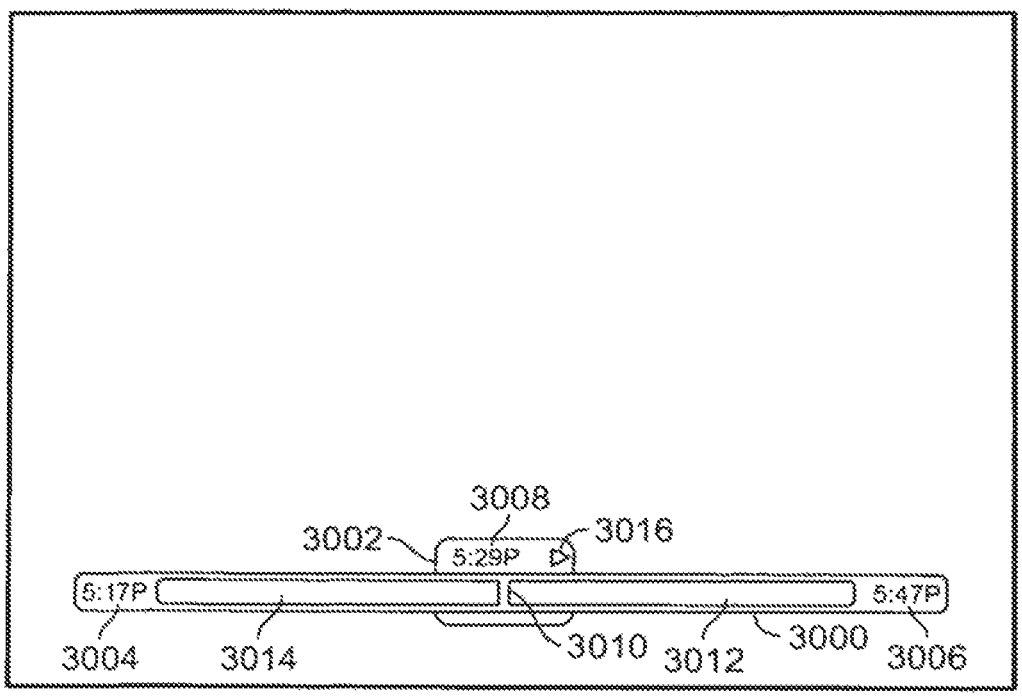
FIG. 30 is a diagram of a transport control bar provided in connection with a previously recorded video in accordance with the present invention.

FIG. 30 shows another suitable arrangement that may be vised for an illustrative transport control bar. In this example, transport control bar 3000 is displayed by the interactive television program guide application during playback of prerecorded content. As illustrated, transport control bar 3000 may display an actual starting time 3004 as opposed to a generic "0:00" marker. An actual or predicted ending time 3006 may also be displayed (i.e., as opposed to a generic "0:30" marker). More specifically, accordingly to one approach, starting time 3004 may correspond to the actual time at which recording of the program started and ending time 3006 may correspond to the actual time at which recording ended. According to another approach, starting time 3004 may correspond to the time at which the playback of the recorded program began and ending time 3006 may correspond to the predicted time at which the playback of the recorded program will end. Transport control block 3002 may display an actual time 3008 that corresponds to the actual time the current frame is being, was, or would, be played back. This arrangement allows for a more live feel to video playback. Such uses of times are merely illustrative. Any other suitable arrangement may be used.

Section 3014 of transport control bar 3000 (i.e., the portion to the left of tab 3010) may indicate the portion of recorded content that is prior in time to the frame associated with time 3008. In this example, section 3014 indicates the recorded video portion prior to time frame 5:29p. In another suitable example such as the one shown in FIG. 29, section 3014 may indicate the recorded video portion prior to generic time frame 0:12. Section 3012 of transport control bar 3000 (i.e., the portion to the right of tab 3010) may indicate the portion of recorded content that is subsequent in time to the frame associated with time 3008. In this example, section 3010 indicates the recorded video portion subsequent to time frame 5:29p. In another suitable example such as the one shown in FIG. 29, section 3010 may indicate the recorded video portion subsequent to generic time frame 0:12. Sections 3014 and 3012 may be displayed in different colors, patterns, or any other suitable visually differentiating way.

In one suitable approach, the interactive television program guide application may allow the user to record non-contiguous segments of a currently broadcasting program (includes broadcast of the program that is shown at substantially the time that it is being broadcasted and delayed broadcast of the program). This may be represented in the transport control bar as non-contiguous segments of different, colors, patterns, or other visually distinguishable features.

Action status indicator 3016 may be displayed in transport control block 3002 to indicate a current action status (e.g., play, rewind, fast-forward, pause, record, or any other suitable mode). Action status indicator 3016 may be in the form of an icon, as illustrated in FIG. 30, text, or any other suitable form. More detailed description of action status indicators is provided below in connection with FIG. 43.

FIG. 30 is merely illustrative of such a display screen. Any other suitable arrangements may be used. For example, information such as program title, channel, any other suitable programming-related information, advertisements, logos, or any combination of information thereof may be displayed within or in association with the transport control bar.

Figure 31:
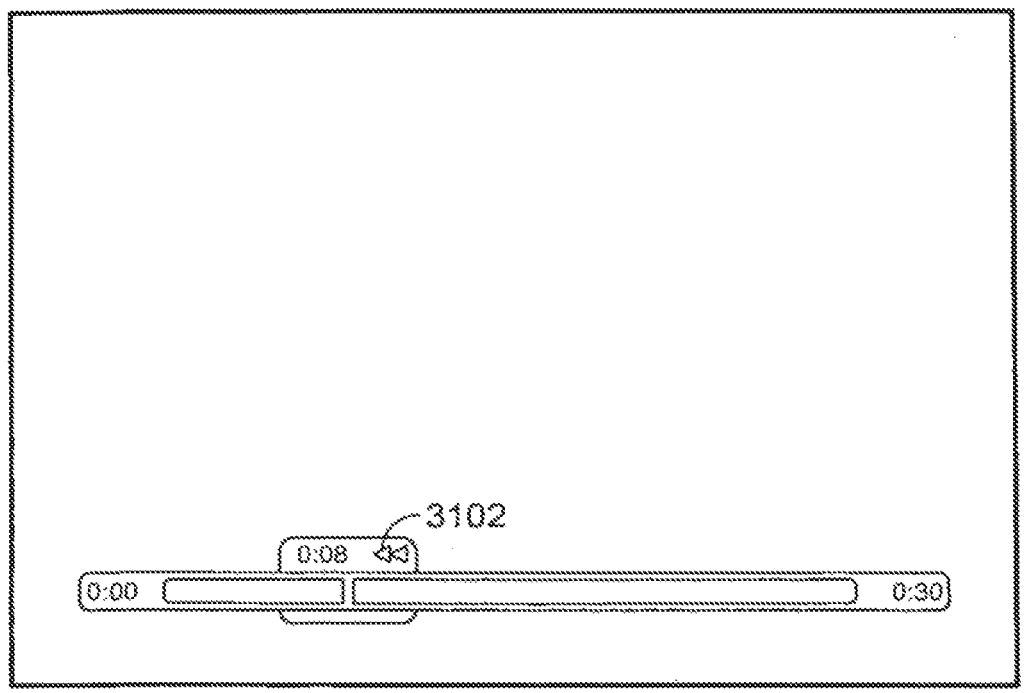
FIG. 31 is an illustrative display screen that includes a transport control bar provided in connection with the rewinding of a previously recorded video in accordance with the present invention.

FIG. 31 shows one example of a transport control bar in which the transport control block indicates that the user is currently viewing the video corresponding to the eighth minute of the recorded video. The transport control block also includes a double rewinding arrow 3102 indicating that the user is currently rewinding the previously recorded video.

Figure 32:
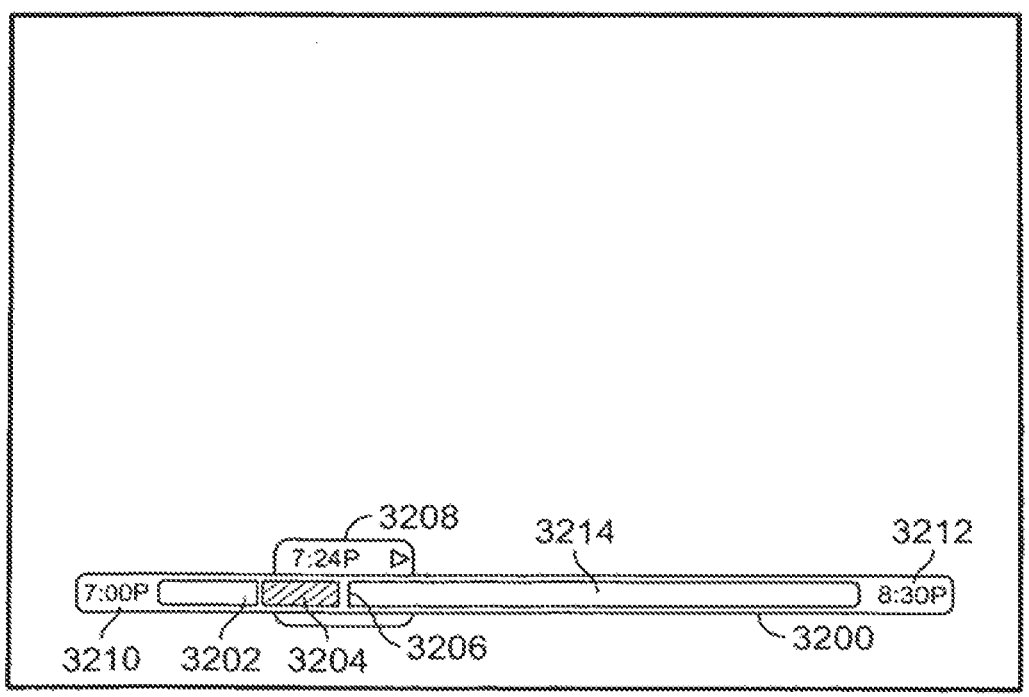
FIG. 32 is an illustrative display screen that includes a transport control bar provided in connection with the viewing of live video in accordance with the present invention.

In some embodiments of the present invention, the interactive television program guide application may provide transport control of live video. In these embodiments, a transport control bar tailored to the control of live video may be provided. FIG. 32 shows one example of such a transport control bar 3200. In this example, the currently viewed video may be shown, for example, in response to the user tuning to a broadcast channel. Start time 3210 on the left side of the transport control bar (e.g., 7:00p) may indicate to the user the start time of the currently broadcasting program (includes broadcast of the program that is shown at substantially the time that it is being broadcasted and delayed broadcast of the program) or any other suitable time. End time 3212 on the right side of the transport control bar may indicate to the user the end time of the current program or any other suitable time. Transport control block 3208 may, for example, indicate the current time and the relative time position in the current program or the time span between start time 3210 and end time 3212, which may also be graphically indicated by tab 3206, or in the time span of region 3212.

In another suitable approach, end time 3212 may always be configured to be a fixed length of time from start time 3210 (e.g., two hours). In this case, start time 3210 and end time 3212 may be independent of the start and end times of the program being broadcast. In this embodiment, start time 3210 may be set to the nearest previous half hour when the user changes channels, for example 7:00 pm when the user tunes at 7:14 pm. End time 3212 would be set to 9:00 pm in this example. When the viewer has watched the same channel long enough so that the time being viewed is no longer in the displayed span, the start and end times may be incremented by 30 minutes. For example, when the viewer watches the segment of the program that was broadcast at 9:00 pm, start time 3210 may be changed to 7:30 pm and end time 3212 may be changed to 9:30 pm. In this embodiment, start time 3210 and end time 3212 may also be changed by a half hour at a time as the user rewinds or fast forwards through delayed content.

The interactive television program guide application may also change the color or other characteristics associated with the buffer of the recorded content to indicate that it corresponds to a user requested recording. A recording status icon may be displayed on the transport control bar in place of the play status button to indicate the user-requested recording in progress.

The interactive television program guide application may begin recording the live video, for example, using a digital video recorder, when the user tunes to the currently broadcasting program. A buffer region 3204 may be displayed on transport control bar 3200 to indicate the portion of video that has been recorded. Suffer region 3204 may be displayed using, for example, a different color on transport control bar 3200 than region 3202 and region 3214, which may themselves be different in appearance from each other. Any other suitable visual distinction may be used to indicate the buffer region, including for example, a pattern. In the example shown in FIG. 32, a small buffer region 3204 is displayed to the left of the current view time (i.e., shown by tab 3206) indicating that a small portion of the program has been recorded in the memory buffer (i.e., based on the fact that the user has been tuned to the current program for a correspondingly short time). When the user initially tunes to live video, there will be no buffer region 3204 if none of the live video was previously recorded. However, as the user continues to watch the live video, buffer region 3204 will be created and enlarge in size as the interactive television program guide application records the video.

Figure 33:
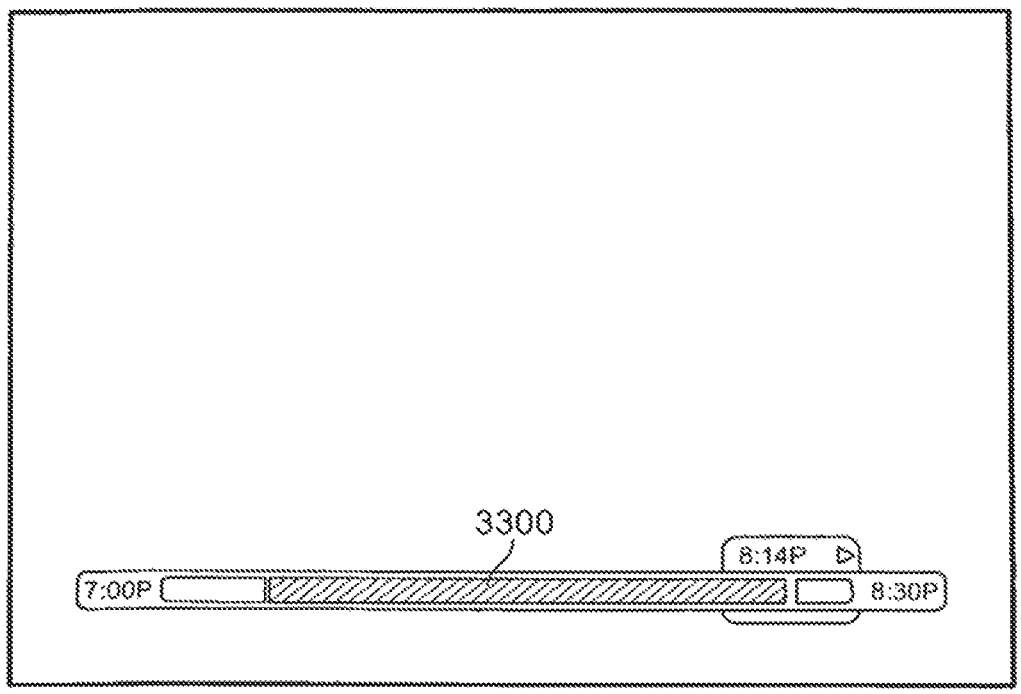
FIG. 33 is an illustrative display screen that includes a transport control bar provided in connection with the viewing of live video in accordance with the present invention.

The interactive television program guide application may, for example, allow the user to view the recorded video represented by buffer region 3204 in accordance with, for example, the actions described with respect to previously recorded video (e.g., rewind, fast forward, play, etc.). Tab 3206 may in such situations be positioned within buffer region 3204 with respect to which particular frame is currently being accessed. FIG. 33 shows a recorded buffer region 3300 that is associated with a relatively longer period of time than buffer region 3204.

It will be understood that transport control bar 3200 may also display information when the user activates a recording option to record a particular program (as opposed to automatic recording of content into a buffer). For example, the interactive television program guide application may display transport control bar 3200 when the user presses a "record" button on a remote control to record content on a currently tuned channel. Buffer region 3204, in such a situation, may indicate the content saved into memory sines the recording began. Tab 3206 may be moved within region 3204 in order perform any suitable action (e.g., rewind) while the program continues to be recorded (and region 3204 continues to expand to the right). Start time 3210 and end time 3212 may indicate the actual start time and end time of the program being recorded. For purposes of brevity and clarity, the present invention is primarily discussed herein in terms of a buffer region. It will be understood that the buffer region applies to any suitable indication of content being recorded, including automatic recording, manual recording, programmed recording, any other suitable type of recording, or any combination of thereof.

In one suitable approach, start times and end times, such as start time 3210 and end time 3212, displayed on a transport control bar, such as transport control bar 3200, may be adjusted based on changes in the running time of a currently broadcasting program (includes broadcast of the program that is shown at substantially the time that it is being broadcasted and delayed broadcast of the program). For example, if a live event, such as a sporting event, runs longer than originally scheduled, the delay information, which may be periodically downloaded into the user television equipment from the television distribution facility, may be used by the interactive television program guide application, to change the times indicated on the transport control bar to represent new scheduled times.

In some embodiments of the present invention, the interactive television program guide application may provide different modes, such as various time modes, in connection with the presentation of the transport control bar. For example, the interactive television program guide application may automatically initiate a default short term mode when the user tunes to a currently broadcasting program. The transport control bar in this short term mode may, for example, only display times that are relevant to the currently broadcasting program. One example of such a transport control bar is shown in FIG. 33. The transport control bar may display the entire duration of the currently broadcasting program (from 7:00 p to 8:30 p), while the buffer region 3300 is automatically adjusted by the interactive television program guide application to represent the recorded portion of the currently broadcasting program.

Figure 34:
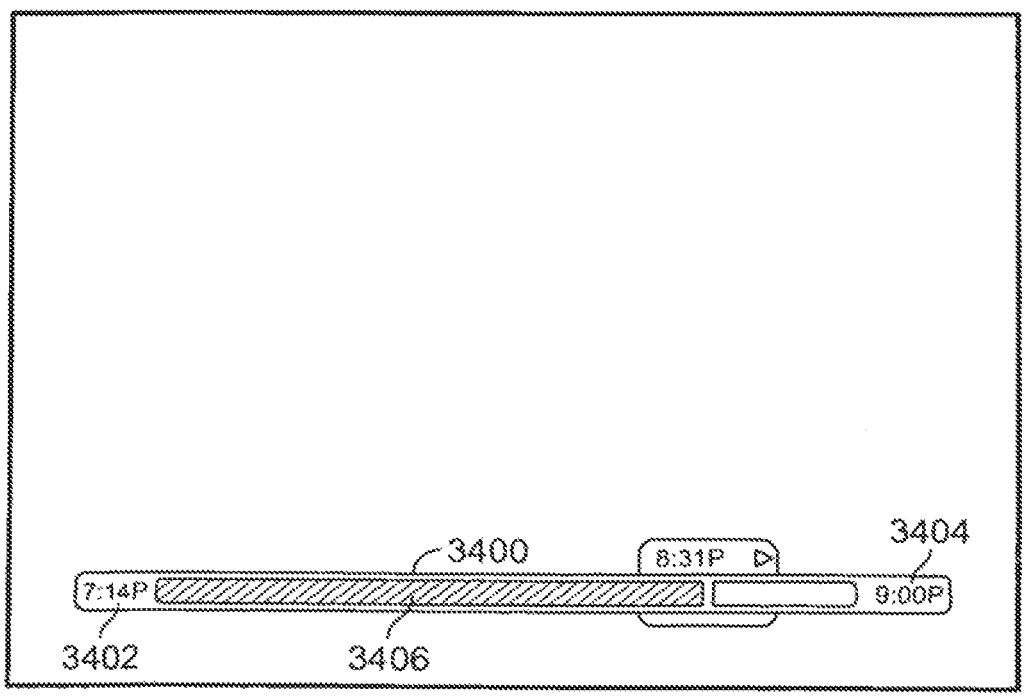
FIG. 34 is an illustrative display screen that includes a transport control bar in short term mode provided in connection with the viewing of live video in accordance with the present invention.

FIG. 34 shows another example of a transport control bar 3400 that is displayed, for example, in connection with a long term mode. The interactive television program guide application may automatically, display such a transport control bar covering a time period longer than a single program, for example, in response to the user viewing programming on a particular channel for a period longer than a single program. In such embodiments, the interactive television program guide application may adjust the transport control bar to display a longer time duration that does not correspond to a particular program. The interactive television program guide application may, for example, display information such as program titles, program boundaries, and any other suitable information associated with the various programs that are covered by the time duration on the transport control bar. The longer time duration may be determined by the interactive television program guide application, for example, based on the buffer size, based on the size of recorded video, based on the estimated end time of the currently broadcasting program (includes broadcast of the program that is shown at substantially the time that it is being broadcasted and delayed broadcast of the program), based on natural breaks in the program line-up, based on user-specified time duration, based on any other suitable criteria, or based on any combination thereof.

FIG. 34 shows a transport control bar 3400 in which start time 3402 and end time 3404 have been updated (from the start and end time shown in FIG. 33) to indicate the beginning of the buffer region and the end of a new program that began broadcasting following the recording of an immediately preceding program. According to another suitable approach, end time 3404 may indicate the end of an arbitrary period of time since the new program began broadcasting (e.g., 30 minutes). According to yet another suitable approach, end time 3404 may indicate the time at which the buffer will be full.

Figure 35:
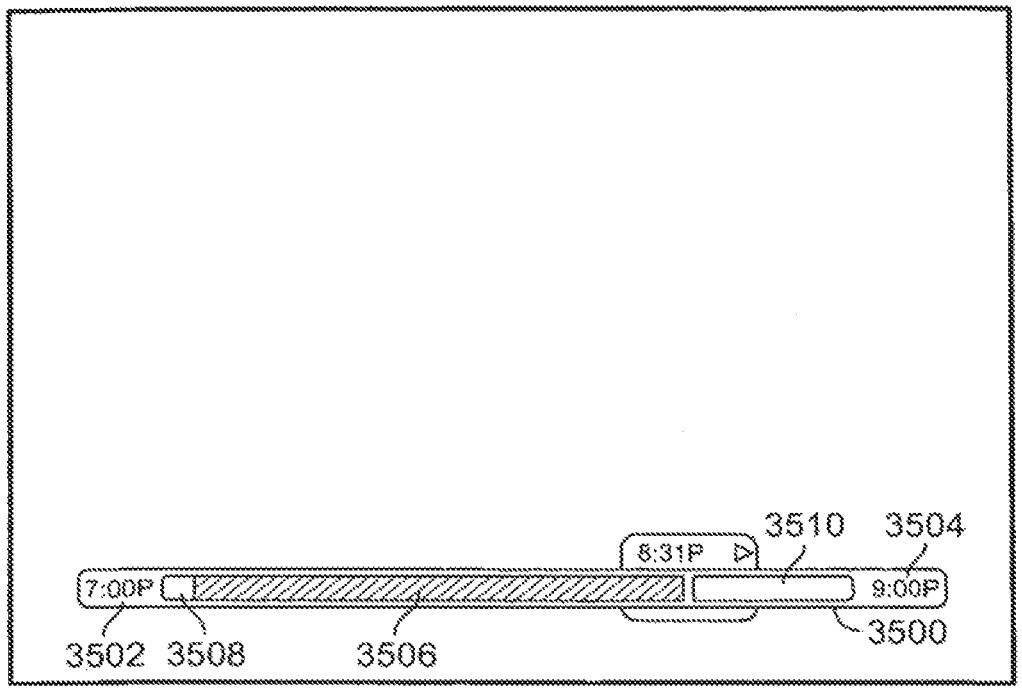
FIG. 35 is an illustrative display screen that includes a transport control bar in long term mode provided in connection with the viewing of live video in accordance with the present invention.

In some embodiments of the present invention, the interactive television program guide application may perform automatic transitions from one time mode to another in response to, for example, user actions, natural transitions in broadcast programming, or any other suitable conditions. FIG. 35 shows one example of such an automatic transition in transport control bar display from a short term mode that is associated with a particular program to a long term mode. The interactive television program guide application may perform this particular transition, for example, in response to the transport control block reaching the end of the particular broadcasting program.

FIG. 35 shows an illustrative transport control bar 3500. Whereas in FIG. 34, start time 3402 was changed (from that of FIGS. 32 and 33) to indicate the beginning of buffer region 3406, in FIG. 35, start time 3502 remains the same. For example, if the user tunes to a program in progress that began at 7:00 p and ends at 8:30 p, a transport control bar such as transport control bar 3300 (FIG. 33) may be displayed. When that program ends and a new program begins, the interactive television program guide application may modify the display of the transport control bar to appear similar to transport control bar 3500. Transport control bar 3500 is arranged such that the original start time 3502 is left unchanged and while end time 3504 is updated to represent the end time of the new program. Buffer region 3506 represents what has been recorded since recording began on the present channel. Buffer region 3SOS may change based on available buffer memory. For example, if there is only sufficient memory for one hour of video programming, then after an hour, buffer region 3506 may begin shifting to the right (i.e., newly recorded content will replace older recorded content) by moving the leftmost edge and the rightmost edge of buffer region 3506 to the right. Any such suitable indication may be used to indicate what is being scored in buffer memory.

Region 3508 of transport control bar 3500 indicates content that has not been stored in buffer memory. In one suitable approach, when region 3508 represents older content has been replaced by newer content in buffer memory, the interactive television program guide application may visually distinguish (e.g., by using different colors, patterns, etc.) region 3508 from buffer region 3506, and from region 3510 (i.e., content that has not yet been recorded).

In some embodiments of the present invention, the interactive television program guide application may provide the user with the ability to bookmark desired locations in the video programming in both the short term and the long term modes. The bookmarked locations may be indicated to the user by the interactive television program guide application on the transport control bar using, for example, markers of a different color (e.g., a color selected by the user).

Figure 36:
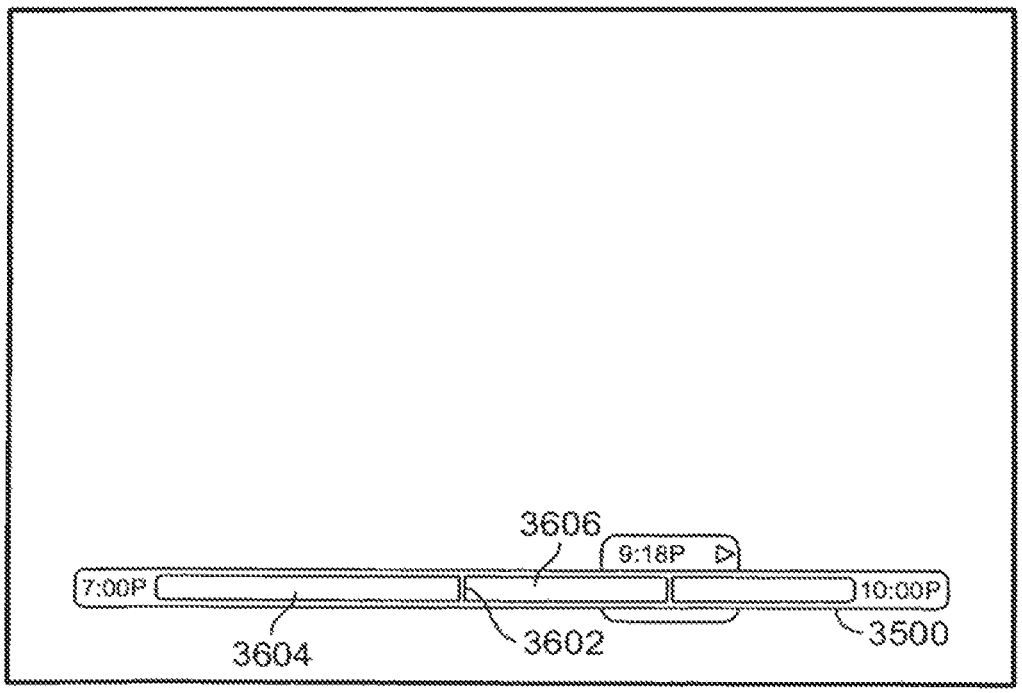
FIG. 36 is a diagram illustrating the transition of a transport control bar in short term mode to a transport control bar in long term mode in accordance with the present invention.

For example, FIG. 36 shows a transport control bar 3600 that may, for example, represent a time block from 7:00 p until 10:00 p. This time block, as illustrated, includes two consecutive broadcast, programs corresponding to regions 3604 and 3606. Marker 3602, which may correspond to 8:00 p may indicate the break from the first program to the second program. Marker 3602 may be automatically set by the interactive television program guide application or set by the user. In the illustrated example, the first program may have started at 7:00 p and ended at 8:00 p; the second program may have started at 8:00 p and ended at 10:00 p. It will be understood that any suitable number of program breaks may be represented in a single transport control bar using any suitable number of markers or any other suitable indicators. A transport control bar, in accordance with the present invention may represent any time range no matter how big or how small (e.g., on the order of seconds, minutes, hours, days, etc.).

Figure 37:
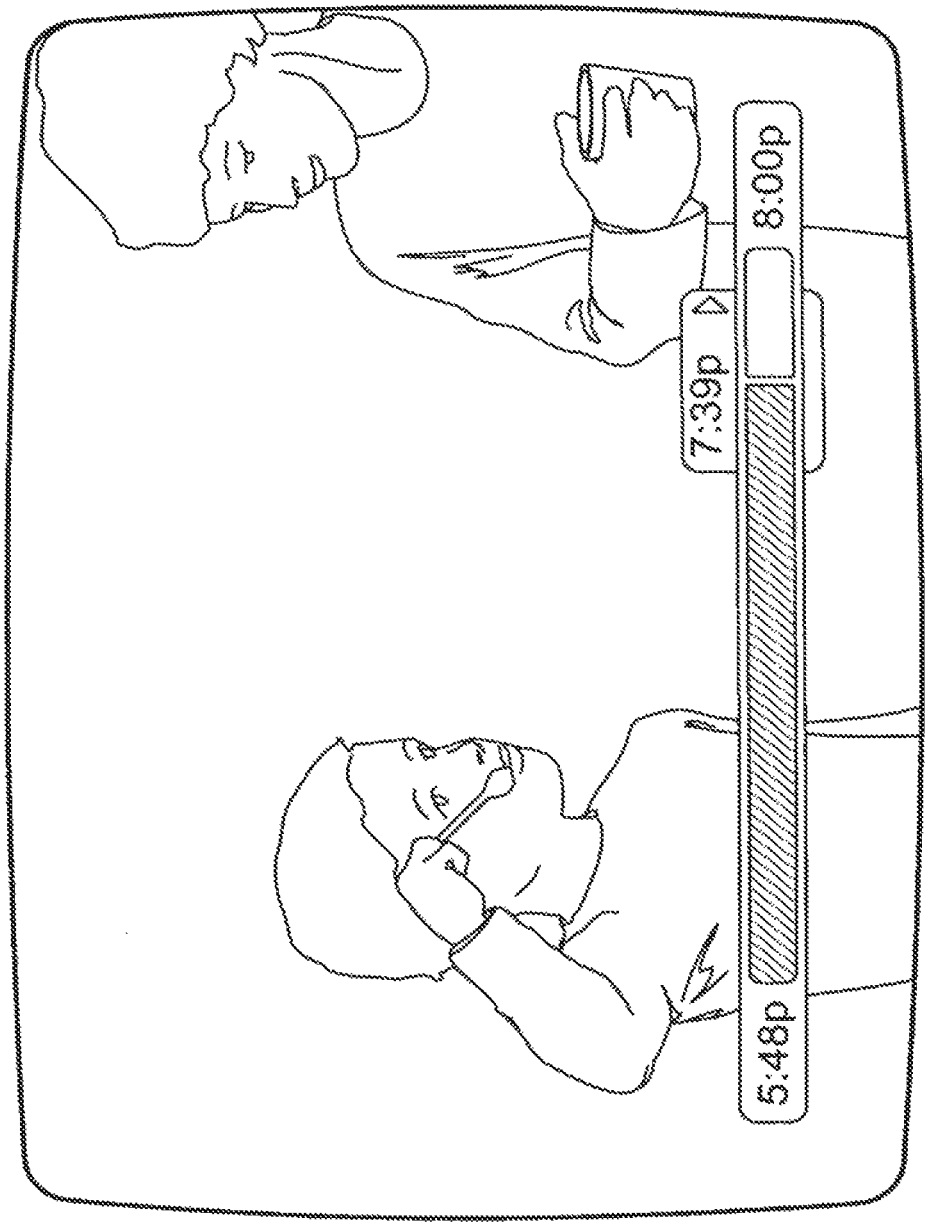
FIG. 37 is an illustrative display screen that includes a transport control bar provided in connection with the viewing of live video in accordance with the present invention.

In some embodiments of the present invention, the interactive television program guide application may allow the user to control recording of live video. As an example, while watching a live video as shown in FIG. 37, the interactive television program guide application may allow the user to indicate a desire to record the currently broadcasting program (includes broadcast of the program that is shown at substantially the time that it is being broadcasted and delayed broadcast of the program). In response to receiving a command from the user to record the currently broadcasting program, the interactive television program guide application may, for example, automatically adjust the transport control bar display to reflect times specific to the currently broadcasting program.

Figure 38:
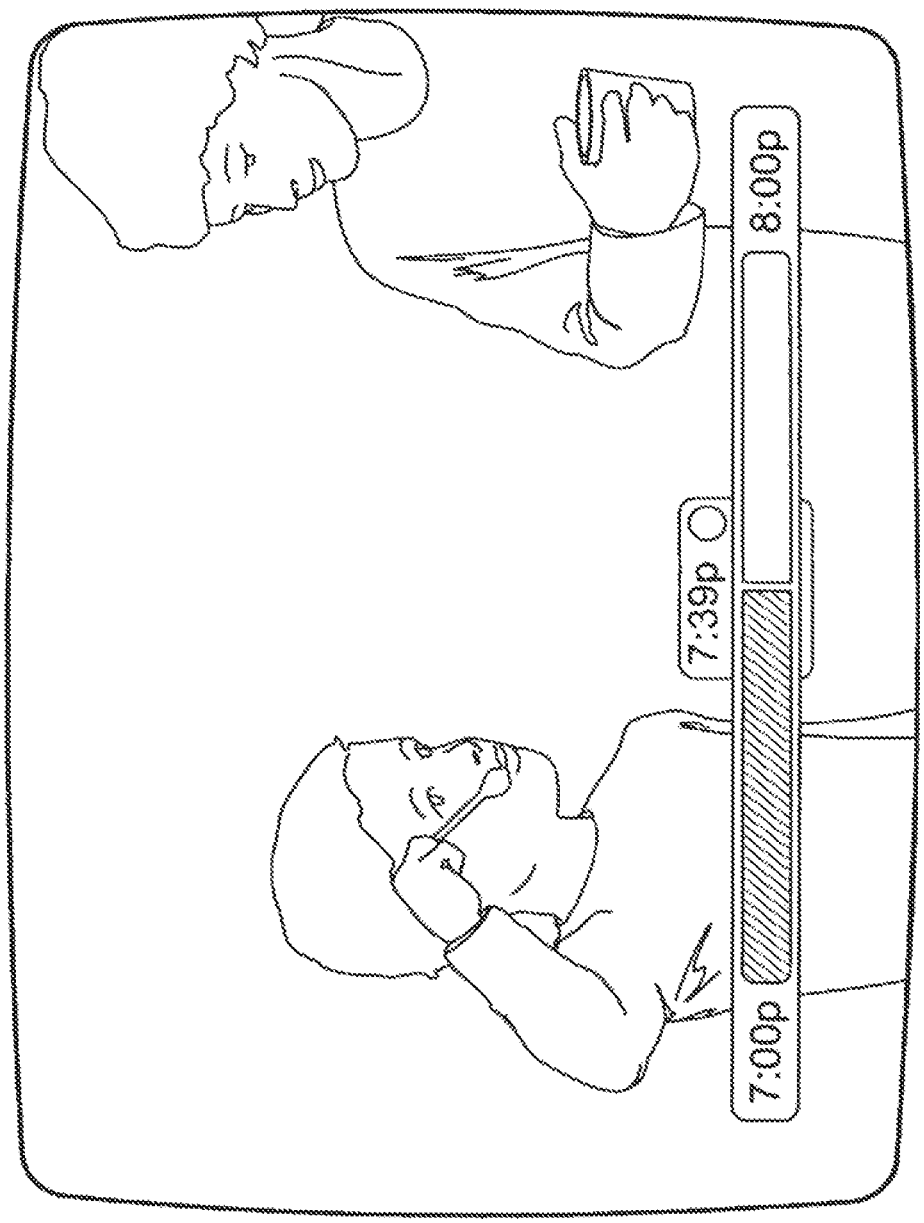
FIG. 38 is an illustrative display screen that includes a transport control bar provided in connection with the recording of live video in accordance with the present invention.

As an example, the interactive television program guide application may adjust the start time and end time of the recorded buffer displayed on the transport control bar to the start and end time of the currently broadcasting program. The interactive television program guide application may also automatically adjust the transport control bar display to reflect recording of the current program, for example, by displaying the recording icon in the transport control block (FIG. 38).

When the user initiates a playback of the recorded video at a later time (or when the user selects to restart a previously watched or partially watched program from the beginning), the interactive television program guide may display zero as the start time on the transport control bar and may display the time length of the recorded program as the end time of the program. A label such as "DVR" may be displayed in placed of any channel information.

In some embodiments of the present invention, the interactive television program guide application may allow the user to pause the live video of a currently broadcasting program. In such embodiments, the interactive television program guide application may pause the time shown within the transport control block as well as the progression of the transport control block at the time that the user initiated the pause. The interactive television program guide application may, however, continue to record the live video in real time and may indicate the continued recording, for example, by allowing the buffer region to extend beyond the paused transport control block shown on the transport control bar (see region 3906 of FIG. 39 that extends beyond current playing location of 3908).

The interactive television program guide application may later allow the user to resume viewing of the live video, for example, at any location within the buffered region. When the user resumes viewing of the live video, the interactive television program guide application may indicate the current viewing position (see 3908 of FIG. 39) as well as the live video position (see 3910 of FIG. 39) on the transport control bar. For example, the current viewing position may be indicated by the transport control block, while the live video position may be indicated, for example, using a marker shown on the right hand side of the buffer region.

In some embodiments of the present invention the visual appearance of a buffer region that designates automatically recorded content may be distinguishable from the visual appearance of a region of the transport control bar that designates content that is being recorded at the request of the user. For example, the buffer region for automatically recorded content may be displayed as the color green, whereas the buffer region for content that in being recorded at the request of the user may be displayed as the color red.

Figure 39:
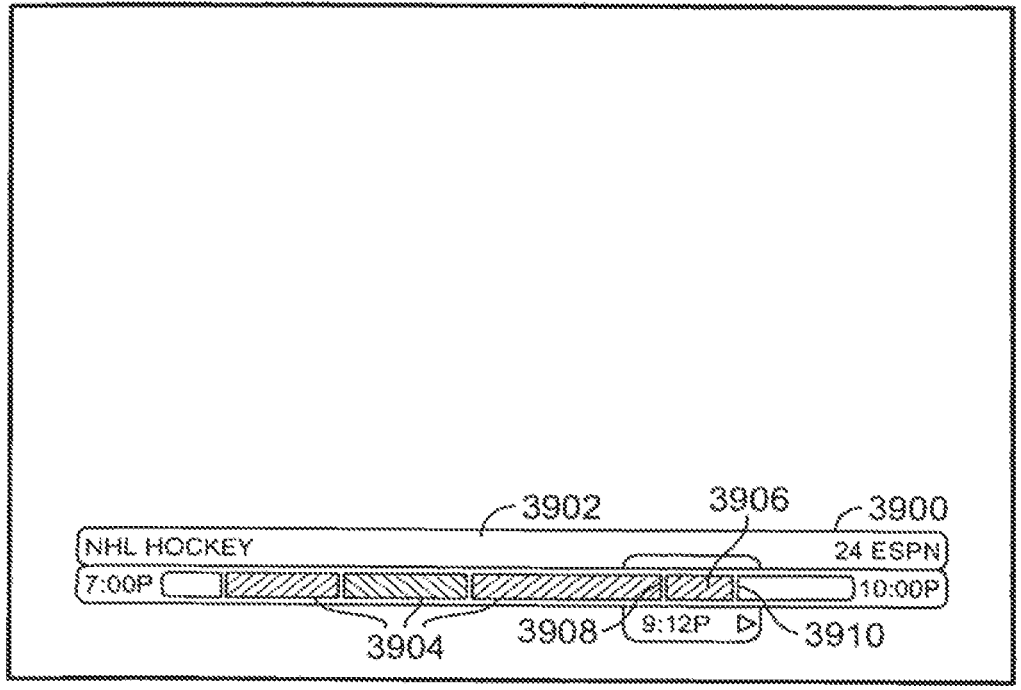
FIG. 39 is an illustrative display screen that includes a transport control bar that represents multiple program recordings in accordance with the present invention.

It will be understood that any suitable information may be provided using the transport control bar of the present invention. For example, FIG. 39 shows an illustrative transport control bar 3900 representing multiple program recordings in buffer regions 3904 (i.e., separated by markers, as illustrated). The buffer regions associated with different program recordings may also vary in color, pattern, or other distinguishable manner. According to one suitable approach, the buffer region associated with a currently viewed program is always displayed in the same color, pattern, etc. Accordingly, when a new program starts to play back and the interactive television program guide application retains all or part of the previous program in the buffer, the buffer region associated with the previous program changes in color, pattern, or other manner to indicate that it is no longer the currently viewed program.

Also included as part of transport control bar is program listing information 3902. In one suitable approach, program listing information 3902 may correspond to whatever program is currently being displayed on the display screen. For example, if NHL Hockey is currently being viewed, then corresponding programming information related to NHL Hockey may be displayed. If the user rewinds to a previous program (e.g., that appears as a separate buffer region), the programming information associated with that program may be displayed. It will be understood that the arrangement of the transport control bar of FIG. 39 is merely illustrative. Any other suitable arrangement may be used. For example, programming information may be displayed for any or all of the programs broadcast during the time span between the start time and the end time of the transport bar. Any other suitable information may be displayed, such as, advertisement information, icons, logos, options to set reminders, request additional information, or any other suitable information. Elements of the transport control bar of the present invention may be interactive. For example, the interactive television program guide application may allow the user to select program listing 3902 in order to, for example, obtain additional information related to the corresponding program, to order merchandise, or to perform any other suitable action.

The interactive television program guide application may display the transport control bar of the present invention at any suitable time, in response to any suitable event, and for any suitable length of time. For example, the interactive television program guide application may display the transport control bar in response to a channel change command, in response to an action command associated with a program currently being viewed (e.g., record, fast-forward, rewind, stop, etc.). The transport control bar way be displayed indefinitely until a particular user command is issued (e.g., until the user presses an "exit" button on the remote control) or it may time out automatically after a period of inactivity. Whether it times out and how long it waits before timing out may differ depending on the video playback mode, or any other suitable factors. For example, the transport bar may time out after a few seconds while in the normal Play mode, and not time out at all while rewinding or fast-forwarding.

Figure 40:
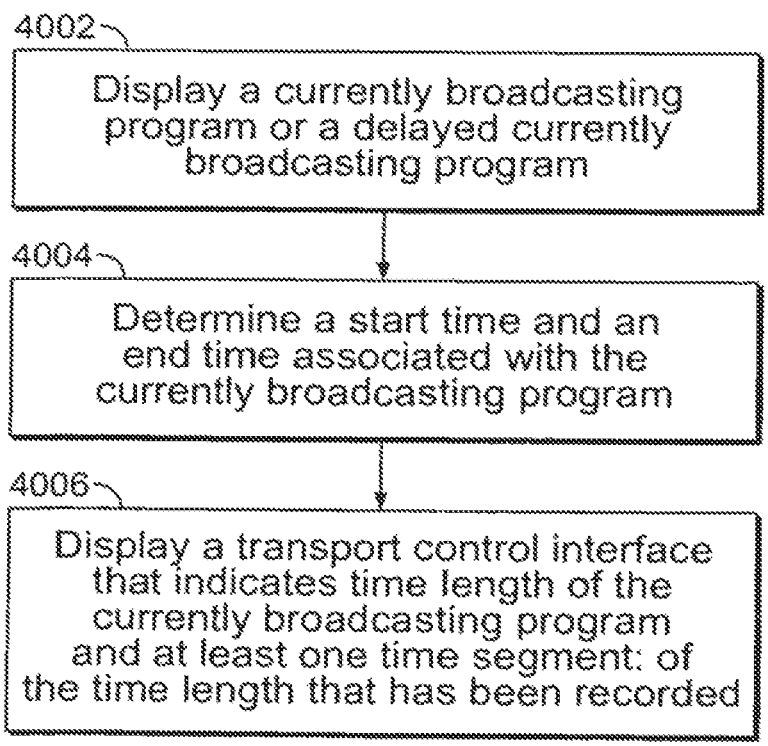
FIG. 40 is a flowchart of illustrative steps involved in providing a transport control interface for a currently broadcasting program in accordance with the present invention.

FIG. 40 is a flowchart of illustrative steps involved in providing a transport control interface in connection with a currently broadcasting program (includes broadcast of the program that is shown at substantially the time that it is being broadcasted and delayed broadcast of the program). At step 4002, the interactive television program guide application displays a currently broadcasting program to the user, for example, in response to the user tuning to a channel. The interactive television program guide application determines a start time and end time that are associated with the currently broadcasting program at step 4004. The interactive television program guide application may determine such information, for example, by examining previously stored program guide data associated with the program, by reading program guide data received in the VBI of the currently broadcasting program, or by using any other suitable method.

At step 4006, the interactive television program guide application displays a transport control interface for the currently broadcasting program (e.g., a transport control bar) that may indicate the time length of the currently broadcasting program and that indicates at least one time segment of the time length that has been recorded. It will be understood that while the start time and end time of the currently broadcasting program may be displayed on the transport control interface in accordance with present invention, they are not necessarily displayed. Any other suitable time associated with the transport control interface may be displayed. For example, the transport control interface may indicate a start time associated with the buffer, half hour increments that correspond to the length of the buffer, half hour increments that correspond to a fixed length of the transport bar, etc.

Figure 41:
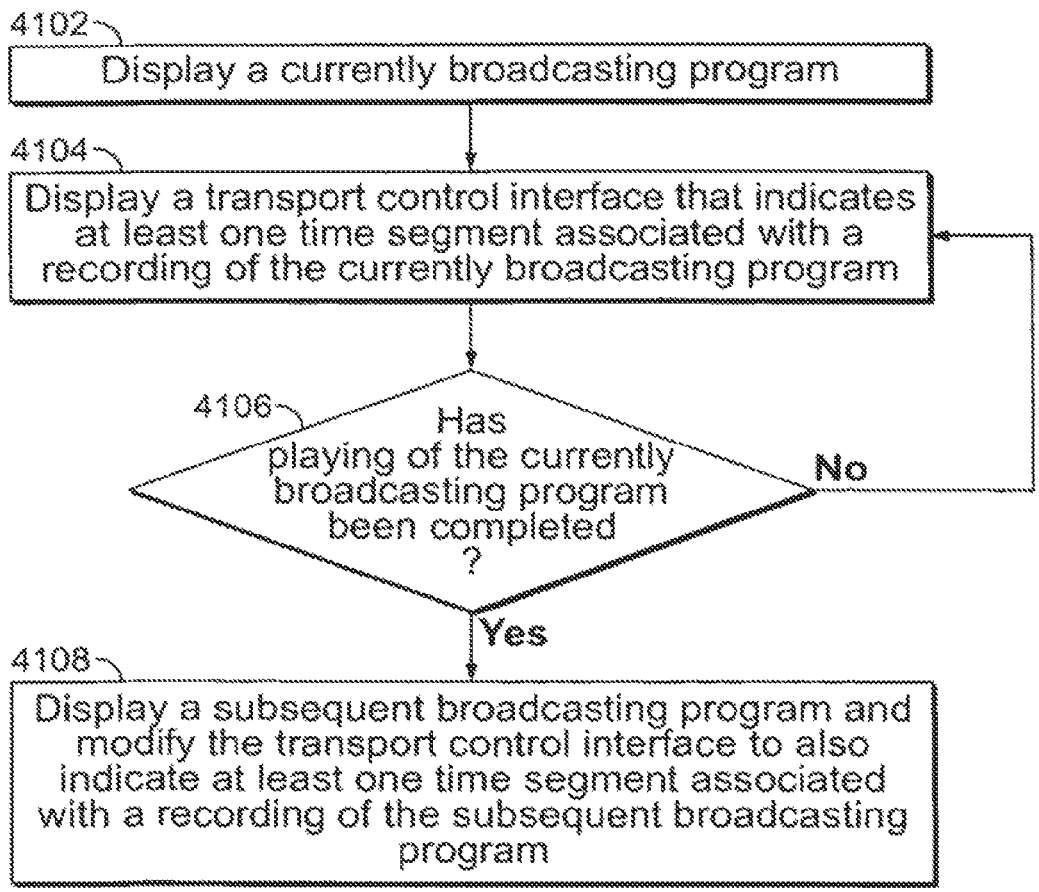
FIG. 41 is a flowchart of illustrative steps involved in modifying a transport control interface to reflect changes in the currently broadcasting program in accordance with the present invention.

FIG. 41 is a flowchart of illustrative steps involved in modifying a transport control interface to reflect changes in the currently broadcasting program (includes broadcast of the program that is shown at substantially the time that it is being broadcasted and delayed broadcast of the program) in accordance with the present invention. Steps 4102 is identical to steps 4002 described above in connection with FIG. 40. At step 4104, the Interactive television program guide application indicates at least one time segment that is associated with a recording of the currently broadcasting program.

At step 4106, the interactive television program guide application determines whether playing of the currently broadcasting program (includes broadcast of the program that is shown at substantially the time that it is being broadcasted and delayed broadcast of the program) has been completed. The interactive television program guide application may make this determination, for example, by identifying a flag that indicates the end of a program or the start of a subsequent program, by determining that the end time of the currently broadcasting program has passed, by determining that the user has not paused or rewound the currently broadcasting program thus extending its end time, by determining that any replaying of the delayed video has been completed, or by using any other suitable method.

If playing of the currently broadcasting program has been completed (and no delayed video of this broadcasting program is currently being played), the interactive television program guide application displays a subsequent broadcasting program to the user and modifies the transport control interface to also indicate any time segment of the subsequent broadcasting program that has been recorded at step 4108.

Figure 42:
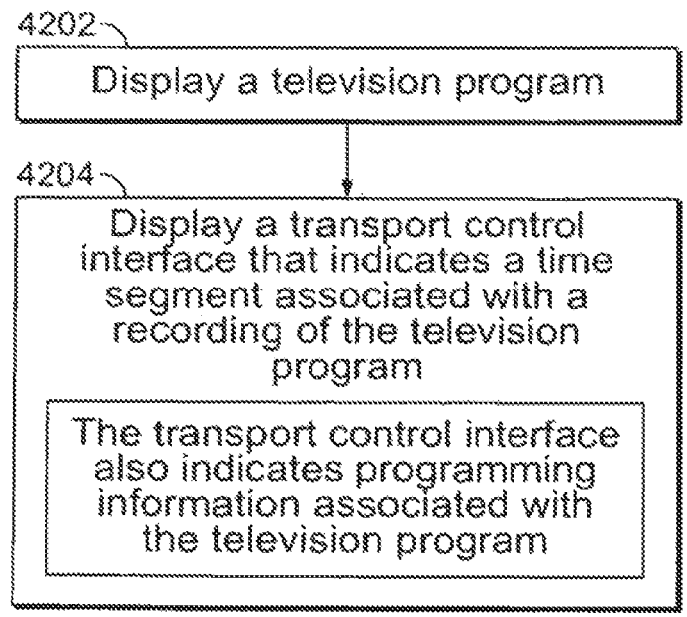
FIG. 42 is a flowchart of illustrative steps involved in providing a transport control interface that indicates programming information associated with a television program in accordance with the present invention.

FIG. 42 is a flowchart of illustrative steps involved in providing a transport control interface that indicates programming information associated with a television program in accordance with the present invention. At step 4202, the interactive television program guide application displays a television program to the user. At step 4204, the interactive television program guide application additionally displays a transport control interface that Indicates a time segment associated with a recording of the television program. In one suitable approach, the displayed transport control interface also Includes programming information that is associated with the displayed television program.

As described above, the interactive television program guide application may use the transport control bar to indicate to the user a current action status with respect to previously recorded video (e.g., play indicator 2906 of FIG. 29). Such action status may include, playing, rewinding, fast-forwarding, slow playing, slow reversing, pausing, and any other suitable action status. More specific details associated with action statuses such as, for example, the speed of rewinding, fast-forwarding, slow playing, etc., may also be indicated. The transport control bar may additionally indicate to the user recent actions that have taken place. For example, the interactive television program guide application may indicate to the user that a 30-second skip forward, a 15 second instant replay, a jump to a bookmark, a single frame advance or reverse, or any other suitable recent action, has taken place.

Figure 43:
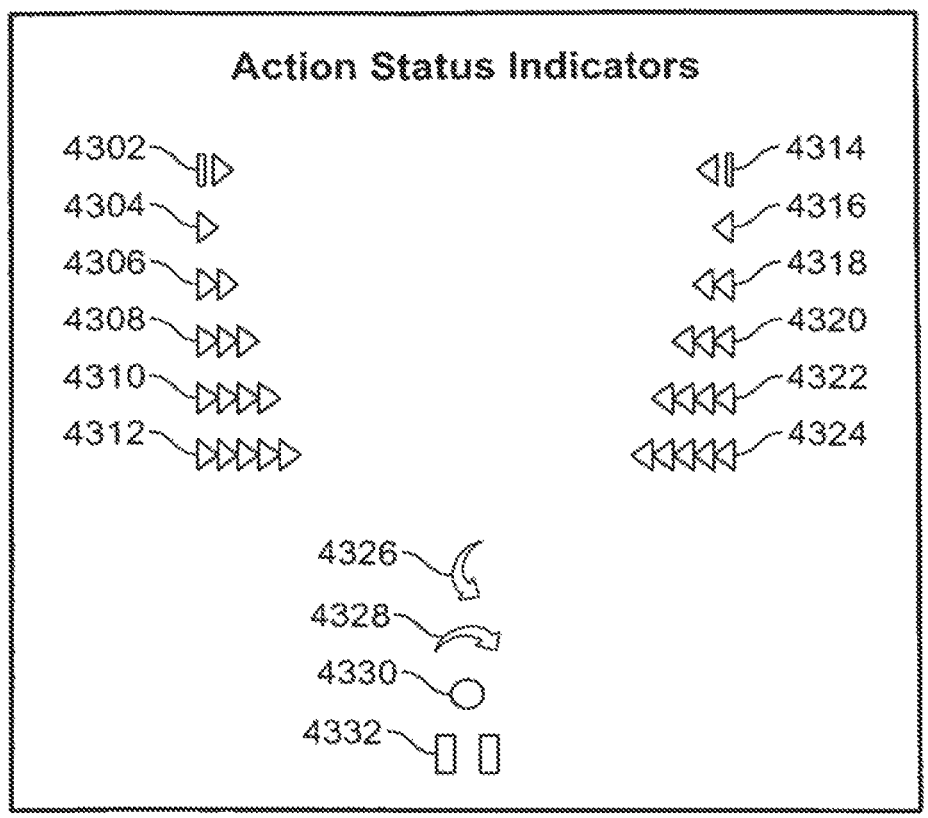
FIG. 43 shows various illustrative action
status indicators that may be displayed in the transport control interface to indicate the currant mode at the application and/or recent user activity in accordance with the present invention.

FIG. 43 shows various illustrative action status indicators that may be displayed by the interactive television program guide application depending on the current mode of the application and/or recent user activity. Indicators 4302-4312 indicate various forward playing modes of the interactive television program guide application. Indicator 4302 indicates that video is being played at a slow forward play speed. Indicator 4304 indicates that video is being played at the normal forward play speed. Indicators 4306-4312 indicate that video is being fast-forwarded at various speed. In this group, indicator 4306 indicates the slowest fast-forward play speed and indicator 4312 indicates the fastest fast-forward play speed.

Indicators 4314-4324 indicate various reverse playing modes of the interactive television program guide application. Indicator 4314 indicates that video is being played at a slow reverse play speed. Indicator 4316 indicates that video is being played at the normal play speed, but in the reverse direction, indicators 4318-4324 indicate that video is being rewound at various speed. In this group, indicator 4318 indicates the slowest rewind speed and indicator 4324 indicates the fastest rewind speed.

Indicator 4326 indicates that the user just or recently initiated a "Replay" command, which rewinds the video a certain amount of time (e.g., 5 seconds, 10 seconds, 15 seconds, etc.). Indicator 4328 indicates that the user just or recently initiated a "Skip Forward" command, which may advance or forward the video being displayed by a certain amount of time (e.g., 30 seconds). Indicator 4330 indicates that the program being displayed is also being recorded. Indicator 4332 indicates that the video being displayed is currently being paused.

The indicators shown in FIG. 43 are merely illustrative. Any other suitable indicators may be used to represent the modes discussed above. In addition, the modes of the interactive television program guide application discussed above are merely illustrative. Indicators may be displayed to indicate any other modes of the interactive television program guide application.

In another embodiment of the present invention, the interactive television program guide application may provide transport control (e.g., rewinding, fast-forwarding, etc.) of recorded video content not only from a currently tuned to channel, but also from one or more previously tuned to channels. In this embodiment, the buffer region of the transport control bar may graphically indicate that there is recorded video content from the current channel and from previously tuned to channels. The transport control bar may visually distinguish (e.g., by using different colors or patterns, by using a divider, marker, text labels, or icons, or by any other suitable method or combination of methods) between recorded video content of different channels.

Initially, when the buffer region contains only recorded content of the currently tuned to channel, the buffer region showing the recorded content may be of a generic color and the channel information such as title and channel number may be displayed on the transport control bar as shown in FIG. 39. As soon as the user tunes to another channel and begin recording that channel's content into the buffer, the interactive television program guide application may assign different colors or patterns, etc. to distinguish the buffer regions associated with the previously tuned to channel and the currently tuned to channel in the transport control bar.

In one suitable approach the buffer region associated with the previously tuned to channel may change in color so that the buffer region associated with the currently tuned to channel may always appear in the same color. In an alternative embodiment, the buffer region associated with the channel currently being played back may always be in the same color, and the buffer regions associated with channels tuned before or after that channel may be in an alternate color. The interactive television program guide application may also display channel name or other identifier on the transport control bar to identify the previously tuned to channels. The interactive television program guide application may additionally update the channel and program information associated with the currently tuned to channel to reflect the channel change.

Figure 44:
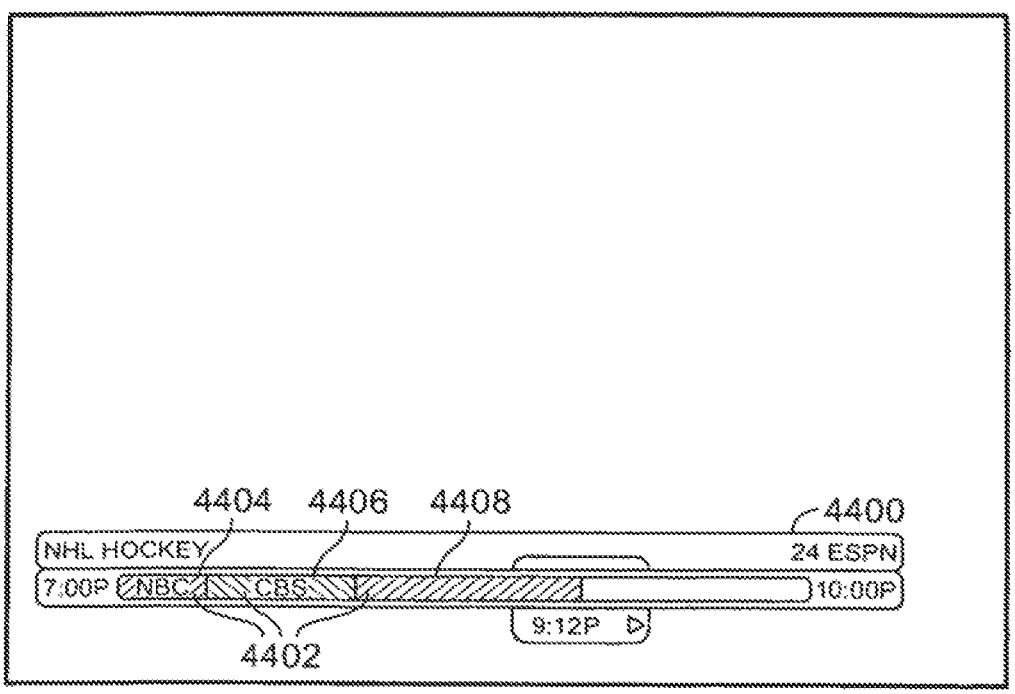
FIG. 44 is an illustrative display screen that includes a transport control bar in which recorded content associated with previously tuned channels and recorded content associated with the currently tuned channel are displayed together in accordance with the present invention.

FIG. 44 shows such a transport control bar 4400 in which recorded content from two previously tuned to channel and recorded content from the currently tuned to channel are represented in buffer region 4402. Buffer regions 4404-4408, which are associated with the different channels, are distinguished from each other through different display patterns in this example. Buffers regions 4404 and 4406, which are associated with previously tuned to channels are also labeled with the channel name in this example.

Transport control bar 4400 is merely illustrative of such a transport control bar. Any other suitable methods of distinguish recorded content from previously tuned to channels in a transport control bar may be used.

In some embodiments of the present invention, The user television equipment and the interactive television program guide application may support multiple simultaneous inputs. According to one suitable approach, the user television equipment and the interactive television program guide application may receive broadcast television input from two or more tuners and may also receive as input playback programs from a digital video recorder hard disk, a network video recorder server, a video-on-demand server, or any other suitable source of playback video.

Figure 45:
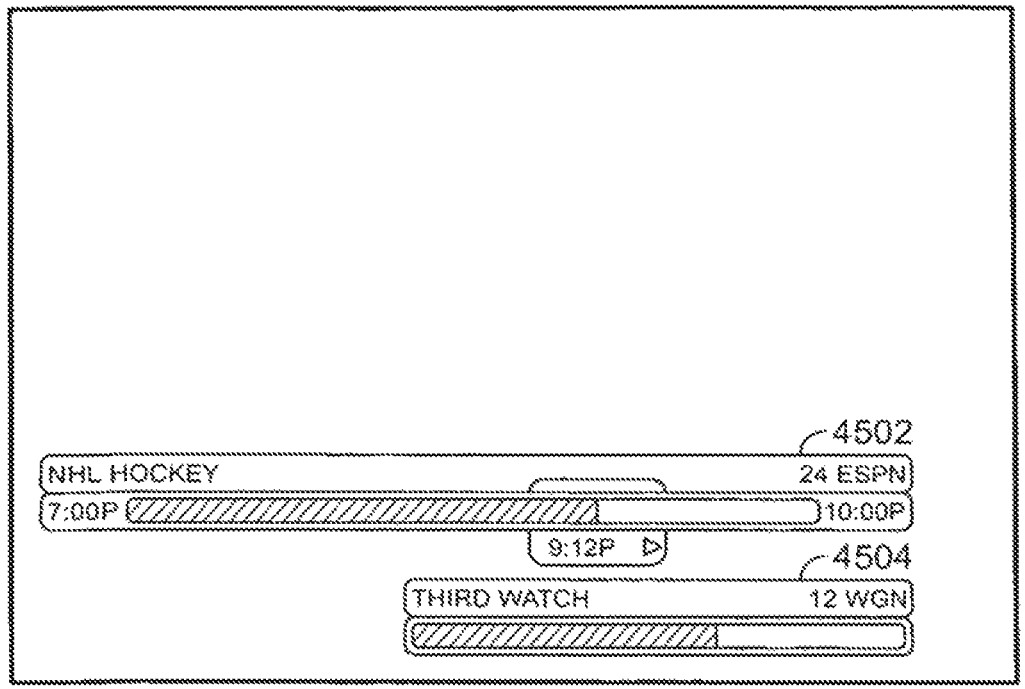
FIG. 45 is an illustrative display screen that includes multiple transport control bars that correspond to multiple inputs in accordance with the present invention.

In these embodiments, the interactive television program guide application may display multiple transport control bars simultaneously to represent the various inputs (see FIG. 45). Alternatively, the interactive television program guide application may display a single transport control bar that integrates the different inputs.

As an example, the user television equipment and the interactive television program guide application may receive inputs from two tuners. The interactive television program guide application may display a first transport control bar (4502 of FIG. 45) in connection with the program currently being watched, which may have originated with a first tuner. The second tuner may be used to record a different program. The interactive television program guide application may display a second transport control bar (4504 of FIG. 45) in connection with the content being recorded (automatically or in response to user command) by the second tuner. The transport control bar corresponding to the second or background tuner may be displayed in a designated location on the screen, so that the user understands which bar corresponds to which tuner. In one suitable approach, the second transport control bar may be smaller. The second transport control bar may also include reduced features, such as the transport control block.

As another example, the user may be playing back previously recorded content, from the DVR or VOD. The application may display a primary transport bar corresponding to the program being played. In response to a specific command from the user, the application may display one or more additional transport bars corresponding to the broadcast programming being recorded by one or more tuners. Alternatively, the application may allow the user to toggle between the transport bars corresponding to each of the source inputs, for example, in response to the user pressing a suitable toggle button on a remote control, in response to the user selecting one of the transport control bar, or in response to any other suitable user command.

Figure 46:
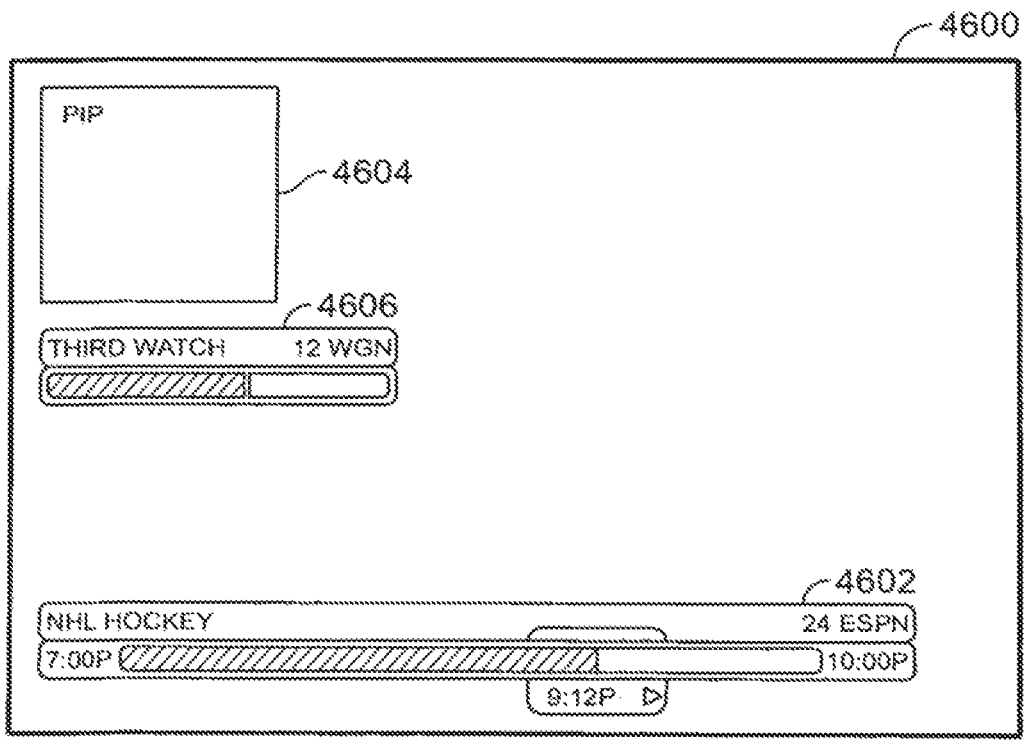
FIG. 46 is an illustrative display screen that includes multiple transport control bars that correspond to multiple outputs in accordance with the present invention.

In some embodiments of the present invention, the user equipment and the interactive television program guide application may support multiple outputs as well as multiple inputs. As an example, the interactive television program guide application may provide a main video window (4600 of FIG. 46), which displays video associated with one of the inputs, and a picture-in-picture window (4604 of FIG. 46), which displays video associated with another one of the inputs. In such an embodiment, the interactive television program guide application may display a main transport control bar (4602 of FIG. 46) for main video window 4600, and may display a smaller transport control bar (4606 of FIG. 46) for the picture-in-picture window 4604, which may be located in PIP window 4604 or on the screen 4600 near PIP window 4604.

The foregoing is merely illustrative of the principles of this invention and various modifications can be made by those skilled in the art without departing from the scope and spirit of the invention.

What is claimed is:

1. A method for providing information about a video program, the method comprising:
   generating for display, using control circuitry, the video program and a transport control interface that indicates a time length of the video program, wherein the transport control interface indicates:
      a first stored time segment of the video program which is recorded in response to a specific user command, and
      a second stored time segment of the video program which is automatically recorded into buffer memory,
      wherein the first stored time segment and the second stored time segment are visually distinguished.

2. The method of claim 1, wherein the video program is a broadcast program.

3. The method of claim 1, further comprising receiving a change in running time of the video program, and modifying the transport control interface to indicate a second time length of the video program based on the change in running time.

4. The method of claim 1 wherein generating for display the transport control interface comprises generating for display a transport control bar.

5. The method of claim 1, further comprising:
   receiving, using the control circuitry, instructions to record a second video program; and
   recording the second video program.

6. The method of claim 4, wherein the transport control bar covers a time period longer than the video program.

7. The method of claim 4, further comprising, generating simultaneously for display, using the control circuitry, a second video program, wherein the transport control interface integrates information from the first and second video programs.

8. The method of claim 4, further comprising:
   generating simultaneously for display, using the control circuitry, a second video program; and
   generating for display, using the control circuitry, a second transport control interface that indicates a second time length of the second video program.

9. The method of claim 5, further comprising:
   generating for display, using the control circuitry, a second transport control interface that indicates a second time length of the second video program, the second transport control interface indicating at least one recorded time segment of the second time length of the second video program.

10. The method of claim 9, wherein the transport control interface and the second transport control interface are displayed simultaneously over the video program.

11. A system for providing information about a video program, the system comprising:
    control circuitry configured to:
       generate for display the video program and a transport control interface that indicates a time length of the video program, wherein the transport control interface indicates:
          a first stored time segment of the video program which is recorded in response to a specific user command, and
          a second stored time segment of the video program which is automatically recorded into buffer memory,
          wherein the first stored time segment and the second stored time segment are visually distinguished.

12. The system of claim 11, wherein the video program is a broadcast program.

13. The system of claim 11, the control circuitry further configured to receive a change in running time of the video program, and modifying the transport control interface to indicate a second time length of the video program based on the change in running time.

14. The system of claim 11, wherein generating for display the transport control interface comprises generating for display a transport control bar.

15. The system of claim 11, the control circuitry further configured to:
    receive instructions to record a second video program; and
    record the second video program.

16. The system of claim 14, wherein the transport control bar covers a time period longer than the video program.

17. The system of claim 14, the control circuitry further configured to generate simultaneously for display a second video program, wherein the transport control interface integrates information from the first and second video programs.

18. The system of claim 14, the control circuitry further configured to:
    generate simultaneously for display a second video program; and
    generate for display a second transport control interface that indicates a second time length of the second video program.

19. The system of claim 15, the control circuitry further configured to:
    generate for display a second transport control interface that indicates a second time length of the second video program, the second transport control interface indicating at least one recorded time segment of the second time length of the second video program.

20. The system of claim 19 wherein the transport control interface and the second transport control interface are displayed simultaneously over the video program.

* * * * *

(12) INTER PARTES REVIEW CERTIFICATE (2533rd)
United States Patent
Gaydou, II et al.

(10) Number: US 9,621,956 K1
(45) Certificate Issued: Jan. 14, 2022

(54) SYSTEMS AND METHODS FOR PROVIDING A TRANSPORT CONTROL INTERFACE

(71) Applicants: Danny R. Gaydou, II; Michael D. Ellis; M. Scott Reichardt; Thomas Day

(72) Inventors: Danny R. Gaydou, II; Michael D. Ellis; M. Scott Reichardt; Thomas Day

(73) Assignee: TV GUIDE, INC.

Trial Number:

IPR2019-00281 filed Nov. 12, 2018

Inter Partes Review Certificate for:

Patent No.: 9,621,956
Issued: Apr. 11, 2017
Appl. No.: 14/725,875
Filed: May 29, 2015

The results of IPR2019-00281 are reflected in this inter partes review certificate under 35 U.S.C. 318(b).

INTER PARTES REVIEW CERTIFICATE
U.S. Patent 9,621,956 K1
Trial No. IPR2019-00281
Certificate Issued Jan. 14, 2022

AS A RESULT OF THE INTER PARTES REVIEW PROCEEDING, IT HAS BEEN DETERMINED THAT:

Claims 1-20 are cancelled.

\* \* \* \* \*